United States Patent [19]
Kojima et al.

[11] Patent Number: 5,678,414
[45] Date of Patent: Oct. 21, 1997

[54] ABSORPTION COOL-WARM WATER MACHINE AND METHOD FOR CONTROLLING THE SAME

[75] Inventors: Hiroshi Kojima, Tsurumi-ku; Makoto Nakamura, Kawasaki; Masaru Edera; Masahiro Oka, both of Tokyo, all of Japan

[73] Assignee: Tokyo Gas Co., Ltd., Tokyo, Japan

[21] Appl. No.: 592,292

[22] PCT Filed: Jun. 9, 1995

[86] PCT No.: PCT/JP95/01151

§ 371 Date: Apr. 9, 1996

§ 102(e) Date: Apr. 9, 1996

[87] PCT Pub. No.: WO95/34789

PCT Pub. Date: Dec. 21, 1995

[30] Foreign Application Priority Data

| | | | |
|---|---|---|---|
| Jun. 10, 1994 | [JP] | Japan | 6-128469 |
| Nov. 25, 1994 | [JP] | Japan | 6-291572 |
| Nov. 25, 1994 | [JP] | Japan | 6-291664 |
| Nov. 25, 1994 | [JP] | Japan | 6-291736 |
| Nov. 25, 1994 | [JP] | Japan | 6-291845 |

[51] Int. Cl.⁶ .................................................. F25B 15/00
[52] U.S. Cl. .................................... 62/148; 62/238.3
[58] Field of Search ........................... 62/101, 104, 141, 62/148, 476, 238.3

[56] References Cited

U.S. PATENT DOCUMENTS

| | | | |
|---|---|---|---|
| 4,280,331 | 7/1981 | Yoshii et al. | 62/148 |
| 4,380,909 | 4/1983 | Sung | 62/79 |
| 4,498,307 | 2/1985 | Hibino et al. | 62/148 |
| 4,589,262 | 5/1986 | Nagao | 62/141 |
| 4,910,969 | 3/1990 | Dalin et al. | 62/238.6 |

*Primary Examiner*—William Doerrler
*Attorney, Agent, or Firm*—Armstrong, Westerman, Hattori, McLeland & Naughton

[57] ABSTRACT

An absorption cool-water machine including a high quality fuel system and an exhaust heat utility system and apparatus and method for controlling the same is described in which the control has improved effectiveness in preventing the occurrence of crystallization in the exhaust heat exchanger tubing and/or corrosion resulting from an increase in high temperature regenerator temperatures and to otherwise prevent the production of unavailable refrigerant, save energy in an exhaust heat charge mode of operation, and to insure refrigerating ability even when exhaust water temperatures are low without reducing the effectiveness of the machine. In the described organization, a determination is made of the operative state of the exhaust heat utility system and adjustments are automatically made in supremum limiters for controlling the degree of opening of throttle valves for adjusting the supply of fuel and combustion air to the high quality fuel system that supplies heat to the high temperature regenerator.

3 Claims, 53 Drawing Sheets

$\Delta TL_{MAX}$ : MAXIMUM VALUE OF $|TL_{in} - TL_{out}|$
(E.G., 12.5°C - 7°C = 5.5°C)

Tιιgen : TEMPERATURE OF HIGH-TEMPERATURE REGENERATOR

THgenmax : MAXIMUM VALUE OF TEMPERATURE OF HIGH-TEMPERATURE REGENERATOR

TLoutmax(TMin) : EXPRESSION THAT TLoutmax IS FUNCTION OF TMin 5,678,414

1

ABSORPTION COOL-WARM WATER MACHINE AND METHOD FOR CONTROLLING THE SAME

TECHNICAL FIELD

This invention relates to an absorption cool-warm water machine (so called "absorption chiller heater") or an absorption refrigerating machine (in the present specification the absorption cool-warm water machine includes the absorption refrigerating machine) in which a high-quality fuel system and a exhaust-heat utility system are provided and a heat exchanger is provided to be charged with exhaust-heat from outside through the heat exchanger into the tubing of the exhaust-heat utility system. (In the present invention, the phrase, "warm water, can be replaced by a phrase, "hot water".)

BACKGROUND ART

As an absorption cool-warm water machine or an absorption refrigerating machine in which a high-quality fuel system and a exhaust-heat utility system are provided and a heat exchanger is provided to be charged with exhaust-heat from outside through the heat exchanger into the tubing of the exhaust-heat utility system, there is, for example, Japanese Patent Application No. 6-73428 previously filed by the present applicant.

Here, in the cool-warm water machine, there is a case in which a solution pump is interrupted in response to various signals (such as, a signal detecting a cool water temperature lower than a predetermined value) produced during an operation.

However, in the case of providing the heat exchanger, through which the exhaust-heat is charged from outside into the tubing of the exhaust-heat utility system, even after interrupting the solution pump, there is a case in which the exhaust-heat is charged from outside through the heat exchanger. In this case, the solution is not circulated, so that the solution inside the heat exchanger is inspissated, resulting in a fear that the solution will be crystallized in the heat exchanger. If the crystallizing is produced, the subsequent system to the heat exchanger cannot be used. Consequently, it is required to avoid producing crystallization, however, in a conventional art, an effective preventive measure has not been proposed yet.

The other well-known art will be further explained with reference to FIG. 23 (a drawing showing one of the embodiments of the present invention).

In the absorption cool-warm water machine, a vaporizer 2, an absorber 3, a condenser 4, a high-temperature regenerator 10 and an exhaust-heat heat-exchanger 20 are provided, in which cool-warm water is fed through a cool-warm water circulation line 5 to a cooling load (not shown). Further, a cooling water circulation line 6 is provided to feed cooling water to the absorber 3 and the condenser 4.

An exhaust-heat charge line 22 is provided to feed the exhaust-heat from an exhaust-heat line 21 to the heat-exchanger 20, in which a three valve V1 capable of adjusting the flow is provided at a confluent point of the exhaust-heat charge line 22 and the exhaust-heat line 21.

As a condition for the cool-warm water circulation line 5 in the aforementioned absorption cool-warm water machine 1, for example, a cool-warm water entrance-temperature TLin is adapted to be 12° C., and a cool-warm water exit-temperature TLout is adapted to be 7° C. The high-temperature regenerator 10 and a burner for combustion of

2 high-quality fuel 11 provided to the high-temperature regenerator 10 are designed to meet a reference fixed by the aforementioned temperatures in a non-charging state of the exhaust-heat.

Comparing with an operation at the aforementioned condition or reference, there is a case for increasing the temperature of high-temperature regenerator 10. For example, when an over-load occurs in the cooling load connected to the cool-warm water circulation line 5, the cool-warm water entrance-temperature TLin becomes higher (e.g., 13° C.) than 12 ° C. In order to control the cool-warm water exit-temperature TLout to be 7° C. in the aforementioned over-load state, it is required to operate for high-load or over-load from a normal operation, so that the temperature of the high-temperature regenerator 10 increases more than (a required value) in the normal operation.

Further, the temperature of the high-temperature regenerator 10 increases more than the required value when a cooling water circulation temperature TMin. circulating in the cooling water circulation line 6 returning from a cooling tower (not shown) to the cool-warm water machine 1 is increased more than a set value.

The aforementioned increase of the temperature of the high-temperature regenerator 10 is remarkable in an exhaust-heat charge operation mode charging the exhaust-heat fed from outside.

However, there is a disadvantage that corrosion of the high-temperature regenerator 10 is facilitated when the temperature of the high-temperature regenerator 10 is increased more than the required value.

In answer to the aforementioned disadvantage, art is proposed, in which a limiter is provided in order that the operation of the high-temperature regenerator 10 is interrupted by action of the limiter when the temperature of the high-temperature regenerator 10 is increased more than the required value. However, use of the aforementioned art causes the ability of the cool-warm water machine 1, when the operation of the high-temperature regenerator 10 is interrupted, to sharply reduce, therefore, a disadvantage is produced, in which the smooth operation of the cool-warm water machine 1 is impeded.

Further, another conventional art will be explained with reference to FIG. 27 (a drawing showing one of the embodiments of the present invention).

Like the absorption cool-warm water machine 1 shown in FIG. 23, the cool-warm water entrance-temperature TLin of the cool-warm water circulation line 5 is 12° C., and the cool-warm water exit-temperature TLout is 7° C. The high-temperature regenerator 10 and the burner for combustion of the high-quality fuel 11 provided to the high-temperature regenerator 10 are designed based on the aforementioned temperatures.

Comparing with an operation at the aforementioned condition or reference, there is a case for increasing the temperature of high-temperature regenerator 10. For example, when over-action of load is produced by the cooling load connected to the cool-warm water circulation line 5, the cool-warm water entrance-temperature TLin becomes higher (e.g., 13° C.) than 12° C., so that, in order to control the cool-warm water exit-temperature TLout to be 7° C. in the aforementioned over-load state, it is required to operate for the high-load from the normal operation, therefore, the temperature of the high-temperature regenerator 10 is increased more than (a required value) in the normal operation. And, the temperature of the high-temperature regenerator 10 is increased more than the required value when the cooling water circulation temperature returning from the cooling tower (not shown) provided to circulate to the cooling water circulation line 6 to the cool-warm water machine 1 is increased more than the set value.

The aforementioned increase of the temperature of the high-temperature regenerator 10 is remarkable in an exhaust-heat charge operation mode charging the exhaust-heat fed from outside.

However, refrigerant of liquid phase sent from the condenser 4 to the vaporizer 2 is resulted from the amount in response to the fed heating value, in which there is, in the exhaust-heat charge operation mode, a case of an insufficient heating surface area of the vaporizer 2 against the amount of the refrigerant. In this case, there is a disadvantage in which the refrigerant of the liquid phase (unavailable refrigerant) is produced to move to the side of the absorber 3 before evaporating. The unavailable refrigerant is sent to the absorber 3 without absorbing the evaporated heat from the cool-warm water in the vaporizer 2, therefore, the unavailable refrigerant is unable to cool but processes only the action of diluting the refrigerant solution in the absorber 3. More specifically, the presence of the unavailable refrigerant shows that the operation of the absorption cool-warm water machine is not facilitated efficiently.

When the temperature of the high-temperature regenerator 10 is increased more than the required value, there is a disadvantage in which the corrosion of the high-temperature regenerator 10 is facilitated. In answer to the disadvantage of the corrosion, art is proposed, in which limiter is provided in order that the operation of the high-temperature regenerator 10 is interrupted by action of the limiter when the temperature of the high-temperature regenerator 10 is increased more than the required value. However, when the operation of the high-temperature regenerator 10 is interrupted, the ability of the cool-warm water machine 1 is sharply reduced, therefore, another disadvantage is produced, in which the smooth operation of the cool-warm water machine 1 is impeded.

FIG. 62 is another drawing showing a conventional absorption cool-warm water machine which differs from the absorption cool-warm water machine. Comparing with the operation at the aforementioned condition or reference, there is a case for increasing the temperature of the high-temperature regenerator 10. For example, when over-action of the load is produced by the cooling load connecting to the cool-warm water circulation line 5, the cool-warm water entrance-temperature TLin becomes higher (e.g., 13° C.) than 12° C., so that, in order to control the cool-warm water exit-temperature TLout to be 7° C. in the aforementioned over-load state, it is required to operate at high-load from the normal operation, therefore, the temperature of the high-temperature regenerator 10 is increased more than (the required value) in the normal operation. And, the temperature of the high-temperature regenerator 10 is increased more than the required value when the cooling water circulation temperature returning from the cooling tower (not shown) provided to circulate to the cooling water circulation line 6 to the cool-warm water machine 1 is increased more than the set value. The aforementioned increase of the temperature of the high-temperature regenerator 10 is remarkable in an exhaust-heat charge operation mode charging the exhaust-heat fed from outside.

When the cool-warm water machine 1 is in an over-load state, even though the exhaust-heat held in the warm exhaust-water is charged into the cool-warm water machine 1, the heating surface area of each element (e.g., the vaporizer 2) is insufficient, so that the charged exhaust-heat is wastefully radiated to the cooling tower (not shown) that is provided to circulate to the cooling water circulation line 6. The aforementioned situation is out of step with an effective use of the exhaust-heat or the requirement of saving energy.

And, the temperature of the warm exhaust-water fed through the exhaust-heat line 21 and the exhaust-heat charge line 22 is not fixed. Here, decreasing the temperature of the warm exhaust-water, the effect of charging the exhaust-heat is reduced. When the temperature of the warm exhaust-water is lower than the temperature of the solution in the cool-warm water machine, the flow of the heat results in a counter-current from the solution to the warm exhaust-water, therefore, there is an important disadvantage in which the refrigerant ability of the absorption cool-warm water machine is insufficient. Furthermore, it is possible that the heating value caused by the high-quality fuel charged into the cool-warm water machine is unnecessarily wasted.

DISCLOSURE OF THE INVENTION

The present invention is proposed in light of various disadvantages produced when exhaust-heat is charged into an absorption cool-warm water machine which includes a high-quality fuel system and an exhaust-heat utility system and which is connected together with a heat-exchanger charged with the exhaust-heat from the outside to tubing of the exhaust-heat utility system.

Specifically, it is an object of the present invention to provide the absorption cool-water machine and a method for controlling the absorption cool-warm water machine, which is capable of preventing crystallization from occurring in the inside of the heat-exchanger connected together with the tubing of the exhaust-heat utility system and charged with exhaust-heat from the outside.

It is another object of the present invention to provide the absorption cool-warm water machine which prevents an increase of a high-temperature regenerator temperature and corrosion caused by the increased temperature and which does not sharply decrease the ability of the absorption cool-warm water machine.

It is still another object of the present invention to provide the absorption cool-warm water machine which, without producing unavailable refrigerant, prevents an increase of a high-temperature regenerator temperature and corrosion caused by the increased temperature and does not sharply decrease the ability of the absorption cool-warm water machine.

In addition to the above, it is yet another object of the present invention to provide the absorption cool-warm water machine capable of meeting the request for saving energy in an exhaust-heat charge operation mode and to be guaranteed with a refrigerating ability even when the temperature of warm exhaust-water is lower.

A method for controlling the absorption cool-warm water machine, which includes the high-quality fuel system and the exhaust-heat utility system and is further connected together with a heat-exchanger charged with exhaust-heat from tubing of the exhaust-heat utility, includes processes for detecting that a signal is produced for interrupting an operation of a solution pump or a combustion burner; judging whether a predetermined time passes from interrupting the operation of the solution pump or the combustion burner after the detection; and bypassing the heat-exchanger fluid having the exhaust-heat after the predetermined time has passed.

In the method for controlling the absorption cool-warm water machine according to the present invention, it is advisable to include a process for detecting the temperature of the fluid having the exhaust-heat and further, a process for deciding the amount of the bypassed fluid in order that the flow of the fluid which is in correspondence to the temperature is fed to the side of the heat-exchanger (or a process for deciding whether the fluid having the exhaust-heat based on the temperature is fed to the heat-exchanger or is bypassed).

The absorption cool-warm water machine, which provides the high-quality fuel system and the exhaust-heat utility system, and is connected together with a heat-exchanger charged with exhaust-heat from tubing of the exhaust-heat utility, includes a branching means connected together on a tubing system for fluid having exhaust-heat; an operation interruption detection means for detecting a signal produced for interrupting an operation of a solution pump or a combustion burner with a timer supervision means for judging whether a predetermined time passes after the operation of the solution pump or the combustion burner interrupts; and a control means for outputting a control signal to the branching means to bypass the heat-exchanger with the fluid having the exhaust-heat when an output signal is transmitted from the operation interruption detection means and the timer supervision means.

In the absorption cool-warm water machine according to the present invention, it is advisable to have a temperature detection means for detecting the temperature of the fluid having the exhaust-heat and for outputting the detected result to the control means, in which the control means is structured to transmit the control output to the branching means to adjust the flow of the fluid fed to the heat-exchanger in response to the detected temperature of the fluid.

In enforcement of the present invention, there are operation interruption signals for the solution pump, such as a start-interruption signal, a signal detecting that a cool water temperature is lower than a predetermined temperature in cooling and a signal detecting that a warm water temperature is higher than the predetermined temperature in warming.

There are the operation interruption signals for the combustion burner, such as an ON-OFF signal, a signal detecting that a cool water temperature is lower than a predetermined temperature in cooling, a signal detecting that a warm water temperature is higher than the predetermined temperature in warming.

In the present invention, when the interruption signal is produced by an unusual operation, it is more desirable that fluid bypasses the heat-exchanger by the control means and then the operation of the absorption cool-warm water machine is stopped. There are the interruption signals caused by the unusual operation, such as an unusual regenerator system signal (e.g., the regenerator pressure is higher than a reference value, the temperature of exhausted-gas is higher than the reference value, the regenerator temperature is higher than the reference value, a liquid surface in the regenerator is lower than a reference level.), an unusual combustion system signal (e.g., gas pressure is unusual.), an unusual motor system signal (e.g., excess-electric current in the solution pump, excess-electric current in a refrigerant blower, excess-electric current in a burner blower.), and an unusual facility system signal (e.g., an inter-lock of a cool-warm water pump is OFF, an inter-lock of a cooling water pump is OFF.).

Here, the aforementioned phase, "fluid having exhaust-heat", in meaning includes not only warm exhaust-water, but also exhausted-gas, exhausted-steam, and so on.

Incidentally, in the specification, the phrase, "the absorption cool-warm water machine", includes in meaning an absorption refrigerating machine.

According to the structure as described thus far, there is provided that, when the operation interruption detection means detects production of the operation interruption signal for the solution pump or the operation interruption signal for the combustion burner, the timer supervision means determines whether the predetermined time passes from interrupting the operation of the solution pump or the combustion burner, and if the predetermined time passes, the control means outputs a control signal to the branching means to cause the fluid having the exhaust-heat to bypass the heat-exchanger. By bypassing the fluid having the exhaust-heat, the heat-exchanger is facilitated not to be charged therein with heat from the outside, therefore, although an absorption solution remains in the inside of the heat-exchanger by interrupting the solution pump or the combustion burner, it is avoided that the remaining solution is inspissated or crystallized.

In the above structure, if it is arranged to detect the temperature of the fluid having the exhaust-heat by a temperature detection means, and to feed the fluid to the side of the heat-exchanger when the temperature of the fluid is higher than the predetermined temperature, thus to cause the fluid to bypass the heat-exchanger when the temperature of the fluid is lower than the predetermined temperature, the fluid having the low temperature is not to be fed to the heat-exchanger, therefore, the absorption solution circulating in the exhaust-heat utility system of the absorption cool-warm water machine is prevented from being deprived of its heat when passing through the heat-exchanger. More specifically, an effective use of the exhaust-heat is guaranteed.

Resulting from various studies, the inventor and others have seen that, in an exhaust-heat charge operation mode, the burner for combustion of the high-quality fuel is not needed to operate at 100%, it is possible to cause the exhaust-heat to handle part of the load and to cause the burner for combustion of the high-quality fuel to handle the remaining load.

From this view, the absorption cool-warm water machine according to the present invention has the exhaust-heat charge heat-exchanger and the control system arranged to be in an exhaust-heat charge operation mode or a normal operation mode from a predetermined signal and having a function automatically adjusting the increase of the opening degree (maximum limitation value of the opening degree increase) of a high-quality fuel adjusting throttle valve and a combustion air adjusting throttle valve of a burner for combusting high-quality fuel provided in a high-temperature regenerator in response to each mode.

Here, it is desirable that the absorption cool-warm water machine is structured to include a three-way valve opening state detection means for detecting an opening state of a three-way valve connected together with an exhaust-heat feed line, to cause the control system to output a control signal to a supremum limiter for the opening degree provided in the high-quality fuel adjusting throttle valve and a supremum limiter for the opening degree provided in the combustion air adjusting throttle vane and to input a detected signal from the three-way valve opening state detection means.

Otherwise, in addition to the above, it is desirable that the absorption cool-warm water machine is structured to include a cool-warm water circulation line exit-temperature detection means for detecting an exit-temperature in a cool-warm water circulation line, a high-temperature regenerator temperature detection means for detecting the temperature of the high-temperature regenerator, a high-temperature regenerator pressure detection means for detecting the pressure of the high-temperature regenerator, and a cooling water circulation line entrance-temperature detection means for detecting an entrance-temperature of a cooling water circulation line, so that each detection means outputs a detected signal to the control system.

According to the aforementioned description, the three-way vane opening state detection means detects whether the three-way valve connected together with the exhaust-heat feeding line is opened to the side for charging the exhaust-heat (the side of the exhaust-heat heat-exchanger) or to the side for non-charging the exhaust-heat (the side for bypassing the exhaust-heat heat-exchanger). From the detected result, the operation mode at a point detected is determined to be in an exhaust-heat charge operation mode (a case in which the three-way valve is opened to the side for charging the exhaust-heat, namely, the side of the exhaust-heat heat-exchanger) or in a normal operation mode (a case which the three-way valve is opened to the side for non-charging the exhaust-heat, namely, the side for bypassing the exhaust-heat heat-exchanger).

When the exhaust-heat charge operation mode is selected, the control system sets a supremum limiter for the opening degree of a throttle valve for adjusting the high-quality fuel and a supremum limiter for the opening degree of a throttle valve for adjusting combustion air of the high-quality fuel of the burner for combustion of the high-quality fuel provided in the high-temperature regenerator to control each throttle valve not to open at more than a predetermined opening degree. That is, when the exhaust-heat is charged, the burner for combustion of the high-quality fuel is not to operate at 100%, but is used to control the operation at a level in response to the particular load rather than the load that is assigned to the charged exhaust-heat. As a result, the spread of corrosion caused by increasing the temperature of the high-temperature regenerator is prevented.

In the aforementioned structure, if it is structured to output to the control system with output signals sent from the cool-warm water circulation line exit-temperature detection means for detecting an exit-temperature in a cool-warm water circulation line, the high-temperature regenerator temperature detection means for detecting the temperature of the high-temperature regenerator, the high-temperature regenerator pressure detection means for detecting pressure of the high-temperature regenerator, and the cooling water circulation line entrance-temperature detection means for detecting an entrance-temperature of a cooling water circulation line, the operation of the supremum limiter for the opening degree of the throttle vane for adjusting the high-quality fuel and the supremum limiter for the opening degree of the throttle valve for adjusting combustion air of the high-quality fuel of the burner for combustion of the high-quality fuel provided in the high-temperature regenerator is carried out to control each mode, the exhaust-heat charge operation mode and the normal operation mode, based on the detected signals caused by each of the aforementioned detection means.

According to the above structure, the operation of the supremum limiter for the opening degree of the throttle vane for adjusting the high-quality fuel and the supremum limiter for the opening degree of the throttle valve for adjusting combustion air of the high-quality fuel of the burner for combustion of the high-quality fuel can be automatically controlled in response to the operating state, so that, for example, when an over-refrigerant load is worked or when the cooling water temperature is increased by more than a set value, by automatically adjusting the supremum limiter for the opening degree of the throttle valve for adjusting the high-quality fuel and the supremum limiter for the opening degree of the throttle valve for adjusting combustion air to control the amount the high-quality fuel or combustion air is fed, the temperature of the high-temperature regenerator is controlled to be less than the required value, whereby corrosion is inhibited.

By structuring to detect the exit-temperature of the cool-warm water line, the temperature and pressure of the high-temperature regenerator and the entrance-temperature of the cooling water line, it is possible that the set values of the supremum limiter for the opening degree of the throttle valve for adjusting the high-quality fuel and the supremum limiter for the opening degree of the throttle valve for adjusting combustion air are respectively adjusted in accordance with such parameter.

In addition to the above, the absorption cool-warm water machine according to the present invention includes a heat-exchanger for charging exhaust-heat, and a fuel feeding amount control system adjusting the amount of a high-quality fuel fed to a burner for combustion of the high-quality fuel based on a cool-warm water exit-temperature and the temperature of a high-temperature regenerator by monitoring the cool-warm water exit-temperature and the temperature of the high-temperature regenerator.

The absorption cool-warm water machine according to the present invention includes the heat-exchanger for charging exhaust-heat, and a fuel feeding amount control system adjusting the amount of a high-quality fuel fed to a burner for combustion of the high-quality fuel based on a cool-warm water exit-temperature and the pressure of a high-temperature regenerator by monitoring the cool-warm water exit-temperature and the pressure of the high-temperature regenerator.

The absorption cool-warm water machine according to the present invention includes the heat-exchanger for charging exhaust-heat, and a fuel feeding amount control system adjusting the amount of a high-quality fuel fed to a burner for combustion of the high-quality fuel based on a cool-warm water exit-temperature and a cooling water entrance-temperature by monitoring the cool-warm water exit-temperature and the cooling water entrance-temperature.

The absorption cool-warm water machine according to the present invention includes the heat-exchanger for charging exhaust-heat, and a fuel feeding amount control system adjusting the amount of a high-quality fuel fed to a burner for combustion of the high-quality fuel based on a difference in temperature between a cool-warm water exit-temperature and a cool-warm water entrance-temperature by monitoring the cool-warm water exit-temperature and the cool-warm water entrance-temperature.

The absorption cool-warm water machine according to the present invention includes the heat-exchanger for charging exhaust-heat, and a fuel feeding amount control system adjusting the amount of a high-quality fuel fed to a burner for combustion of the high-quality fuel based on a cool-warm water exit-temperature, a cooling water entrance-temperature and the temperature of a high-temperature regenerator by monitoring the cool-warm water exit-temperature, the cooling water entrance-temperature and the temperature of the high-temperature regenerator.

The absorption cool-warm water machine according to the present invention includes the heat-exchanger for charging exhaust-heat, and a fuel feeding amount control system adjusting the amount of a high-quality fuel fed to a burner for combustion of the high-quality fuel based on a cool-warm water exit-temperature, a cooling water entrance-temperature and the pressure of a high-temperature regenerator by monitoring the cool-warm water exit-temperature, the cooling water entrance-temperature and the pressure of the high-temperature regenerator.

The absorption cool-warm water machine according to the present invention includes the heat-exchanger for charging exhaust-heat, and a fuel feeding amount control system adjusting the amount of a high-quality fuel fed to a burner for combustion of the high-quality fuel based on a cool-warm water exit-temperature, a cool-warm water entrance-temperature and the temperature of a high-temperature regenerator by monitoring the cool-warm water exit-temperature, the temperature of the high-temperature regenerator and the cool-warm water entrance-temperature.

The absorption cool-warm water machine according to the present invention includes the heat-exchanger for charging exhaust-heat, and a fuel feeding amount control system adjusting the amount of a high-quality fuel fed to a burner for combustion of the high-quality fuel based on a cool-warm water exit-temperature, a cool-warm water entrance-temperature and the pressure of a high-temperature regenerator by monitoring the cool-warm water exit-temperature, the pressure of the high-temperature regenerator and the cool-warm water entrance-temperature.

The absorption cool-warm water machine according to the present invention includes the heat-exchanger for charging exhaust-heat, and a fuel feeding amount control system adjusting the amount of a high-quality fuel fed to a burner for combustion of the high-quality fuel based on a difference in temperature between a cool-warm water exit-temperature and a cool-warm water entrance-temperature and a cooling water entrance-temperature by monitoring the cool-warm water exit-temperature, the cool-warm water entrance-temperature and the cooling water entrance-temperature.

In the performance of the present invention, it is advisable that a combination of the throttle valve capable of adjusting the opening degree and the control system controlling the opening degree of the throttle is used as the fuel feeding amount control system adjusting the amount of the fed high-quality fuel.

When the amount of the fed high-quality fuel is adjusted, it is desirable that a three-way valve monitoring means which monitors the opening state of the three-way valve provided to the cool-warm water feeding line is used in order to judge the operation mode at this point to be in an exhaust-heat charge operation mode or the normal operation mode.

The amount of the high-quality fuel fed to the burner for combustion of the high-quality fuel is controlled based on one of the following: the exit-temperature of the cool-warm water and the temperature or pressure of the high-temperature regenerator; the difference in the temperature between the exit-temperature of the cool-warm water and the entrance-temperature of the cool-warm water; or the exit-temperature of the cool-warm water, the temperature or pressure of the high-temperature regenerator and the difference in the temperature between the exit-temperature and the entrance-temperature of the cool-warm water. Therefore, in the exhaust-heat charge operation mode, the aforementioned effect is detected to control the amount of the high-quality fuel fed to the burner for combustion of the high-quality fuel, and the flow of the liquid-phase refrigerant delivered from a condenser to a vaporizer is controlled not to be greatly increased relative to a heating surface area of the vaporizing surface, whereby the occurrence of unavailable refrigerant can be accommodated.

When the refrigerating over-load is worked or when the temperature of the cooling water is increased more than the set value, the amount of the fed high-quality fuel is automatically decreased by operating the fuel feeding amount control system in order to control the temperature of the high-temperature regenerator to be less than a required value, whereby corrosion is prevented.

The absorption cool-warm water machine, which is selectively fed with exhaust-heat through a branch tubing branching from a warm water feeding tube with a connection extended to an exhaust-heat source, has a warm water temperature detection means for detecting a warm water temperature, a three-way valve connected together with the warm water feeding tube to adjust the flow of warm water flowing to the side of the branch tubing, and a control system controlling the opening of the three-way valve in response to the detected result caused by the warm water temperature detection means.

The absorption cool-warm water machine, which is selectively fed with exhaust-heat through a branch tubing branching from a warm water feeding tube with a connection extended to an exhaust-heat source, has a warm water temperature detection means for detecting a warm water temperature, a solution temperature detection means for detecting a solution temperature flowing in a solution line connected together with an exhausted-heat salvage heat-exchanger in order to charge the exhaust-heat to the absorption cool-warm water machine, a three-way valve connected together with the warm water feeding tube to adjust the flow of warm water flowing to the side of the branch tubing, and a control system controlling the opening of the three-way valve in response to the detected results caused by the warm water temperature detection means and the solution temperature detection means.

The absorption cool-warm water machine, which is selectively fed with exhaust-heat through a branch tubing branching from a warm water feeding tube with a connection extended to an exhaust-heat source, has a cool water exit-temperature detection means for detecting a cool water exit-temperature, a warm water temperature detection means for detecting a warm water temperature, a three-way valve connected together with the warm water feeding tube to adjust the flow of warm water flowing to the side of the branch tubing, and a control system controlling the opening of the three-way valve in response to the detected results caused by the cool water exit-temperature detection means and the warm water temperature detection means.

Here, the opening control of the three-way valve may be of a system controlling only the two states of completely open and completely closed or alternatively a system with a three-way valve opening degree control, to suitably control the opening degree of the three-way valve in response to the detected result caused by the cool water exit-temperature detection means or the detected result caused by the warm water temperature detection means. Further, the three-way valve opening degree control may be to control in a stepping control or a linear control.

The absorption cool-warm water machine, which is selectively fed with exhaust-heat through a branch tubing branching from a warm water feeding tube with a connection extended to an exhaust-heat source, has a cool water exit-temperature detection means for detecting a cool water exit-temperature, a cool water entrance-temperature detection means for detecting a cool water entrance-temperature, a three-way valve connected together with the warm water feeding tube to adjust the flow of warm water flowing to the side of the branch tubing, and a control system controlling the opening of the three-way valve in response to the compared result by comparing the detected result caused by the cool water exit-temperature detection means and the detected result caused by the cool water entrance-temperature detection means.

The absorption cool-warm water machine, which is selectively fed with exhaust-heat through a branch tubing branching from a warm water feeding tube with a connection extended to an exhaust-heat source, has a high-temperature regenerator detection means for detecting a high-temperature regenerator temperature or a high-temperature regenerator pressure, a three-way valve connected together with the warm water feeding tube to adjust the flow of warm water flowing to the side of the branch tubing, and a control system controlling the opening of the three-way valve in response to the detected result caused by the high-temperature regenerator detection means.

The absorption cool-warm water machine, which is selectively fed with exhaust-heat through a branch tubing branching from a warm water feeding tube with a connection extended to an exhaust-heat source, has a cool water exit-temperature detection means for detecting a cool water exit-temperature, a cool water entrance-temperature detection means for detecting a cool water entrance-temperature, a warm water temperature detection means for detecting a warm water temperature, a three-way valve connected together with the warm water feeding tube to adjust the flow of warm water flowing to the side of the branch tubing, and a control system controlling the opening of the three-way valve in response to the detected result caused by the cool water exit-temperature detection means, the detected result caused by the cool water entrance-temperature detection means and the detected result caused by the warm water temperature detection means.

The absorption cool-warm water machine, which is selectively fed with exhaust-heat through a branch tubing branching from a warm water feeding tube with a connection extended to an exhaust-heat source, has a warm water temperature detection means for detecting a warm water temperature, a high-temperature regenerator detection means for detecting a high-temperature regenerator temperature or a high-temperature regenerator pressure, a three-way valve connected together with the warm water feeding tube to adjust the flow of warm water flowing to the side of the branch tubing, and a control system controlling the opening of the three-way vane in response to the detected result caused by the warm water temperature detection means and the detected result caused by the high-temperature regenerator detection means.

The absorption cool-warm water machine, which is selectively fed with exhaust-heat through a branch tubing branching from a warm water feeding tube with a connection extended to an exhaust-heat source, has a cool water exit-temperature detection means for detecting a cool water exit-temperature, a cooling water entrance-temperature detection means for detecting a cooling water entrance-temperature, a three-way valve connected together with the warm water feeding tube to adjust the flow of warm water flowing to the side of the branch tubing, and a control system controlling the opening of the three-way vane in response to the detected result caused by the cool water exit-temperature detection means and the detected result caused by the cooling water entrance-temperature detection means.

According to the above structure, the absorption cool-warm water machine has the control system which controls the opening of the three-way valve in response to the detected result caused by the cool water exit-temperature detection means, so that when it is in the over-load state as a result of being judged whether in the over-load state or not by detecting the exit-temperature of the cool water, the feed of the exhaust-heat charged on the cool-warm water machine can be decreased by controlling the flow in the exhaust-heat charge line. Therefore, the charged exhaust-heat is prevented from being wastefully emitted to a cooling tower connected together with the cooling water circulation system.

And, according to the above structure, since the absorption cool-warm water machine has the control system which control the opening of the three-way valve in response to the detected result caused by the warm water temperature detection means, when the temperature of the warm exhaust-water is decreased (including when the temperature of the warm exhaust-water is lower than the solution temperature in the cool-warm water machine), the amount the warm exhaust-water is changed is controlled, if necessary, the feed of the warm exhaust-water for the cool-warm water machine is stopped. Therefore, the decrease of the effect charging the exhaust-heat can be treated. And, the situation, in which the refrigerating ability of the absorption cool-warm water machine cannot be guaranteed by flowing heat backward from the solution of the adsorption cool-warm water machine to the warm exhaust-water, is completely prevented. A heating value caused by the high-quality fuel charged to the cool-warm water machine is also prevented from being wastefully disposed.

Further, in the above structure, when the opening of the three-way valve is structured to be controlled in response to the detected results of the cool water exit-temperature detection means and the warm water temperature detection means, it is possible to appropriately treat for the over-load state, to treat the decrease of the effect charging the exhaust-heat and to guarantee the refrigerating ability.

Furthermore, in the present invention which takes place the control of the amount charging the exhaust-heat, extremely precise control can be attained by, for example, controlling the opening of the three-way valve.

According to the above structure, the over-load state can be detected from the difference in the temperature between the cool water exit-temperature and the cool water entrance-temperature or the temperature of the high-temperature regenerator. By independently detecting the difference in the temperature between the cool water exit-temperature and the cool water entrance-temperature and the temperature of the warm water, the judgment of the over-load state can be carried out with greater precision, the decrease of the effect charging the exhaust-heat can be treated and the refrigerating ability can be guaranteed. Further from the temperature of the warm water and the temperature of the high-temperature regenerator, the over-load is judged, and it is possible to treat the decrease of the effect charging the exhaust-heat and to guarantee the refrigerating ability. Furthermore, the amount charging the exhaust-heat can controlled by using the temperature of the warm water and the temperature of the high-temperature regenerator, and the over-load can be judged by using the exit-temperature of the cool water and the entrance-temperature of the cooling water. Here, when the over-load is judged by using the exit-temperature of the cool water and the entrance-temperature of the cooling water, it is convenient that the maximum set value of the exit-temperature of the cool water can be used as a function of the entrance-temperature of the cooling water.

BRIEF DESCRIPTION OF THE DRAWINGS

FIG. 58 is a block diagram of another embodiment differing from FIG. 44 to FIG. 57;

FIG. 59 is a flow chart showing control of FIG. 58;

BEST MODE FOR CARRYING OUT THE INVENTION

The following will explain preferable embodiments according to the present invention with reference to the attached drawings.

First, the embodiments shown in FIG. 1 to FIG. 17 will be described.

Figure 1:
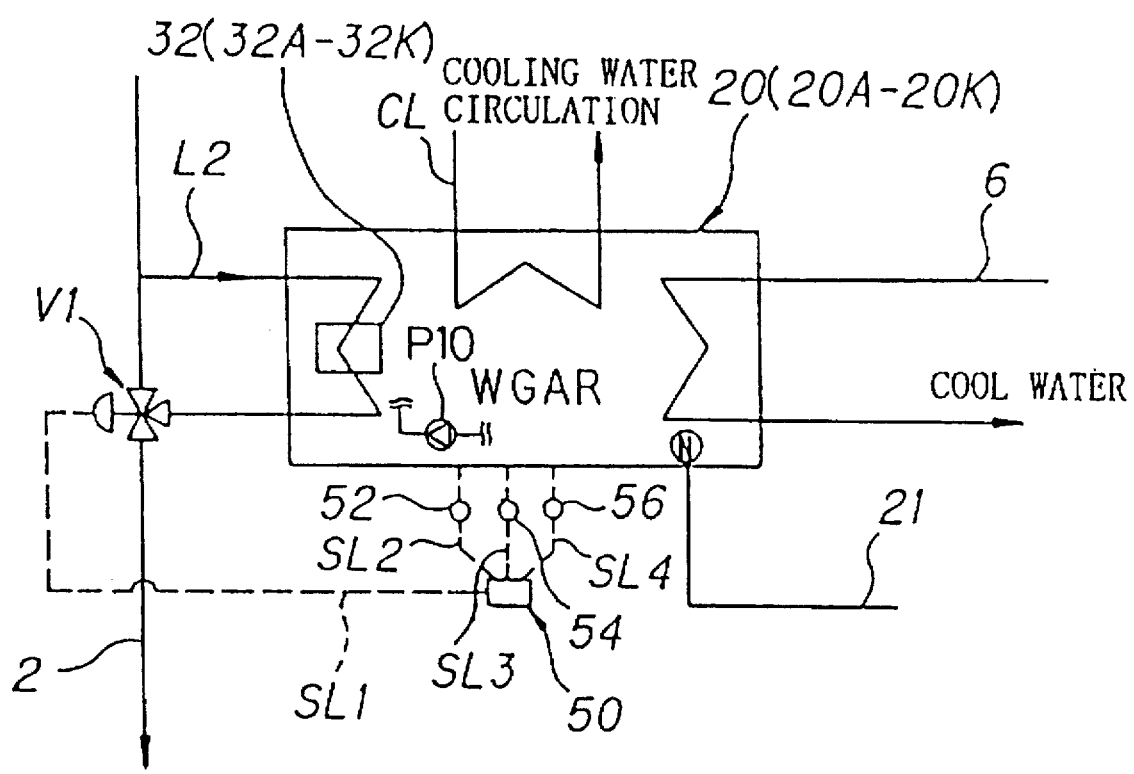
FIG. 1 is a block diagram of a first embodiment according to the present invention.

FIG. 1 shows a first embodiment according to the present invention. A numeral 20 (20A–20K) indicating the whole machine is an absorption cool-warm water machine. The absorption cool-warm water machine 20 (20A–20K) will be set forth in detail below.

In order to feed exhaust-heat from an exhaust-heat line 2 to the absorption cool-warm water machine 20 (20A–20K), an exhaust-heat charge line L2 is provided, in which a heat exchanger 32 (32A–32K) is jointly connected thereon to feed the heating value held by fluid to an absorption solution flowing in an exhaust-heat utility system of the absorption cool-warm water machine.

In the embodiment of FIG. 1, a three-way valve V1 capable of adjustment is provided as a branching means at a confluent point of the exhaust-heat line 2 and the exhaust-heat charge line L2, in which a control signal for opening the valve is transferred from a control means 50 through a signal transmitting line SL1 to the three-way valve V1. The control means 50 is inputted with an interruption signal of a solution pump P10 in the absorption cool-warm water machine 20 (20A–20K), a switch OFF signal for the operation of the absorption cool-warm water machine, an unusual operation signal, and so on, from respective sensors 52, 54 and 56 through signal transmitting lines SL2, SL3 and SLA.

In FIG. 1, a numeral 21 shows a fuel line of a high-quality fuel system.

Next, action of the illustrated embodiment will be explained with reference to FIG. 2 and FIG. 3.

Switching ON an operation switch or a reset switch of the absorption cool-warm water machine 20 (20A–20K) (Step S1 in FIG. 2), the operation of the absorption cool-warm water machine in FIG. 1 starts. The directional flow of three-way valve V1 is defined to feed warm exhaust-water in the exhaust-heat line L2 to the side of the absorption cool-warm water machine 20 (20A–20K) (Step S2).

In the operation of the absorption cool-warm water machine 20 (20A–20K), the sensors 52, 54 and 56 always judge whether the solution pump P10 interrupts, or not, during the operation of the absorption cool-warm water machine 20 (20A–20K) (Step S3). If the signal is not outputted, the state of Step S2 is continued (from the NO loop in Step S3).

On the other hand, when a signal of interrupting the solution pump is outputted (YES in Step S3), the signal is determined which is continuously inputted in more than the predetermined time (Step 84). Here, a phrase "a predetermined time" means a time which the solution remaining in the heat exchanger 32 (32A–32K) is not condensed in more than a constant density, but the aforementioned time and "a constant density" are different by, for example, the condition of providing the absorption cool-warm water machine and various specifications. That is, the aforementioned "predetermined time" is a constant including zero according to the situation.

If the signal used for interrupting the solution pump is released before the predetermined time passes, the solution which remains in the heat exchanger 32 (32A–32K) is not condensed, so that the operation of the absorption cool-warm water machine is continued as it is (from the NO loop in Step S4). While, when the signal used for interrupting the solution pump is not released after the predetermined time passes (from the YES loop in Step S4), it is still possible for the solution which remains in the heat exchanger 32 (32A–32K) to be condensed. Therefore, a necessary process takes place to interrupt the charge of the exhaust-heat. Specifically, the three-way valve V1 is changed to the side of a bypass (Step S5), so that fluid (e.g., warm exhaust-water) flowing in the exhaust-heat line 2 is redirected away from the heat exchanger 32 (32A–32K).

The operation of the solution pump P10 is sensed whether it is resumed or not (Step S6), and when the signal of interrupting the solution pump is being outputted as it is (NO in Step S6), the state, in which the warm exhaust-water flowing in the exhaust-heat line 2 is not fed into the heat exchanger 32 (32A–32K), is continued (a state of Step S5). However, after stopping the output of the signal for interrupting the solution pump, when the operation of the solution pump is resumed (YES in Step S6), an opening direction of the three-way valve V1 is changed in order to feed the warm exhaust-water in the exhaust-heat line L2 to the side of the absorption cool-warm water machine 20 (20A–20K) again (Step S2).

Figure 2:
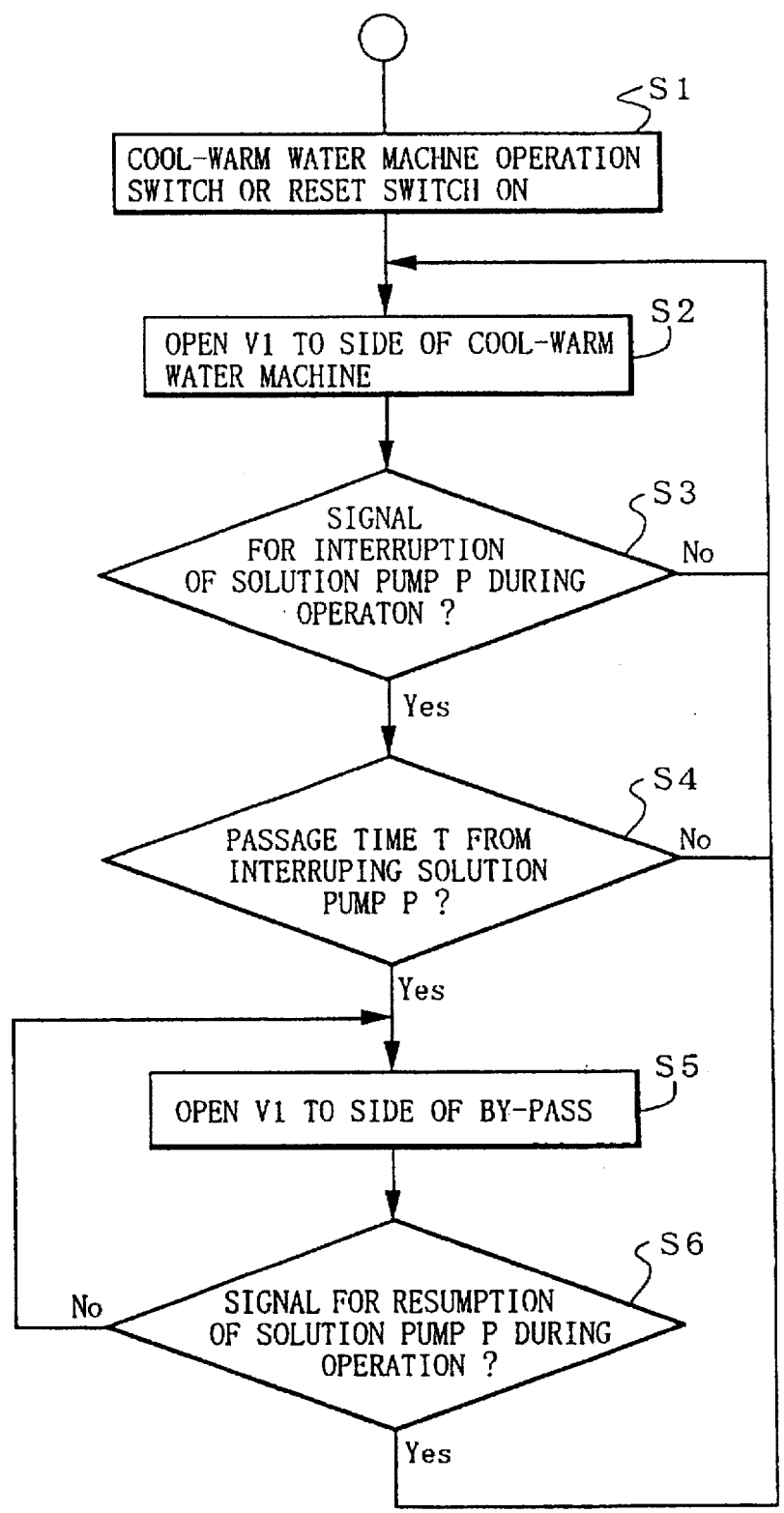
FIG. 2 is a flow chart showing control of the embodiment shown in FIG. 1.
Figure 3:
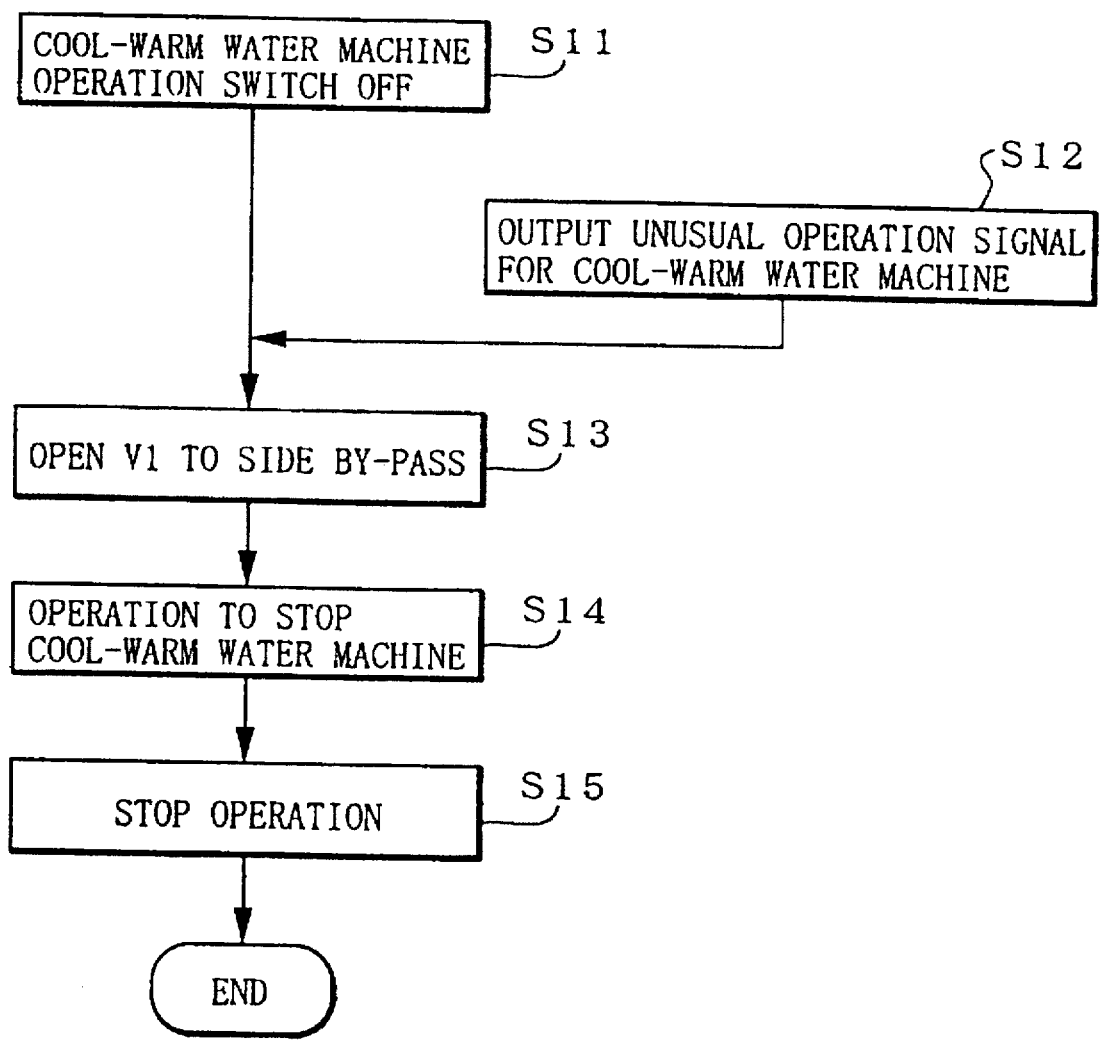
FIG. 3 is a flow chart showing a different control of the embodiment of FIG. 1 from the flow chart of FIG. 2.

In addition to a control routine during the normal operation shown in FIG. 2, control as shown in FIG. 3 is carried out when the operation is stopped. When it is detected by the sensors 52, 54 and 56 that the operation switch of the absorption cool-warm water machine 20 (20A–20K) becomes an OFF state (output of an operation interruption signal) or an unusual situation has occurred during the operation (output of the unusual operation signal) (Step S11 or S12 in FIG. 3), the three-way valve V1 is redirected to the side of the bypass (Step S13). Thereupon, fluid (e.g., the warm exhaust-water) flowing along the exhaust-heat line 2 is not to be charged, whereby there is no disadvantage as to condensation or crystallizing of the solution in the inside of the heat exchanger.

After that, the process for stopping the operation of the cool-warm water machine 20 (20A–20K) takes place (Step S14), and then the operation stops (Step S15).

Figure 4:
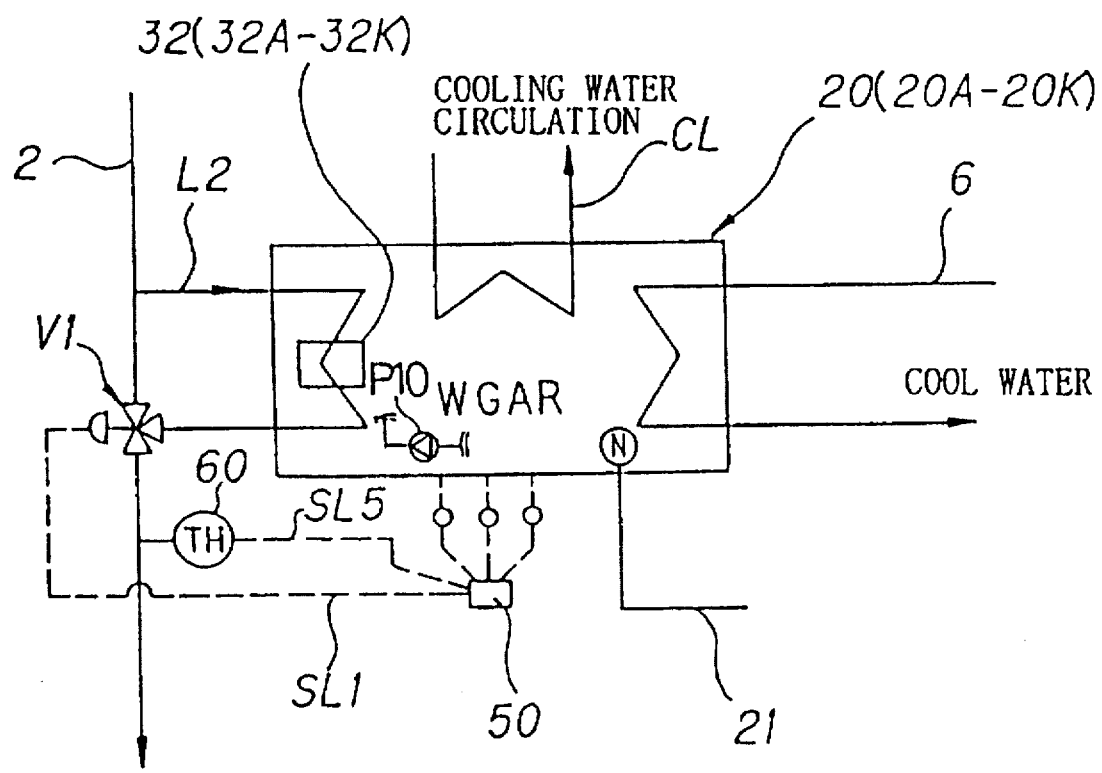
FIG. 4 is a block diagram of a second embodiment according to the present invention.
Figure 5:
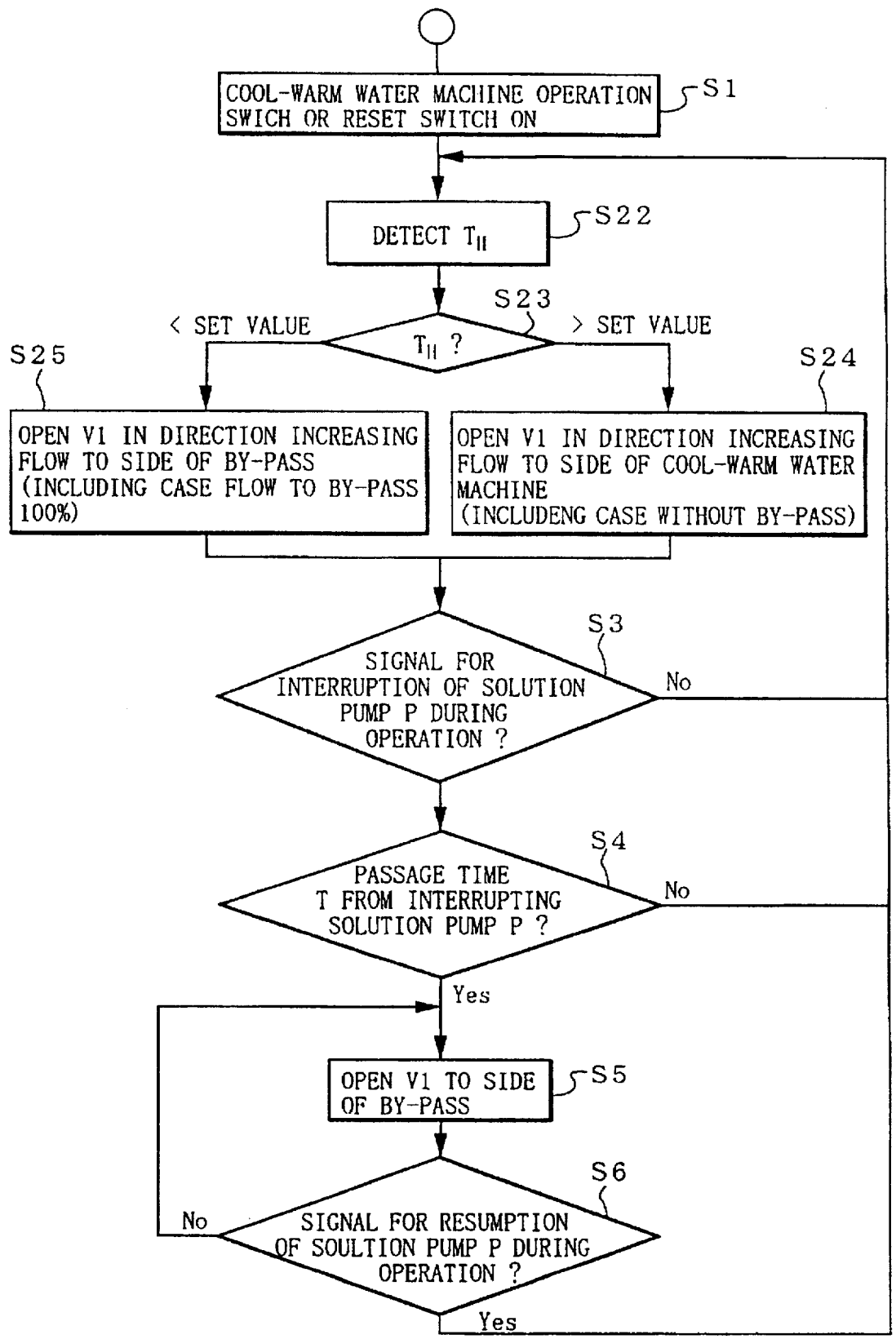
FIG. 5 is a flow chart showing control of the embodiment shown in FIG. 4.
Figure 6:
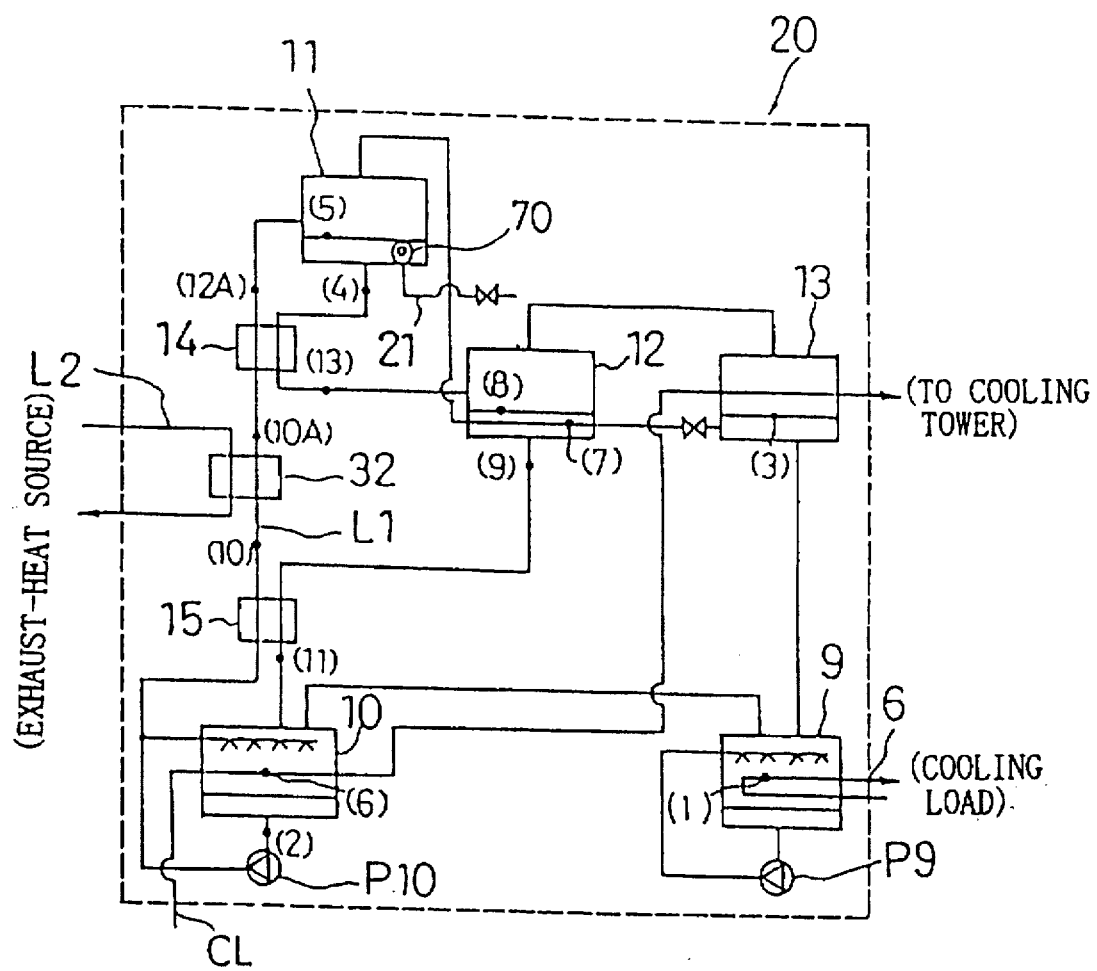
FIG. 6 is a block diagram of an absorption cool-warm water machine or an absorption refrigerating machine used in the present invention.
Figure 7:
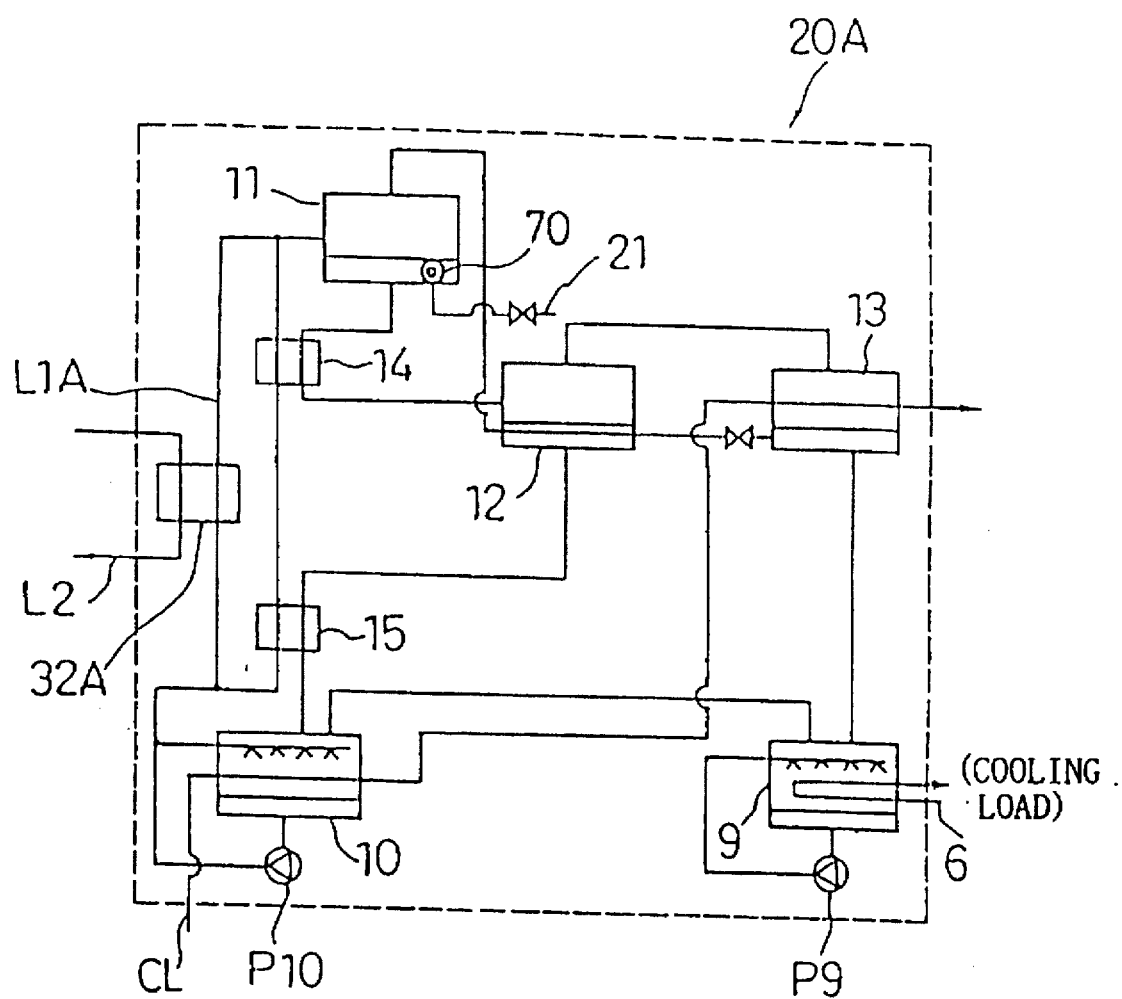
FIG. 7 is a block diagram of an absorption cool-warm water machine or an absorption refrigerating machine that differs from the machine shown in FIG. 6.
Figure 8:
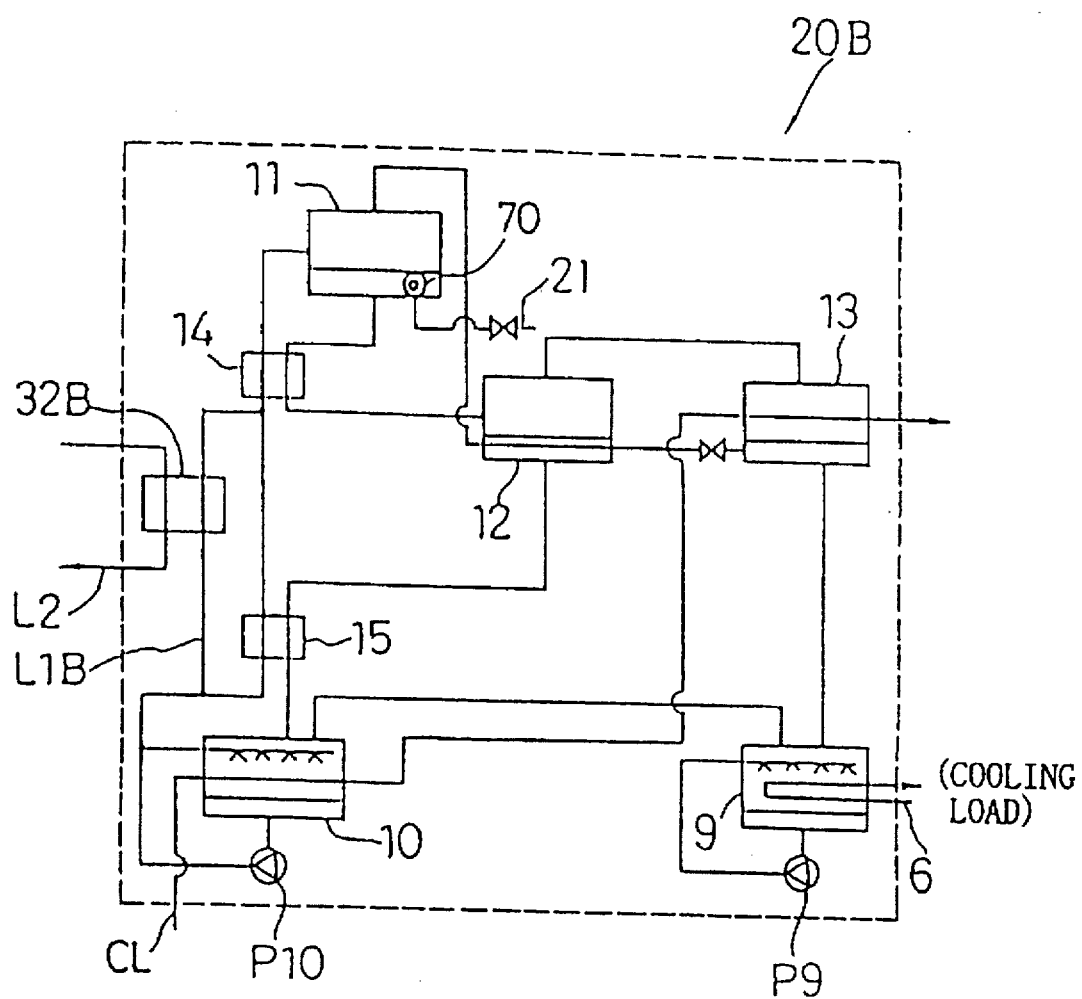
FIG. 8 is a block diagram of an absorption cool-warm water machine or an absorption refrigerating machine that differs from the machine shown in FIG. 6 and FIG. 7.
Figure 9:
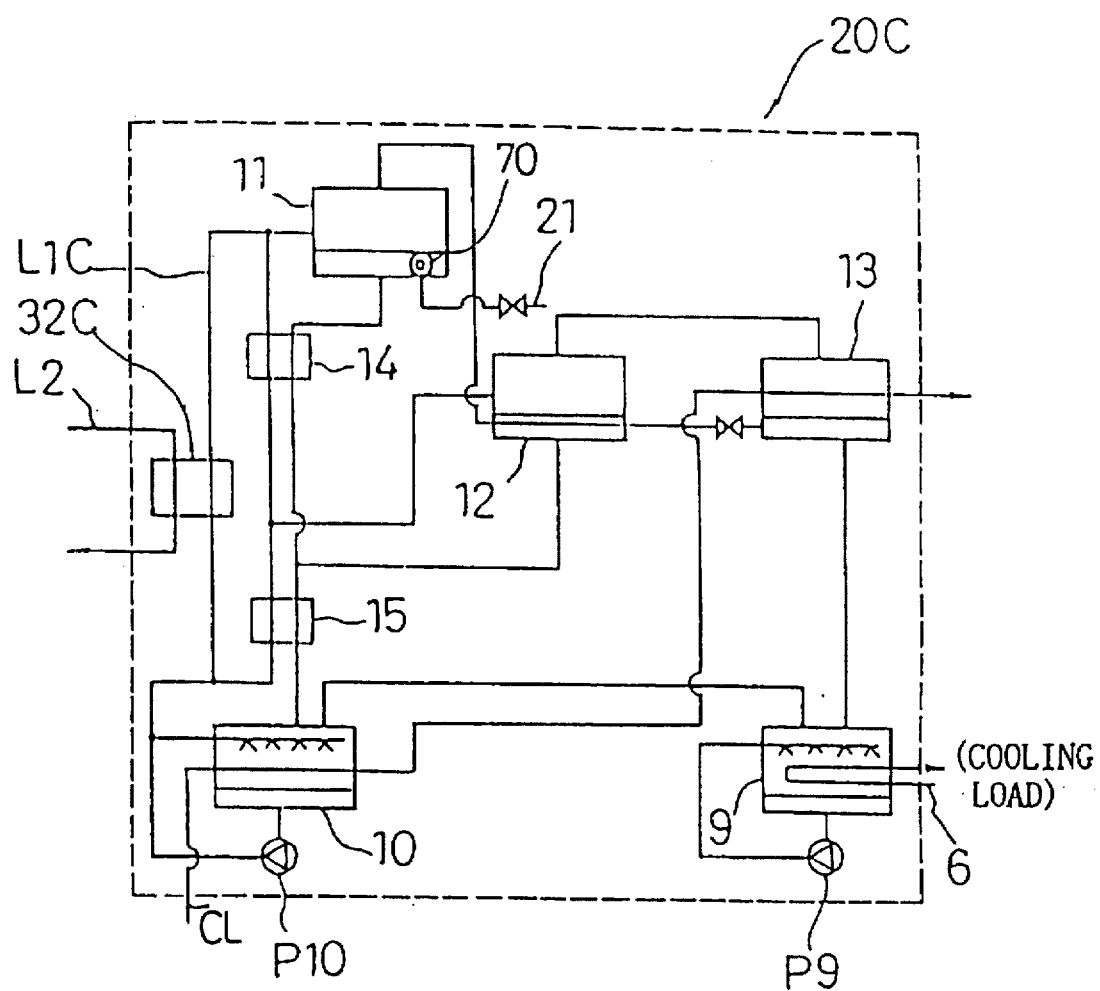
FIG. 9 is a block diagram of an absorption cool-warm water machine or the absorption refrigerating machine that differs from FIG. 6 to FIG. 8.
Figure 10:
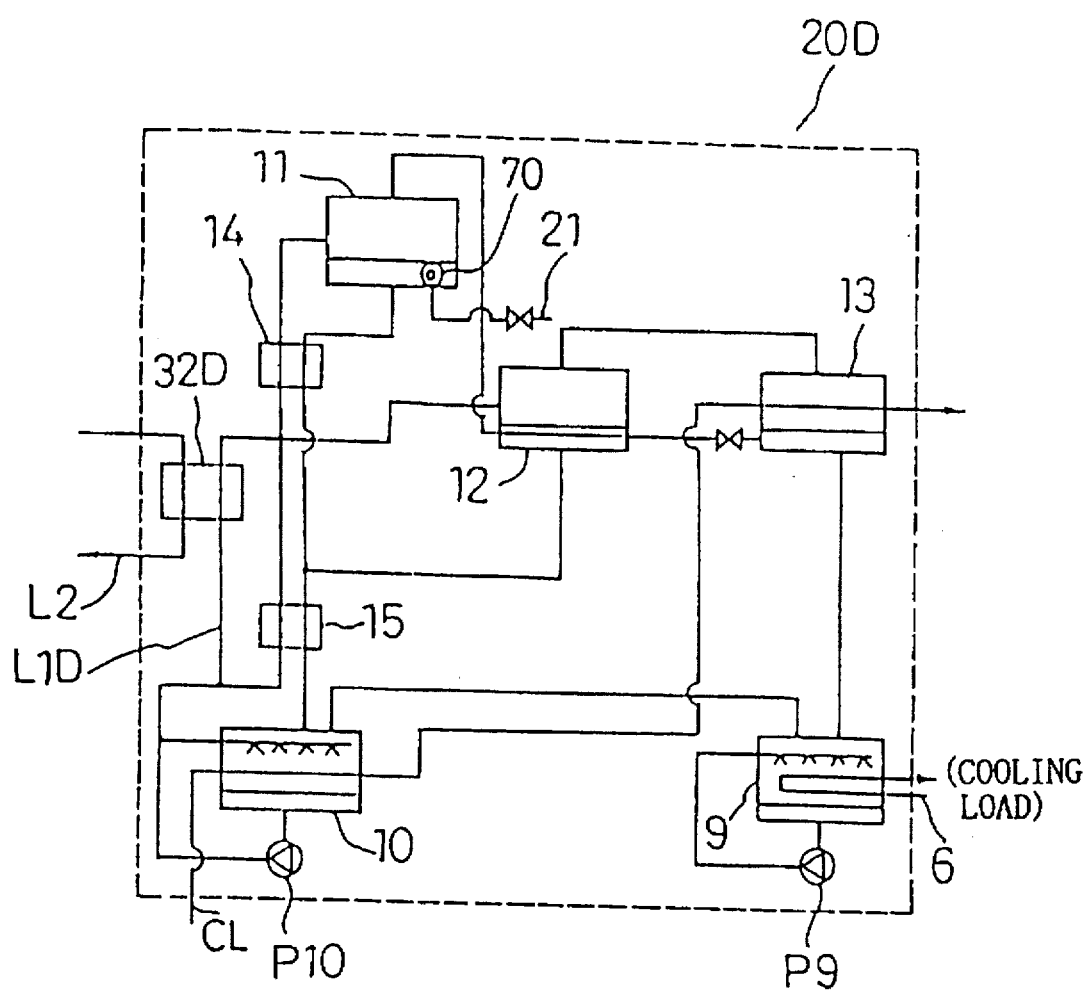
FIG. 10 is a block diagram of an absorption cool-warm water machine or the absorption refrigerating machine that differs from FIG. 6 to FIG. 9.
Figure 11:
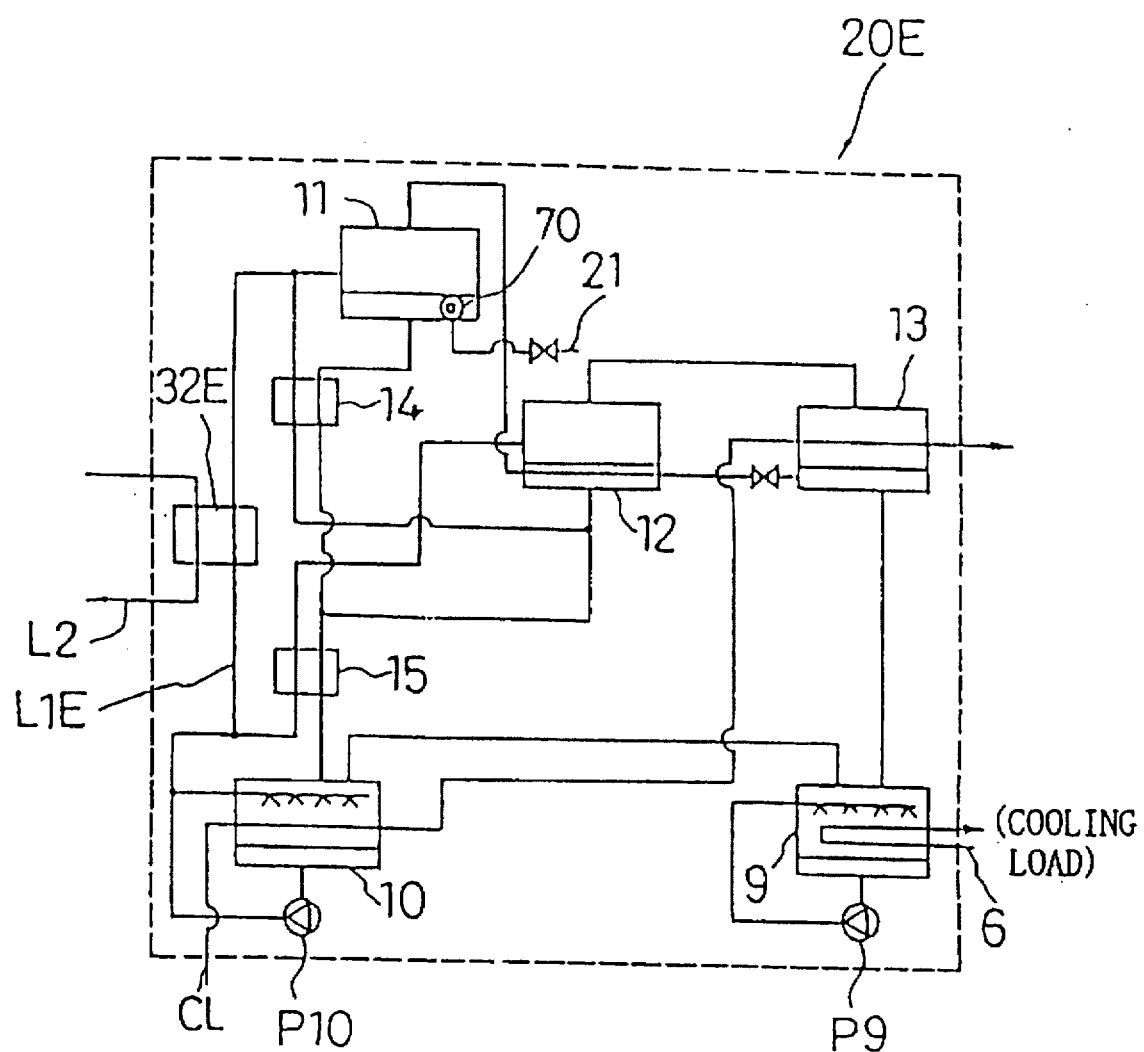
FIG. 11 is a block diagram of an absorption cool-warm water machine or the absorption refrigerating machine that differs from FIG. 6 to FIG. 10.
Figure 12:
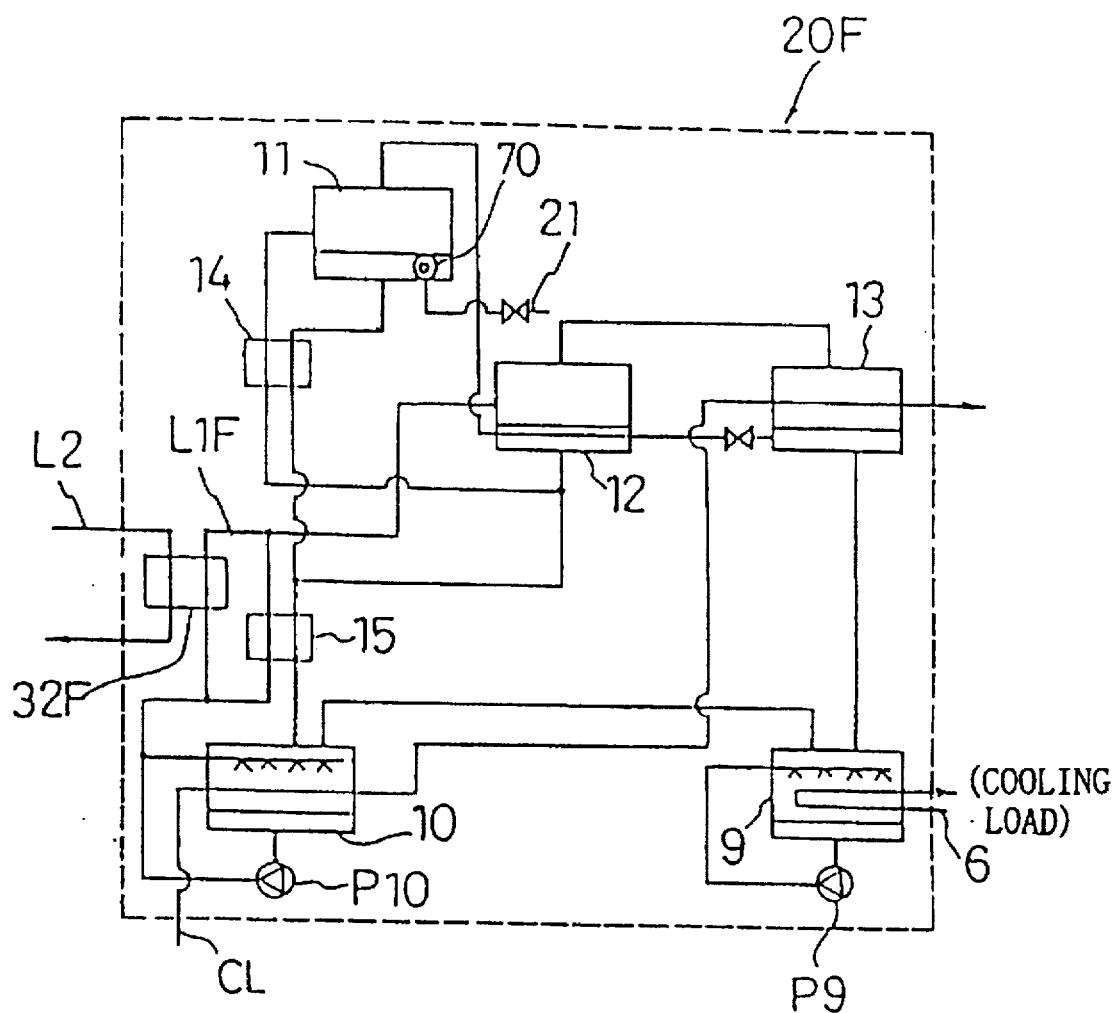
FIG. 12 is a block diagram of an absorption cool-warm water machine or the absorption refrigerating machine that differs from FIG. 6 to FIG. 11.
Figure 13:
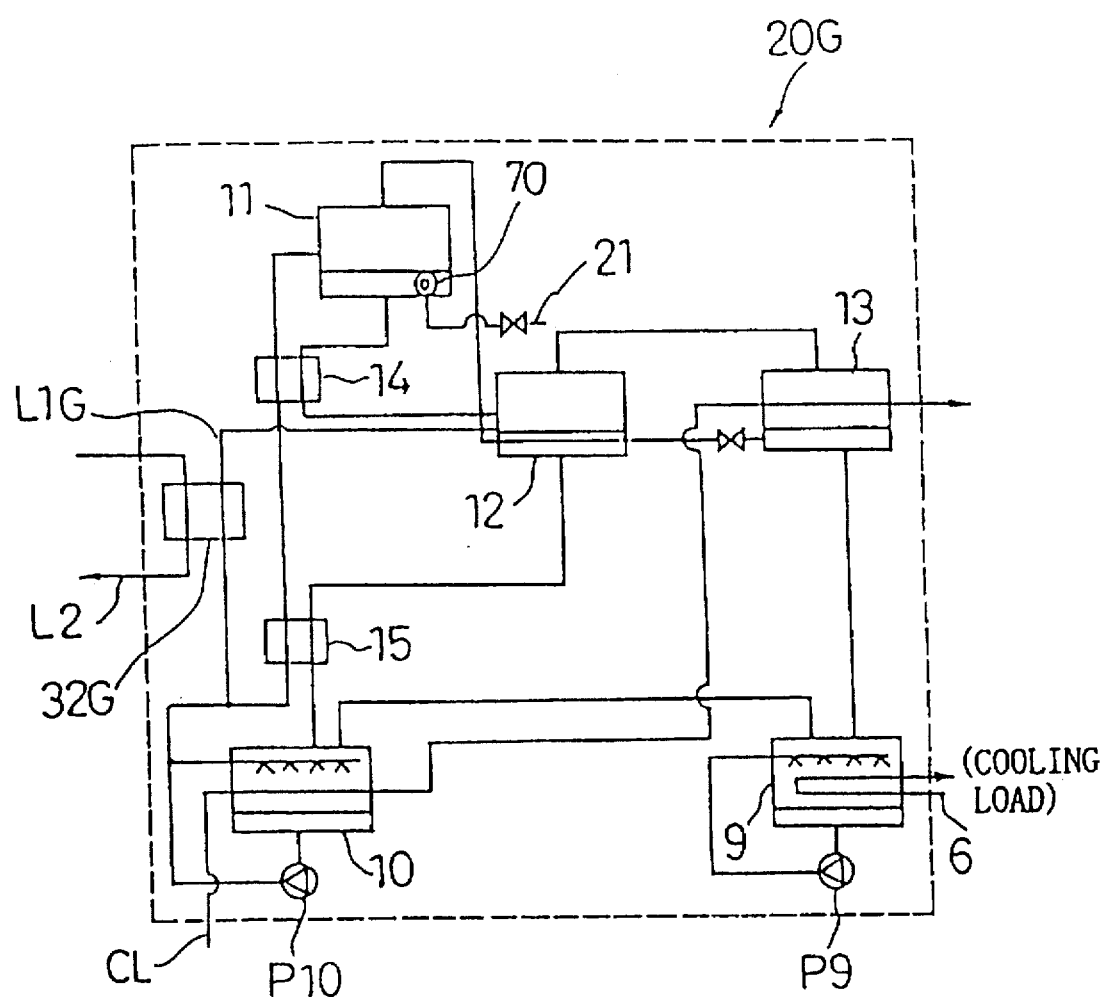
FIG. 13 is a block diagram of an absorption cool-warm water machine or the absorption refrigerating machine that differs from FIG. 6 to FIG. 12.
Figure 14:
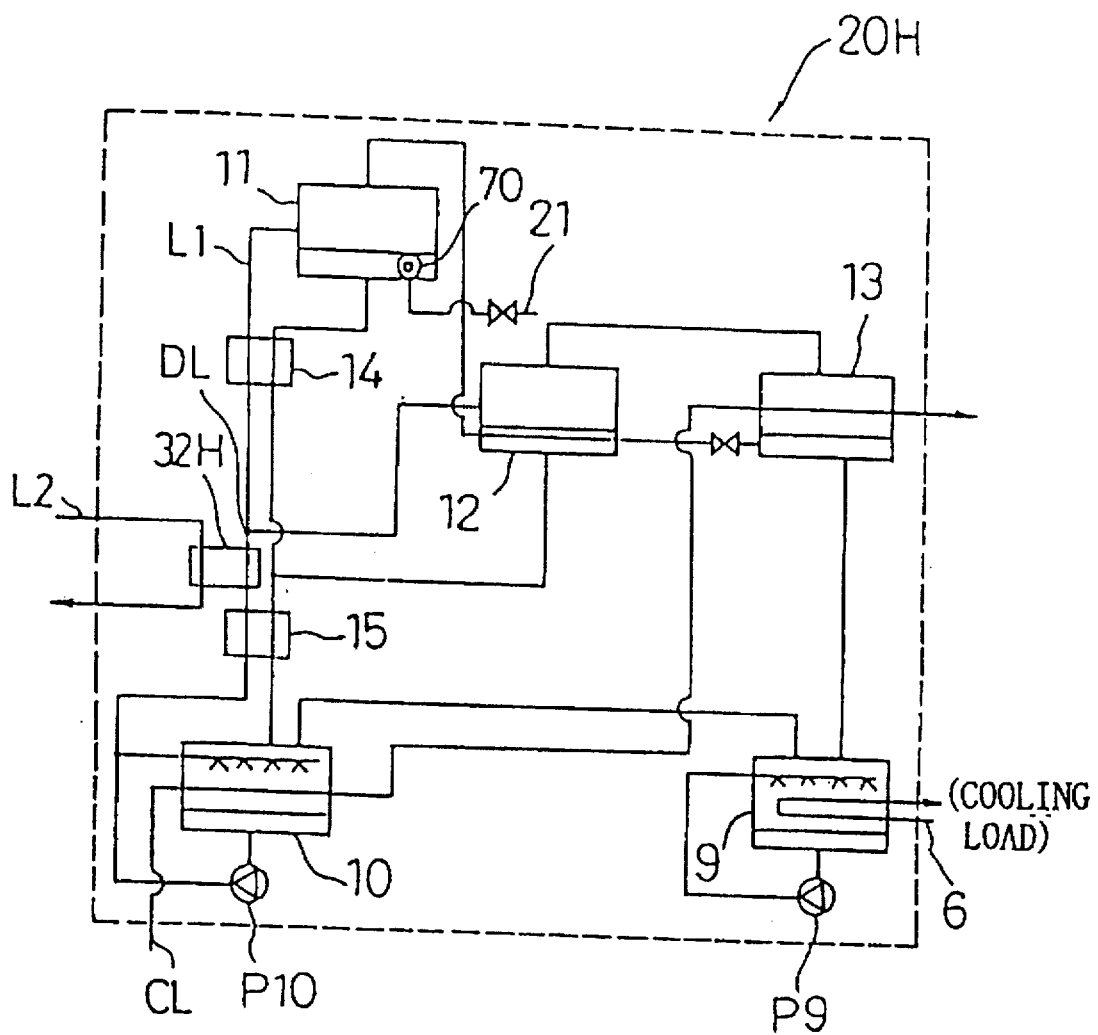
FIG. 14 is a block diagram of an absorption cool-warm water machine or the absorption refrigerating machine that differs from FIG. 6 to FIG. 13.
Figure 15:
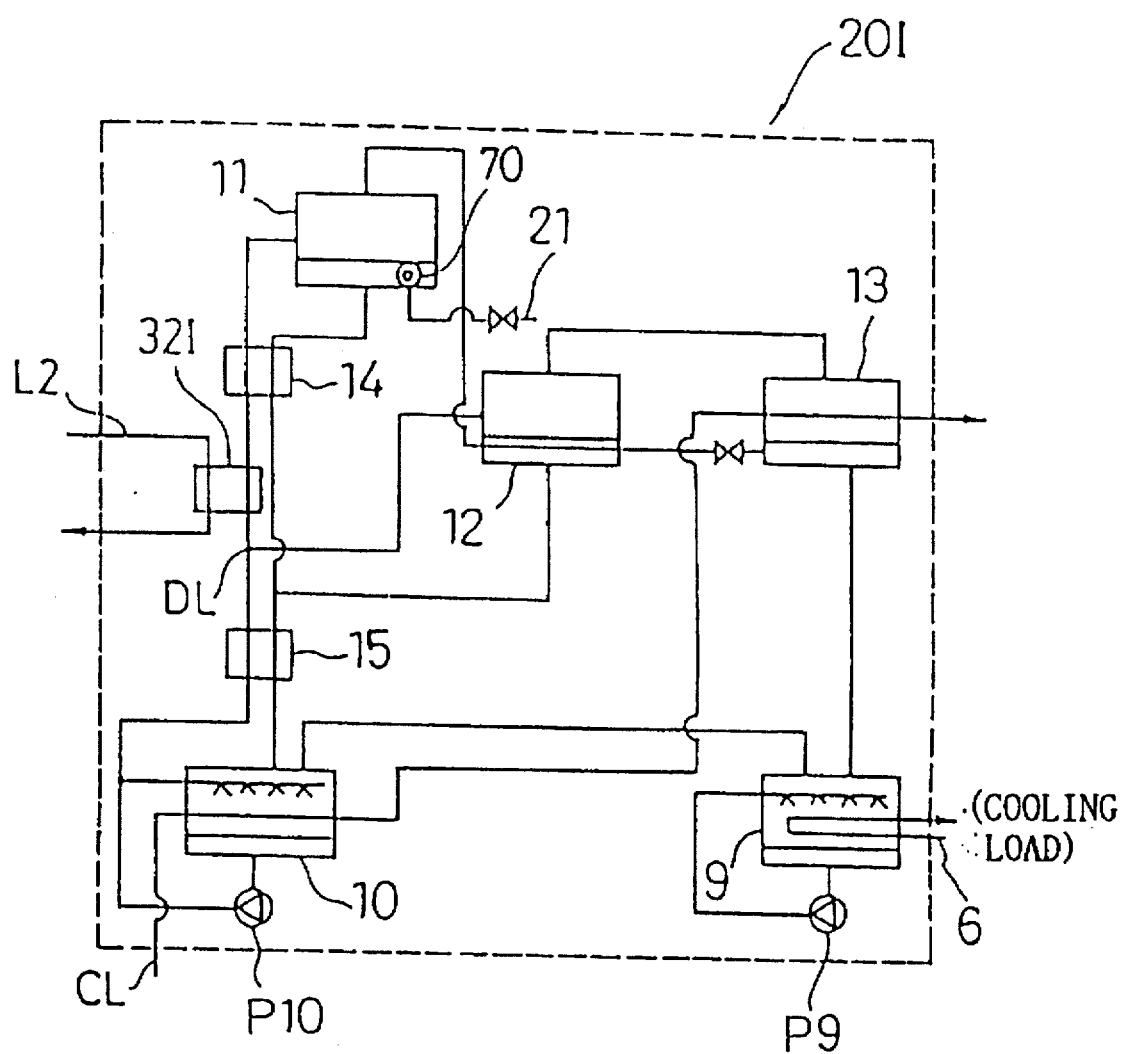
FIG. 15 is a block diagram of an absorption cool-warm water machine or the absorption refrigerating machine that differs from FIG. 6 to FIG. 14.
Figure 16:
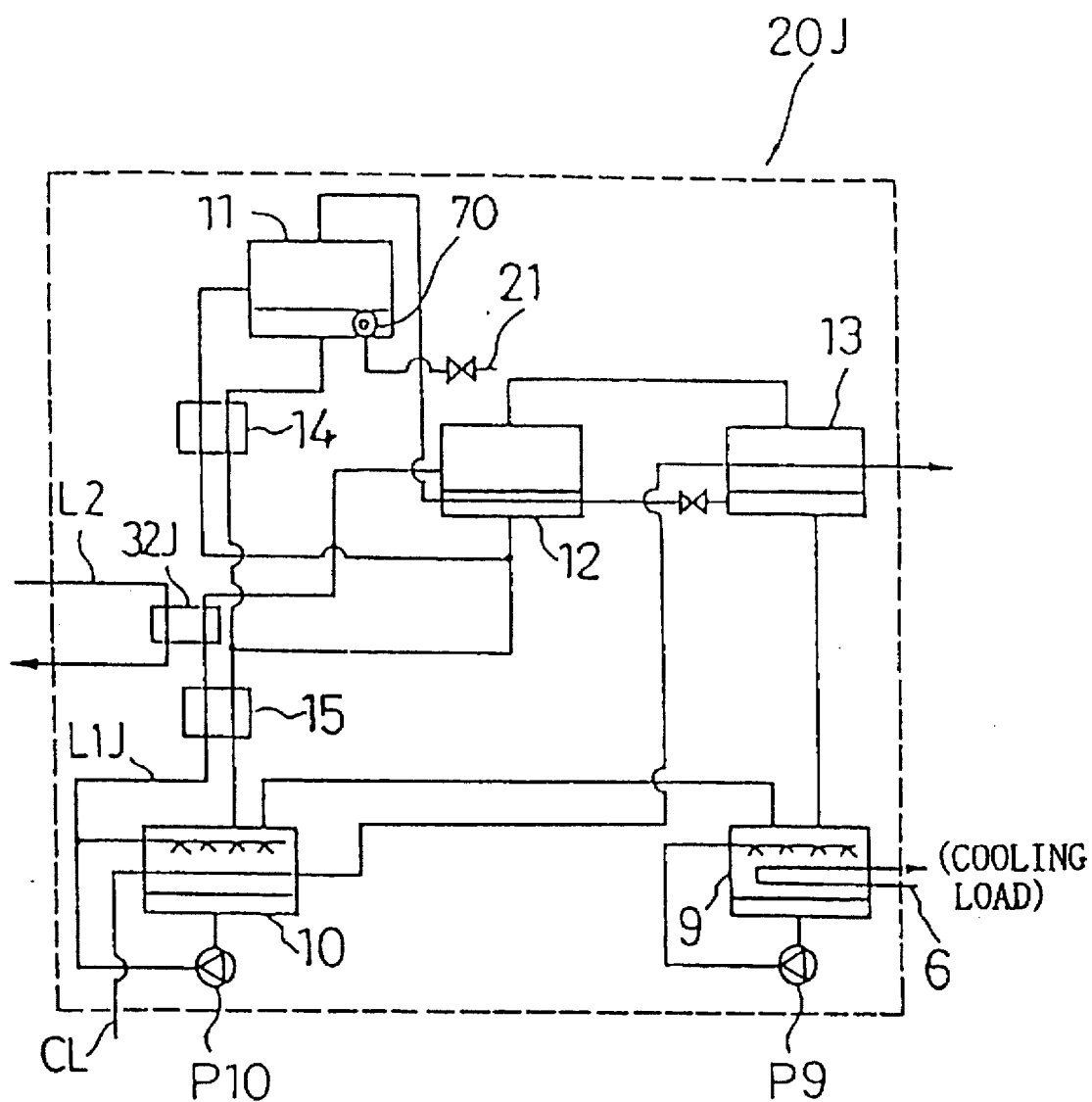
FIG. 16 is a block diagram of an absorption cool-warm water machine or the absorption refrigerating machine that differs from FIG. 6 to FIG. 15.
Figure 17:
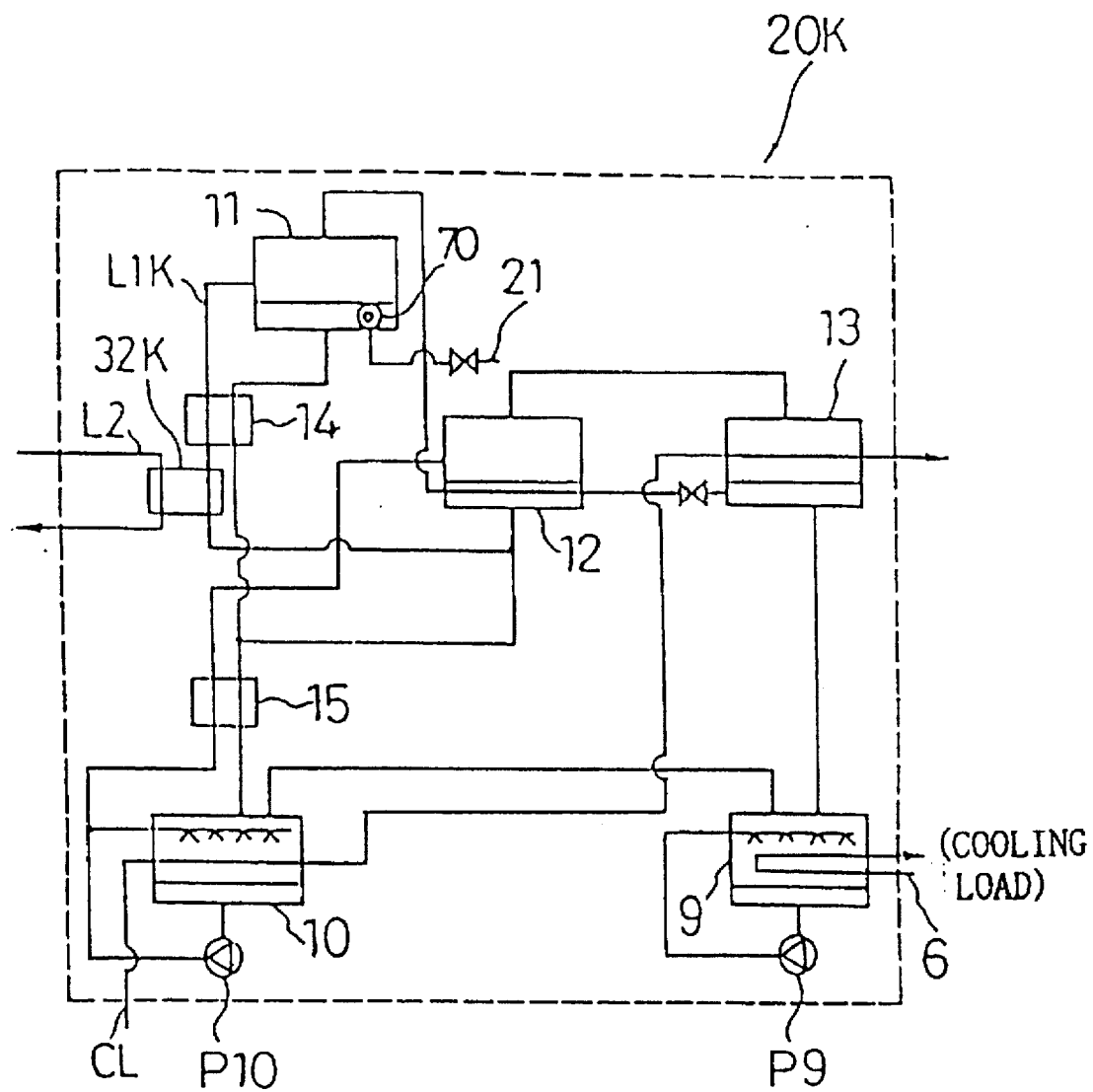
FIG. 17 is a block diagram of an absorption cool-warm water machine or the absorption refrigerating machine that differs from FIG. 6 to FIG. 16.

FIG. 4 and FIG. 5 show a second embodiment according to the present invention. In FIG. 4, a temperature detecting means (a temperature sensor) 60 for detecting a temperature of the warm exhaust-water TH is provided in the exhaust-heat line L2, in which the output from the temperature sensor 60 is inputted through a signal transmitting line SL5 to the control means 50. The other structure is the same as FIG.

Describing the operation of the second embodiment with reference to FIG. 5, after the operation switch or the reset switch of the absorption cool-warm water machine 20 (20A–20K) becomes ON (Step S1), the temperature of the warm exhaust-water TH is detected by the temperature sensor 60 (Step S22), and the detected temperature is determined to be higher or lower than a predetermined value (it is defined by providing the condition and various specifications of the machine according to the situation) (Step S23). When the temperature of the warm exhaust-water TH is higher than the set value, the exhaust-heat is fed as an exhaust-heat utility to the side of the absorption cool-warm water machine (in a flow corresponding to the temperature of the warm exhaust-water TH ) (Step S24), and when the temperature of the warm exhaust-water TH is lower than the set value, the exhaust-heat bypasses the absorption cool-warm water machine. (Step S25). Incidentally, the control routine below Step S3 is the same as the control routine described in FIG. 2, so that the explanation will be omitted.

FIG. 6 to FIG. 17 respectively show the absorption cool-warm water machines (an absorption refrigerating machine) 20, 20A to 20K.

The absorption cool-warm water machines 20, 20A to 20K include a vaporizer 9, an absorber 10, a high-temperature regenerator 11, a low-temperature regenerator 12, a condenser 13, a high-temperature solution heat-exchanger 14, a low-temperature solution heat-exchanger 15, a refrigerant pump P9, a solution pump P10, and various lines to mutually connect with each part, in which cool water is fed through a cool water circulation line to a cooling load (not shown). A cooling water circulation line CL is provided in order to feed cooling water to the absorber 10 and the condenser 13, in which the cooling water cooled in a cooling tower (not shown) is circulated therein. A numeral 21 shows a fuel line in order to feed the high-quality fuel to a heating means by way of the high-quality fuel of the high-temperature regenerator 11.

Here, a tube route L1 between the high-temperature solution heat-exchanger 14 and the low-temperature solution heat-exchanger 15 defines composes a light solution line (which will be described as "the light solution line" below) of absorbent to include the high-temperature solution heat-exchanger and the low-temperature solution heat-exchanger. The heatexchangers for warm-temperature source 32, 32A–32K are connected together with the light solution line L1 in order to exchange heat between the warm exhaust-water flowing in the branch route L2 and the absorbent light solution flowing in the light solution line. In other words, by the heat-exchanger for warm-temperature source 32, the heating value, which is held in the warm exhaust-water or steam having 40° C to 120 ° C, is transmitted to the absorbent light solution flowing in the light solution line L1.

In FIGS. 6–17, a member indicated by a numeral 70 is combustion burner for high-temperature regenerator.

The other embodiments shown in FIG. 18 to FIG. 22 will be explained.

Figure 18:
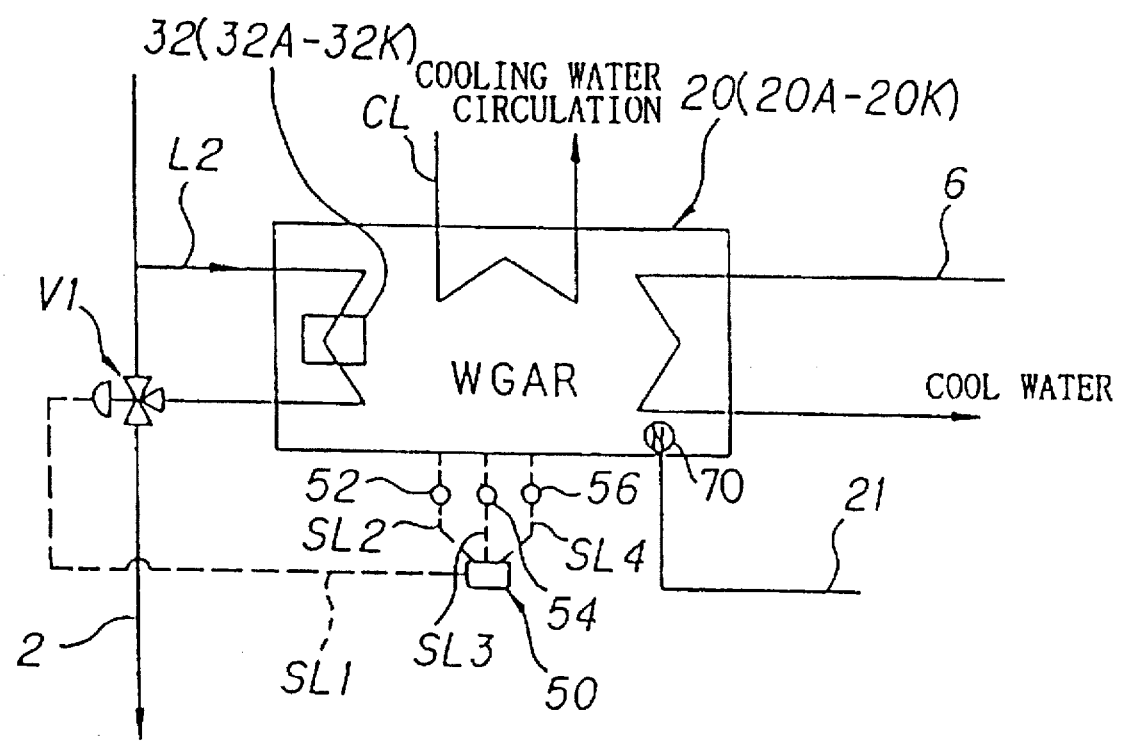
FIG. 18 is a block diagram of another embodiment according to the present invention.

FIG. 18 shows another embodiment differing from FIG. 1 to FIG. 17. A numeral 20 (20A–20K) indicates the entire absorption cool-warm water machine. The absorption cool-warm water machine 20 (20A–20K) will be set forth be In order to feed the exhaust-heat from the exhaust-heat line 2 to the absorption cool-warm water machine 20 (20A–20K), the exhaust-heat charge line L2, on which the heat exchanger 32 (32A–32K) is jointly connected thereon to feed the heating value which has the fluid has to the absorbent solution flowing in the exhaust-heat utility system of the absorption cool-warm water machine 20.

In the embodiment of FIG. 18, the adjustable three-way valve V1 is provided as a branching means at a confluent point of the exhaust-heat line 2 and the exhaust-heat charge line L2, in which the control signal for opening the valve is transferred from the control means 50 through the signal transmitting line SL1 to the three-way valve V1. The control means 50 is inputted with interruption signals of a combustion burner and the solution pump (not shown in FIG. 18) in the absorption cool-warm water machine 20 (20A–20K), the switch OFF signal for the operation of the absorption cool-warm water machine, the unusual operation signal, and so on, from respective sensors 52, 54 and 56 through signal transmitting lines SL2, SL3 and SL4.

In FIG. 18, a numeral 21 shows a fuel line of the high-quality fuel system, and a numeral 70 shows the combustion burner.

Next, the action of the illustrated embodiment will be explained with reference to FIG. 19 and FIG. 20.

Switching ON the operation switch or the reset switch of the absorption cool-warm water machine 20 (20A–20K) (Step S1 in FIG. 19), the operation of the absorption cool-warm water machine in FIG. 18 starts. The directional flow of the three-way valve V1 is defined to feed warm exhaust-water in the exhaust-heat line L2 to the side of the absorption cool-warm water machine 20 (20A–20K) (Step S2).

In the operation of the absorption cool-warm water machine 20 (20A–20K), the sensors 52, 54 and 56 always judge whether the combustion burner interrupts or not during the operation of the absorption cool-warm water machine 20 (20A–20K) (Step S3). If the signal is not outputted, the state of Step S2 is continued (from the NO loop in Step S3).

On the other hand, when a signal for interrupting the combustion burner is outputted (YES in Step S3), the signal is sensed which is continuously inputted by more than the predetermined time (Step S4). Here, a phrase, "a predetermined time," means a time in which the solution remained in the heat exchanger 32 (32A–32K) is not condensed in more than a constant density, but the aforementioned time and "a constant density" are different by, for example, the condition of providing the absorption cool-warm water machine and various specifications. That is, the aforementioned "predetermined time" is a constant including zero according to the situation.

If the signal used for interrupting the combustion burner is released before the predetermined time passes, the solution which remains in the heat exchanger 32 (32A–32K) will not be condensed, so that the operation of the absorption cool-warm water machine is continued as it is (from the NO loop in Step S4). Whereas, when the signal used for interrupting the combustion burner is not released after the predetermined time passes (from the YES loop in Step S4), it is still possible for the solution which remains in the heat exchanger 32 (32A–32K) to be condensed. Therefore, a necessary process takes place to interrupt the charge of the exhaust-heat. Specifically, the three-way valve V1 is changed to the side of a bypass (Step S5), fluid (e.g., warm exhaust-water) flowing in the exhaust-heat line 2 is redirected to be flow away from the heat exchanger 32 (32A–32K).

The operation of the combustion burner is sensed to determine whether it is resumed or not (Step S6), and when the signal of interrupting the solution pump is being outputted as it is (NO in Step S6), the state, in which the warm exhaust-water flowing in the exhaust-heat line 2 is not fed into the heat exchanger 32 (32A–32K), is continued (a state of Step S5). However, stopping the output of the signal for interrupting the combustion burner, when the operation of the solution pump is resumed (YES in Step S6), the opening direction of the three-way valve V1 is changed in order to feed the warm exhaust-water in the exhaust-heat line L2 to the side of the absorption cool-warm water machine 20 (20A–20K) again (Step S2).

Figure 19:
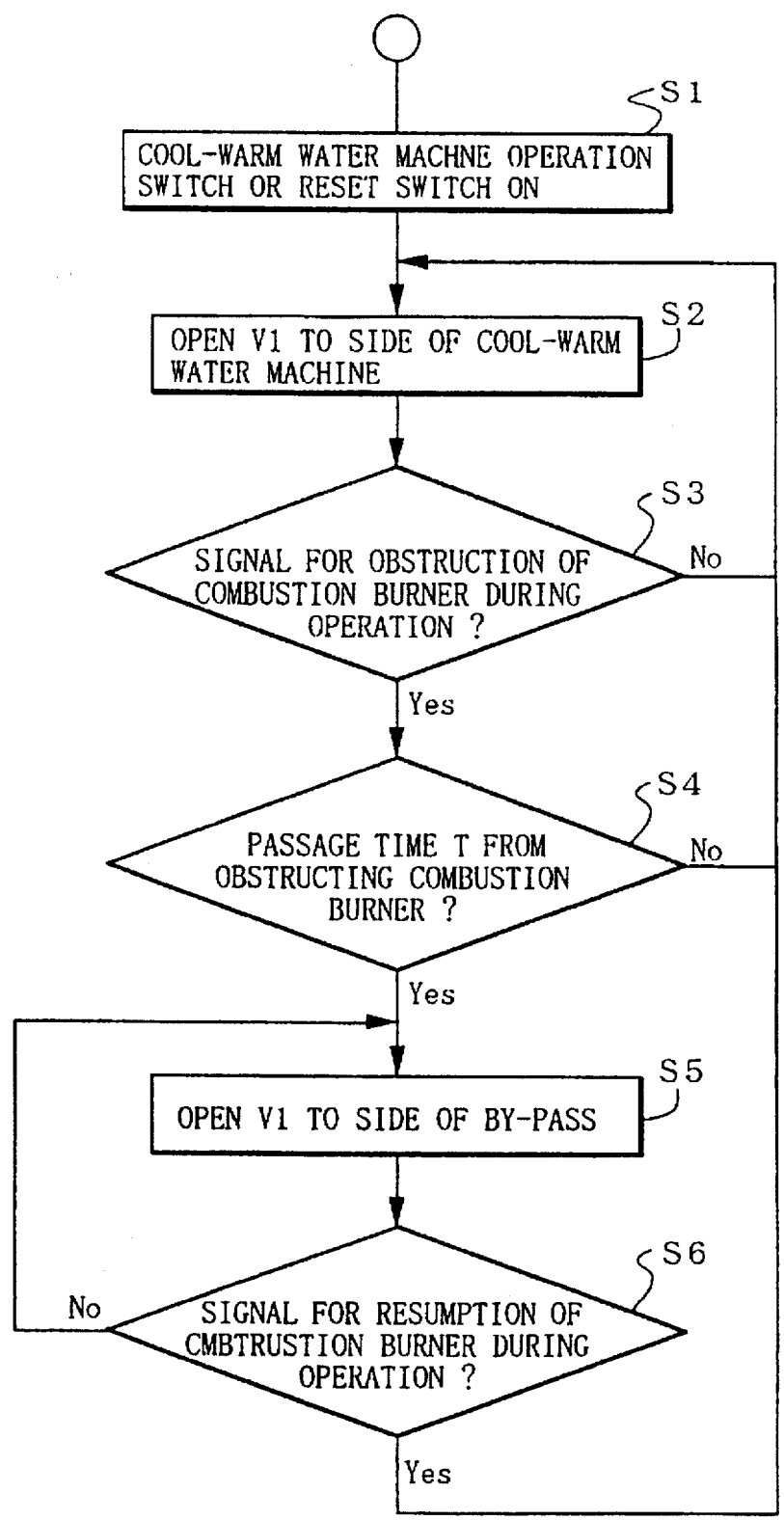
FIG. 19 is a flow chart showing control of the embodiment of FIG. 18.
Figure 20:
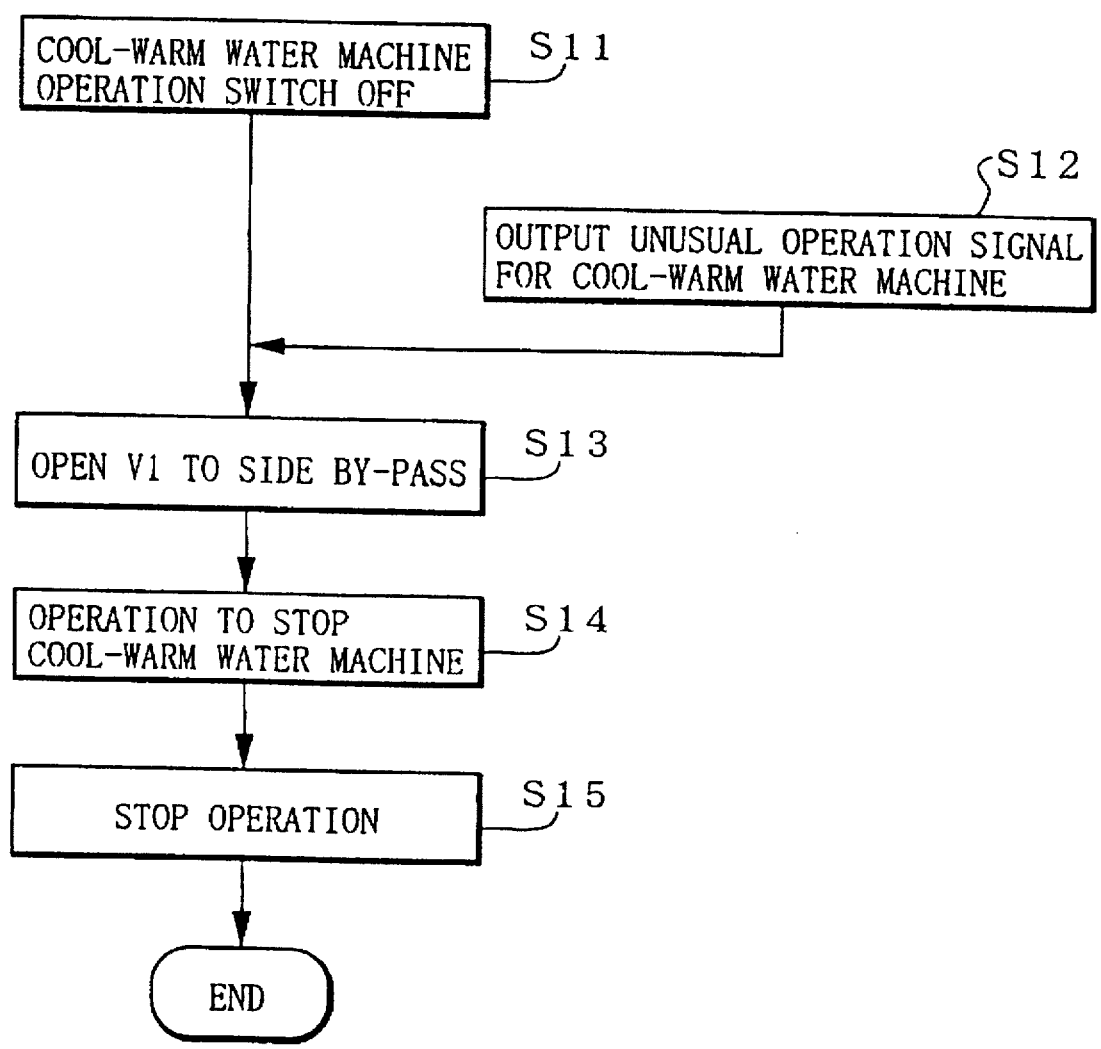
FIG. 20 is a flow chart showing control of the embodiment of FIG. 18, in which the control is different from the control shown in FIG. 19.

In addition to a control routine during the normal operation shown in FIG. 19, control as shown in FIG. 20 is carried out when the operation is stopped. When it is detected by the sensors 52, 54 and 56 that the operation switch of the absorption cool-warm water machine 20 (20A–20K) assumes an OFF state (output of an operation interruption signal) or an unusual situation occurs during the operation (output of the unusual operation signal) (Step S11 or S12 in FIG. 20), the three-way valve V1 is changed to the side of the bypass (Step S13). Thereupon, fluid (e.g., the warm exhaust-water) flowing along the exhaust-heat line 2 is not to be charged, whereby there is no disadvantage as to condensation or crystallizing of the solution in the inner heat exchanger.

After that, the process for stopping the operation of the cool-warm water machine 20 (20A-20K) takes place (Step S14), and then the operation stops (Step S15).

Figure 21:
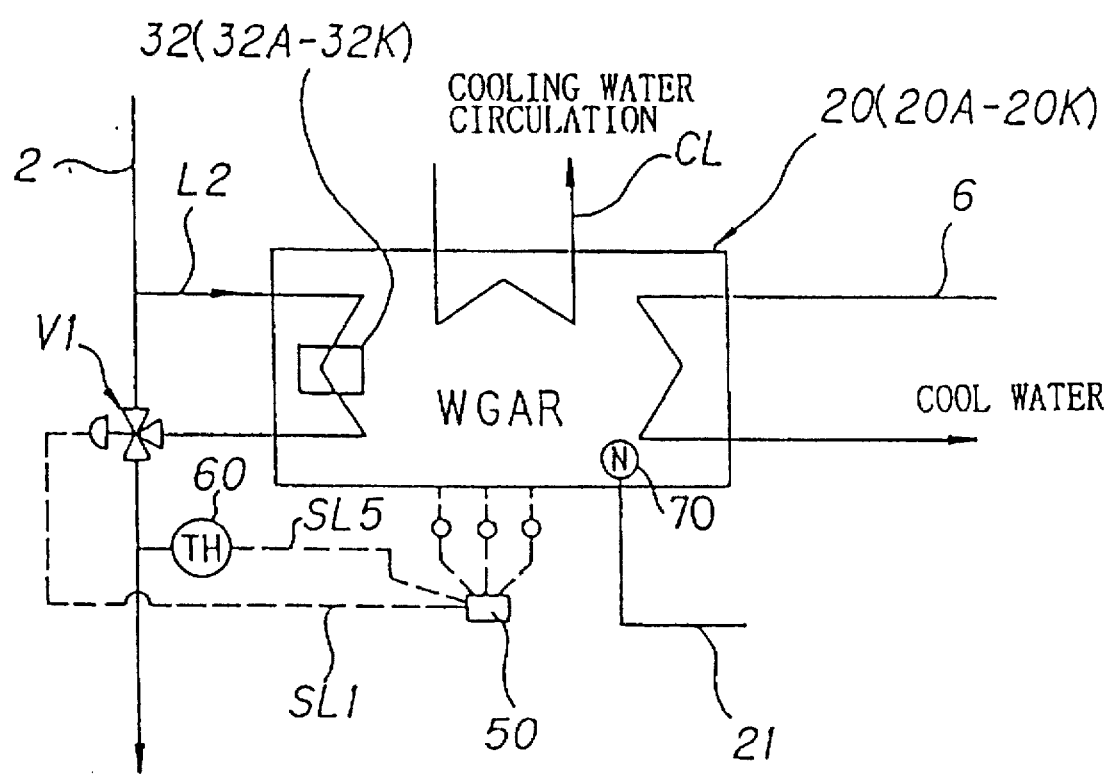
FIG. 21 is a block diagram of another embodiment different from FIG. 18 to FIG. 20.
Figure 22:
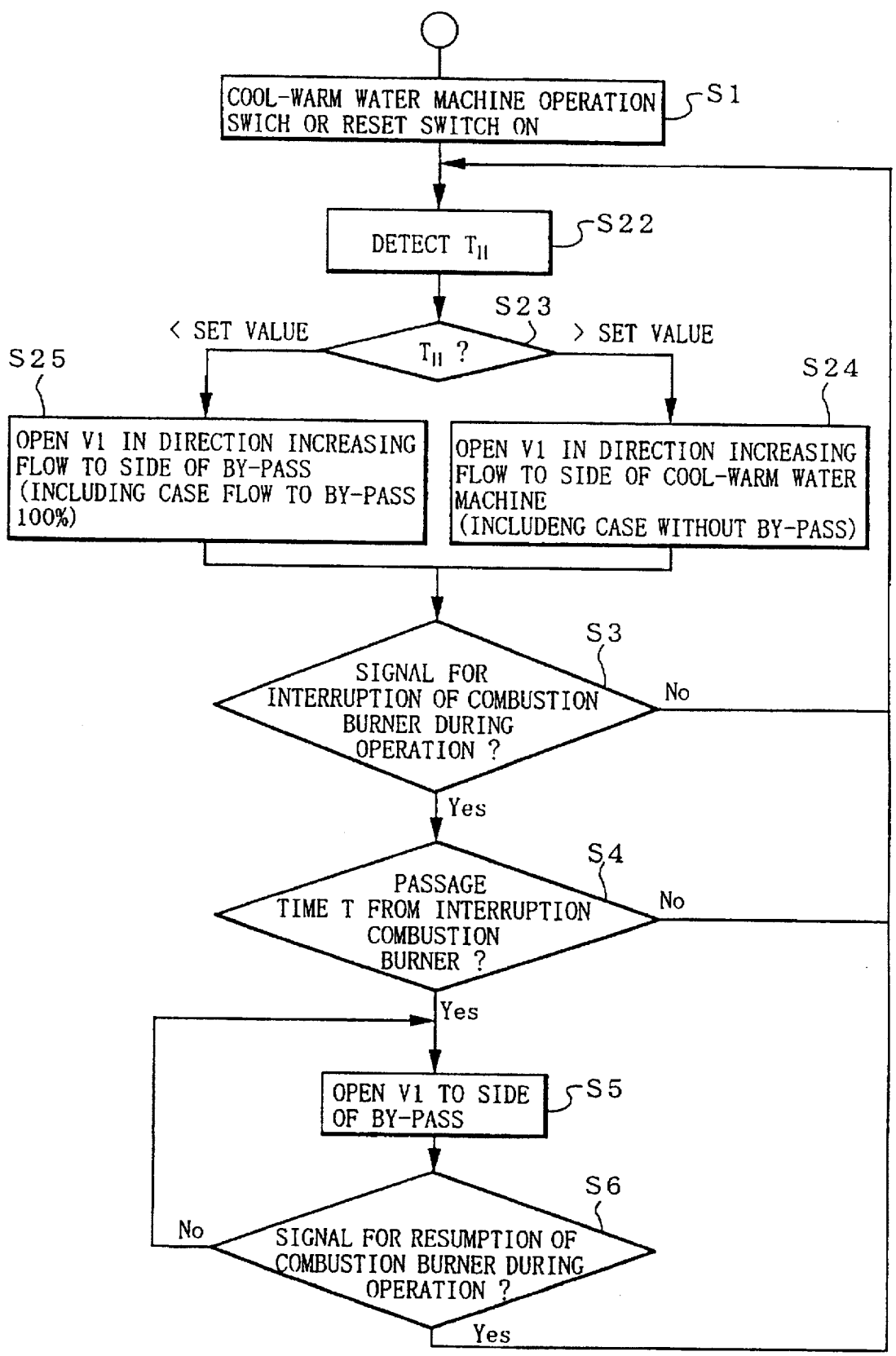
FIG. 22 is a flow chart showing control of the embodiment of FIG. 21.

FIG. 21 and FIG. 22 show another embodiment differing from FIG. 18 to FIG. 20. In FIG. 21, the temperature detecting means (the temperature sensor) 60 for detecting the temperature of the warm exhaust-water TH is provided in the exhaust-heat line L2, in which the output from the temperature sensor 60 is inputted through a signal transmitting line SL5 to the control means 50. The other structure is the same as FIG. 18.

Describing the operation of the embodiment shown in FIG. 21 and FIG. 22 with reference to FIG. 22, after the operation switch or the reset switch of the absorption cool-warm water machine 20 (20A-20K) becomes ON (Step S1), the temperature of the warm exhaust-water TH is detected by the temperature sensor 60 (Step S22), and the detected temperature is determined to be higher or lower than a predetermined value (it is defined by the set condition and various specifications of the machine according to the situation) (Step S23). When the temperature of the warm exhaust-water TH is higher than the set value, the exhaust-heat is fed as an exhaust-heat utility to the side of the absorption cool-warm water machine (in a flow corresponding to the temperature of the warm exhaust-water TH ) (Step S24), and when the temperature of the warm exhaust-water TH is lower than the set value, the exhaust-heat bypasses the absorption cool-warm water machine (Step S25). The control routine below Step S3 is the same as the control routine described in FIG. 19, so that the explanation will be omitted.

Further embodiments shown in FIG. 23 to FIG. 26 will be explained below.

Figure 23:
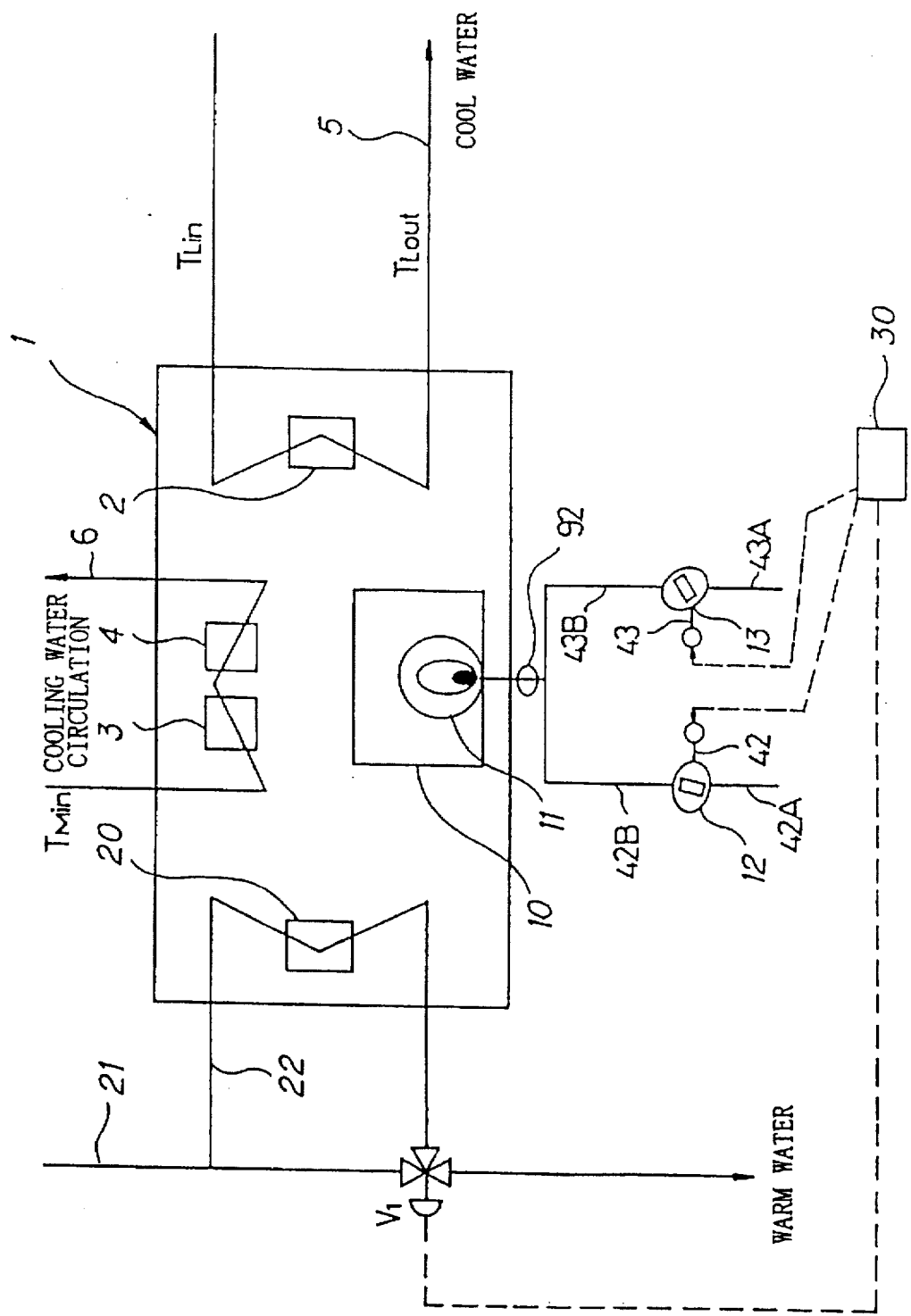
FIG. 23 is a block diagram of an additional embodiment according to the present invention.

In FIG. 23, a throttle valve for adjusting high-quality fuel 12 and a throttle valve for adjusting combustion air 13 are provided to the burner for combustion of the high-quality fuel 11, in which a supremum limiter for the opening degree of the throttle 42 for the throttle valve for adjusting high-quality fuel 12 and a supremum limiter for the opening degree of the throttle 44 for the throttle valve for adjusting combustion air 13 are respectively provided at upstream sides of the throttle valves 12 and 13. But these supremum limiters for the opening degree of the throttle 42 and 44 for the throttle valves 12 and 13 are provided not only at the positions of respective throttle as they can be provided at positions illustrated with numerals 42A and 43A located on the upstream side of the throttle in the drawing, at positions illustrated with numerals 42B and 43B located on the downstream side of the throttle or at a position illustrated with a numeral 92.

The throttle valves 12 and 13 are connected through signal transmitting lines illustrated with dotted lines in FIG. 23 to a control system 30 to receive control signals from the control system. The control system 30 is adapted to be outputted with an opening signal from a three-way valve opening state detection means (not shown in FIG. 23) of the three-way valve V1 through the signal transmitting line.

Figure 24:
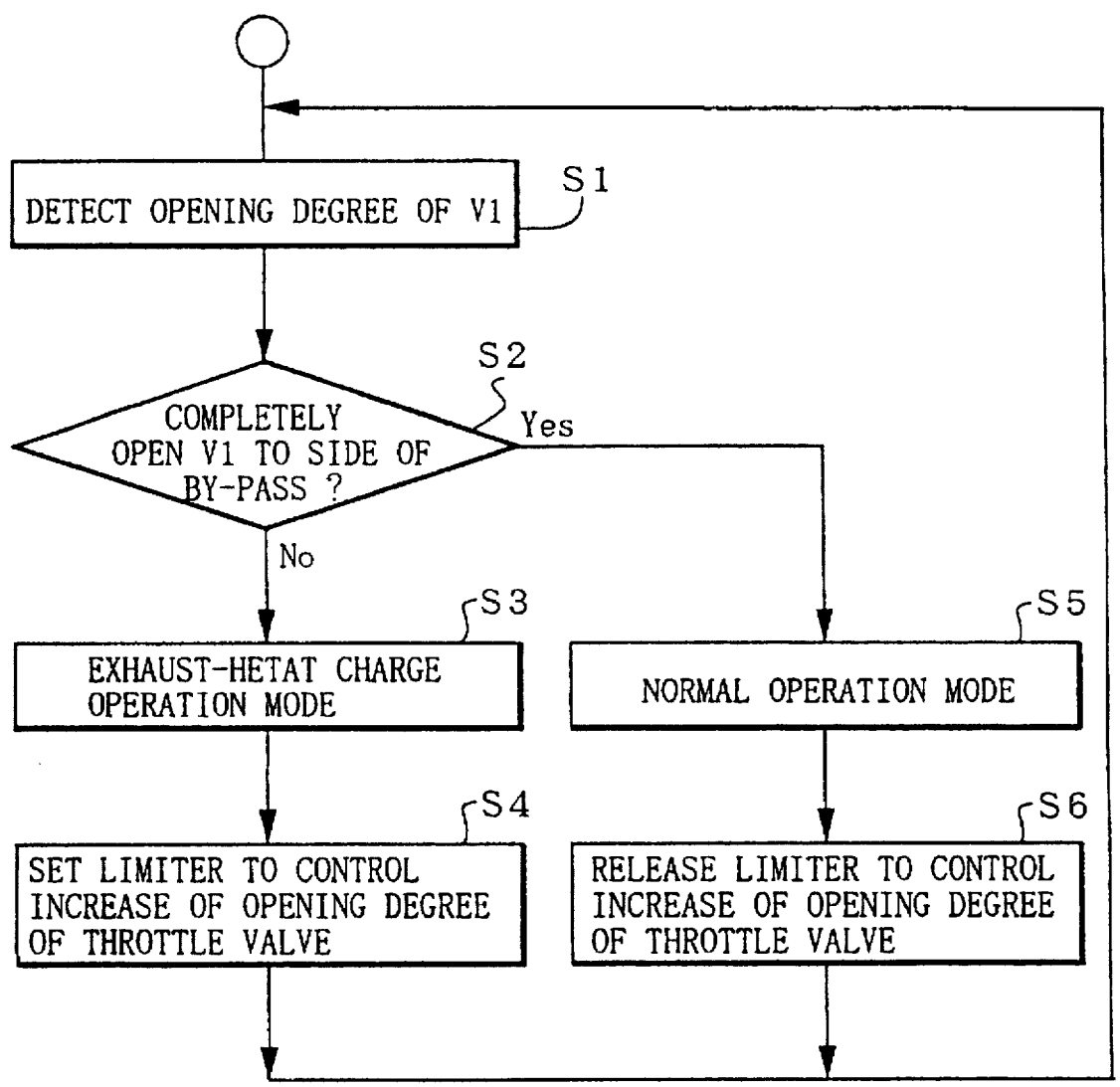
FIG. 24 is a flow chart showing control of FIG. 23.

The action of the embodiment shown in FIG. 23 will be explained below with reference to FIG. 24.

The directional flow of the three-way valve V1 is detected by the three-way valve opening state detection means (not shown) (Step S1). Here, in the embodiment shown in FIG. 23 and FIG. 24, the state in which the warm exhaust-water flowing in an exhaust-heat line 21 is not completely charged to an exhaust-heat charge line 22 or the side of a cool-warm water machine 1, namely, the state in which the three-way valve V1 is opened fully to the side of the bypass is judged as "a normal operation mode", and the state in which the warm exhaust-water, regardless of the amount of the flow, is fed to the cool-warm water machine 1 is judged as "an exhaust-heat charge operation mode". Therefore, in Step S2, it is only determined whether the three-way valve is completely opened to the side of the bypass or not. When the three-way valve is not completely opened to the side of the bypass (NO in Step S2), the exhaust-heat charge operation mode is selected (Step S3), and when the three-way valve is completely opened to the side of the bypass (Yes in Step S2), the normal operation mode is selected (Step S5).

When the exhaust-heat charge operation mode is selected (Step S3), the burner for combustion of the high-quality fuel is not to operate at 100%, but is used to control the operation at a level in response to the particular load rather than the load that is assigned to the charged exhaust-heat, and in order to prevent spread of the corrosion caused by the increasing temperature in the high-temperature regenerator, the degree the throttle valves 12 and 13 are opened is arranged not to be larger than the predetermined value by setting the supremum limiter for the opening degree of the throttle 42 and 43 (Step S4). And, when the normal operation mode is selected (Step S5), "the spread of the corrosion caused by the increasing temperature in the high-temperature regenerator" need not needed to be considered although the burner for combustion of the high-quality fuel is operated at 1.00%, whereby the supremum limiter for the opening degree of the throttle 42 and 43 is released (Step S6).

Figure 25:
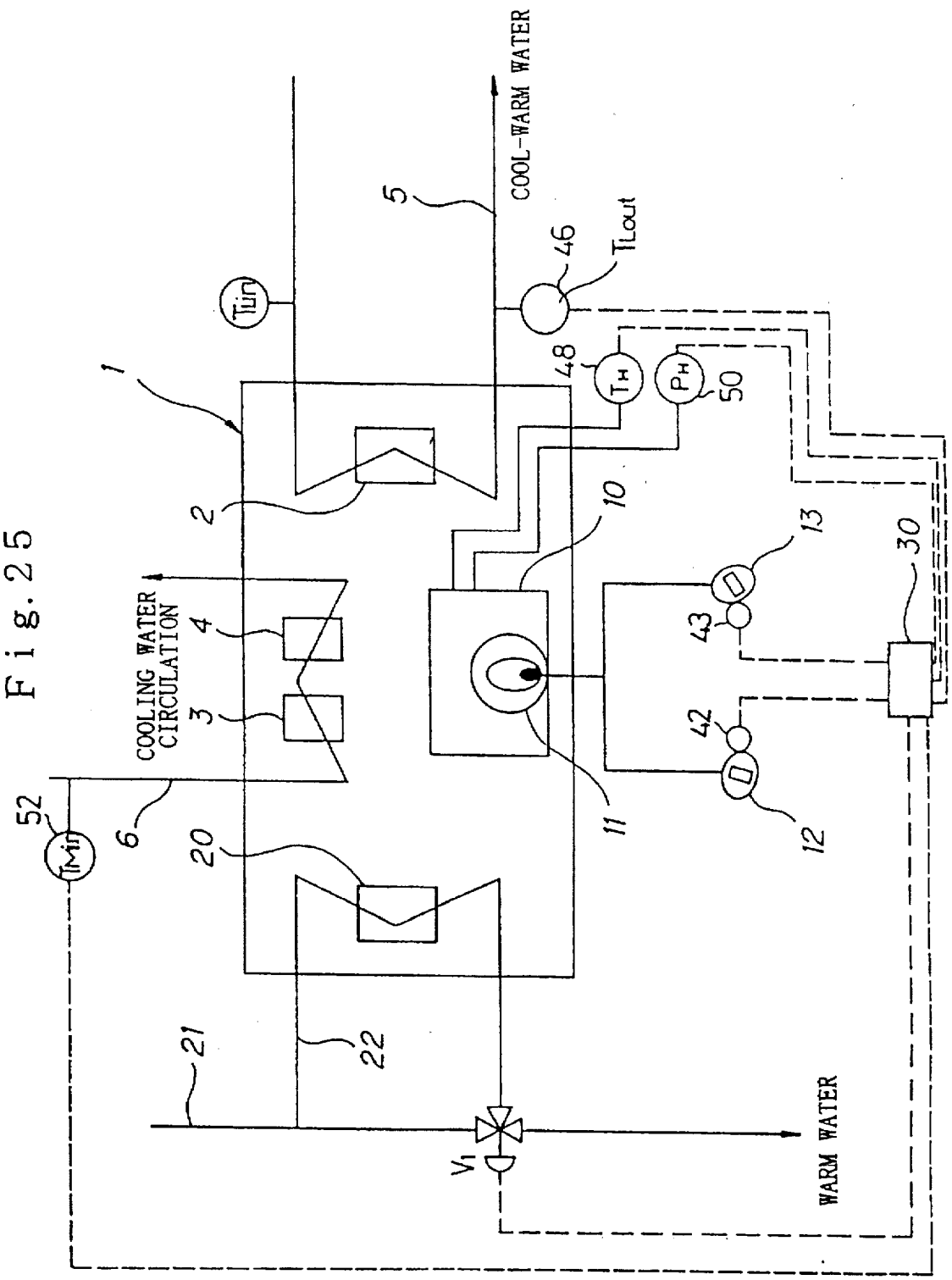
FIG. 25 is a block diagram of another embodiment differing from FIG. 23 and FIG. 24.
Figure 26:
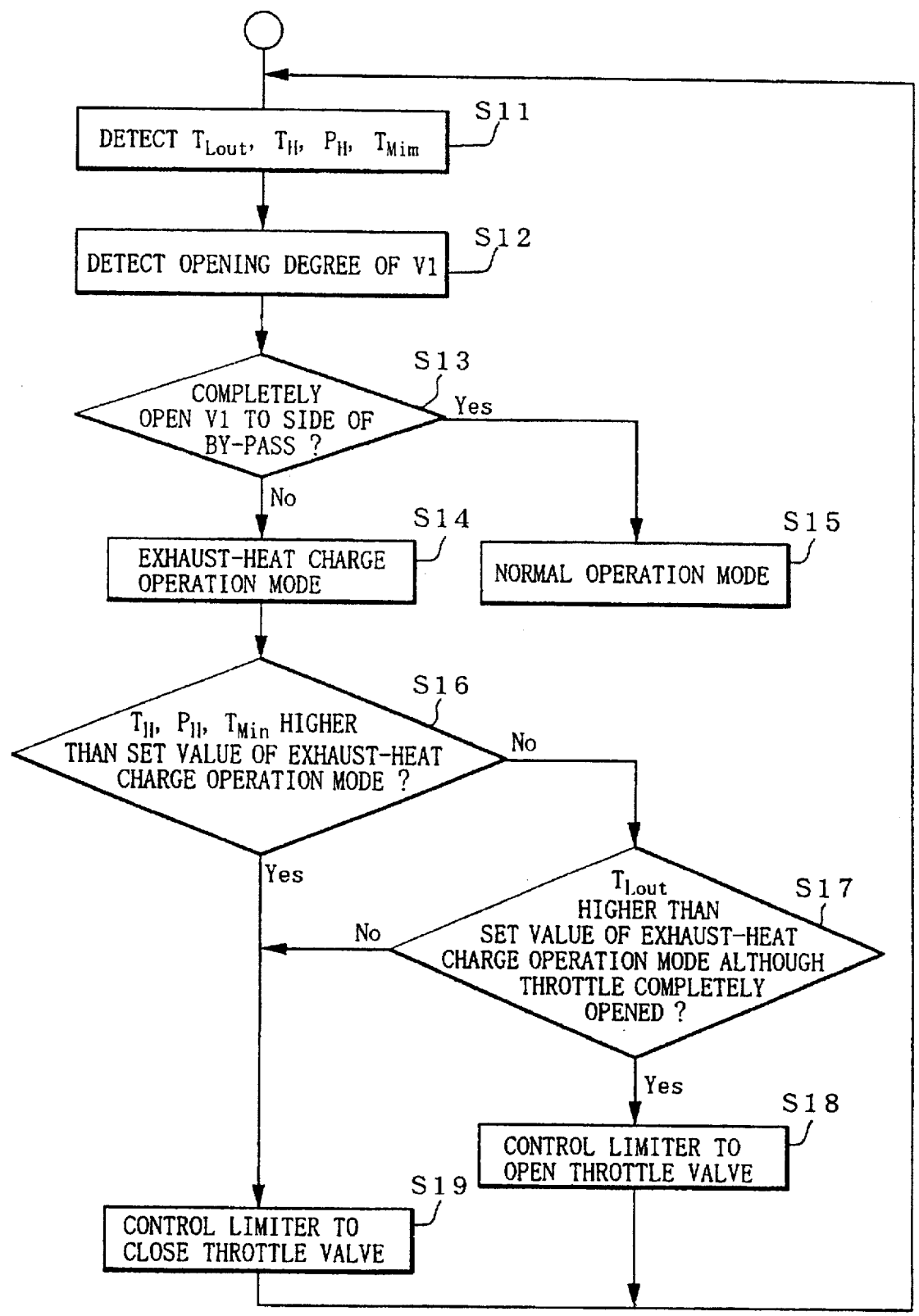
FIG. 26 is a flow chart showing control of FIG. 25.

Next, an even further embodiment will be explained with reference to FIG. 25 and FIG. 26.

A cool-warm water circulation line exit-temperature detection means 46 detecting an exit-temperature $T_{Lout}$ of a cool-warm water circulation line 5 is provided along the cool-warm water circulation line 5. A high-temperature regenerator temperature detection means 48 detecting the temperature TH of the high-temperature regenerator and a high-temperature regenerator pressure detection means 50 detecting the pressure PH are provided to the high-temperature regenerator 10. A cooling water line entrance-temperature detection means 52 detecting an entrance-temperature $T_{Min}$ is provided along a cooling water circulation line 6. The detected result by the aforementioned detection means 46, 48, 50 and 52 is transmitted through the signal transmitting lines illustrated with dotted lines in FIG. 25 to the control system 30.

The action of the aforementioned embodiment will be explained with reference to FIG. 26.

The aforementioned detecting means 46, 48, 50 and 52 respectively detect the exit-temperature $T_{Lout}$ of the cool-warm water circulation line 5, the temperature TH of the high-temperature regenerator 10, the pressure PH of the high-temperature regenerator 10 and the entrance-temperature $T_{Min}$ of the cooling water circulation line 6 to transmit to the control system 30 (Step 11).

The directional flow of the three-way valve V1 is detected, and the detected result is outputted to the control system 30 (Step S12). The control system 30 judges whether the three-way valve V1 is completely opened to the side for bypassing an exhaust-heat heat-exchanger 20 or not (Step S13).

When Step S13 is NO, that is, the three-way vale V1 is opened to the exhaust-heat heat-exchanger 20, the exhaust-heat charge operation mode is selected (Step S14). On the other hand, when Step S13 is YES, that is, the three-way valve V1 is opened to the side for bypassing the exhaust-heat heat-exchanger 20, the normal operation mode, namely, the gas-firing operation mode is selected (Step S15).

In the exhaust-heat charge operation mode (Step S14), the control system 30 judges whether the temperature $T_H$ of the high-temperature regenerator 10, the pressure $P_H$ of the high-temperature regenerator 10 and the entrance-temperature $T_{Min}$ of the cooling water circulation line 6 which are detected in Step S11 are higher values than the set value of the exhaust-heat charge operation mode or not (Step S16). When the judged values are higher (YES in Step S16), the supremum limiters for the opening degree of the throttles 42 and 43 are controlled to cause the throttle valves 12 and 13 to redirect to close (Step S19).

On the other hand, when the temperature $T_H$ of the high-temperature regenerator 10, the pressure $P_H$ of the high-temperature regenerator 10 and the entrance-temperature $T_{Min}$ of the cooling water circulation line 6 are lower values than the set value of the exhaust-heat charge mode operation mode (NO in Step S16), the exit-temperature $T_L$ of the cool-warm water circulation line 5 is judged whether to be higher or lower than the set value (in this case, the set value of the exhaust-heat charge operation mode) (Step S17).

When the exit-temperature $T_{Lout}$ of the cool-warm water circulation line 5 is higher than the set value of the exhaust-heat charge operation mode (YES in Step S17), the supremum limiters for the opening degree of the throttles 42 and 43 are controlled to cause the throttle valves 12 and 13 to redirect to open (Step S18). And, when the exit-temperature $T_{Lout}$ is lower than the set value of the exhaust-heat charge operation mode (NO in Step S17), in Step S19, the supremum limiters for the opening degree of the throttles 42 and 43 are controlled to open the throttle valves 12 and 213.

In the normal operation (Step S15), the supremum limiter for the opening degree of the throttle is released, namely, in the state in which the supremum limiter for the opening degree of the throttle is at maximum, the operation is carried out by means of controlling the opening of the throttle.

Embodiments shown in FIG. 27 to FIG. 43 will be explained below.

Figure 27:
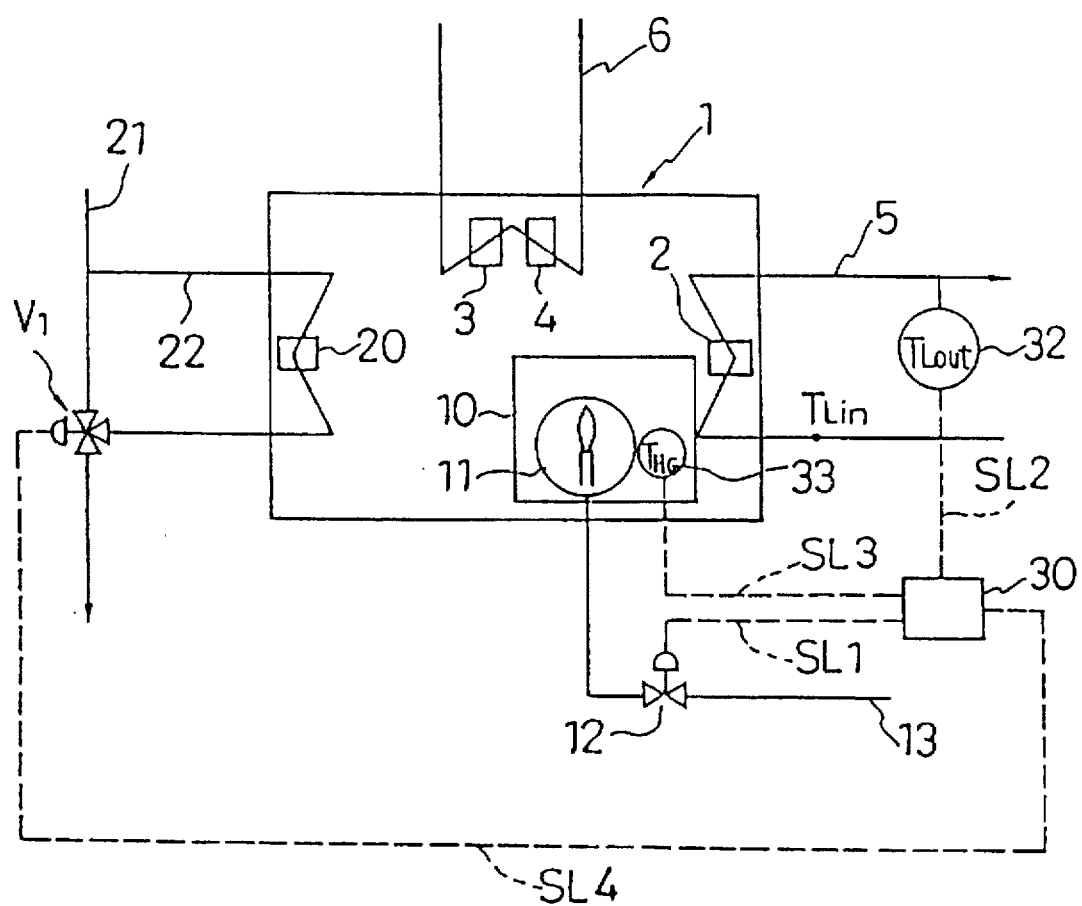
FIG. 27 is a block diagram of another embodiment according to the present invention.

In FIG. 27, in a tubing 13 feeding the high-quality fuel to the burner for combustion of the high-quality fuel 11, the throttle valve 12 as a fuel feeding control system adjusting the amount feeding the high-quality fuel is jointly connected. The throttle valve 12 is connected through the signal transmitting line SL1 to the control system 30, and further, the control system 30 is connected through the signal transmitting line SL1 and SL2 to, respectively, a temperature sensor 32 detecting the exit-temperature $T_{Lout}$ of the cool-warm water circulation line 5 and a temperature sensor 33 detecting the temperature $T_{HG}$ of the high-temperature regenerator 10.

The three-valve V1, which is capable of adjusting the opening degree or the flow and is provided at the confluent point of the exhaust-heat line 21 and the exhaust-heat charge line 22, is connected via the signal transmitting line SLA to the control system 30. The control system 30 judges to be in the normal operation when the three-way valve V1 completely bypasses the cool-warm water machine 1 or when the degree the three-way valve V1 is opened to the cool-warm water machine is zero, and judges to be in the exhaust-heat charge operation mode when the warm exhaust-water is fed to the cool-warm water machine 1 (regardless of the amount of the flow).

Next, action of the embodiment shown in FIG. 27 will be described with reference to FIG. 28.

The control system 30 detects the exit-temperature $T_{Lout}$ of the cool-warm water circulation line 5 and the temperature $T_{HG}$ of the high-temperature regenerator 10 (Step S1). Further, the directional flow of the three-way valve V is detected (Step S2), the control system 30 judges whether the absorption cool-warm water machine 1 is in the normal operation mode or in the exhaust-heat charge operation mode (Step S3). Here, if the three-way valve V1 completely opens to the side of the bypass (YES in Step S3), the normal operation mode is selected, but if the three-way valve V1 does not completely open to the side of the bypass (NO in Step S3), the exhaust-heat charge operation mode is selected (Step S4).

When the exhaust-heat charge operation mode is selected (Step S4), the temperature $T_{HG}$ of the high-temperature regenerator 10 and the defined threshold value or set value (in which there are two cases, the same as or differing between the normal operation mode and the exhaust-heat charge operation mode. It is decided by the situation. The same as above.) are mutually compared (Step S6), and when the temperature $T_{HG}$ of the high-temperature regenerator 10 is higher than the set value (YES in Step S6), the throttle valve 12 is controlled to redirect to close (Step S7). While, when the temperature $T_{HG}$ of the high-temperature regenerator 10 is lower than the set value (NO in Step S6), the exit-temperature $T_{Lout}$ of the cool-warm water circulation line 5 and the defined threshold value or set value are compared with one another (Step S8).

When the exit-temperature $T_{Lout}$ of the cool-warm water circulation line 5 is higher than the set value (YES in Step S8), the degree the throttle valve 12 is opened is controlled to redirect to open (Step S9). While, when the exit-temperature $T_{Lout}$ of the cool-warm water circulation line 5 is lower than the set value (NO in Step S8), the degree the throttle valve 12 is opened is controlled to redirect to close (Step S7).

Even when the three-way valve V1 is completely opened to the side of the bypass (YES in Step S3) and the normal operation mode is selected (Step S5), the temperature $T_{HG}$ of the high-temperature regenerator and the defined threshold value and set value are compared with one another (Step S10). And then processes of the aforementioned Step S7, S8, and S9 take place.

The following will repeat the processes from Step S1 to S10.

Figure 28:
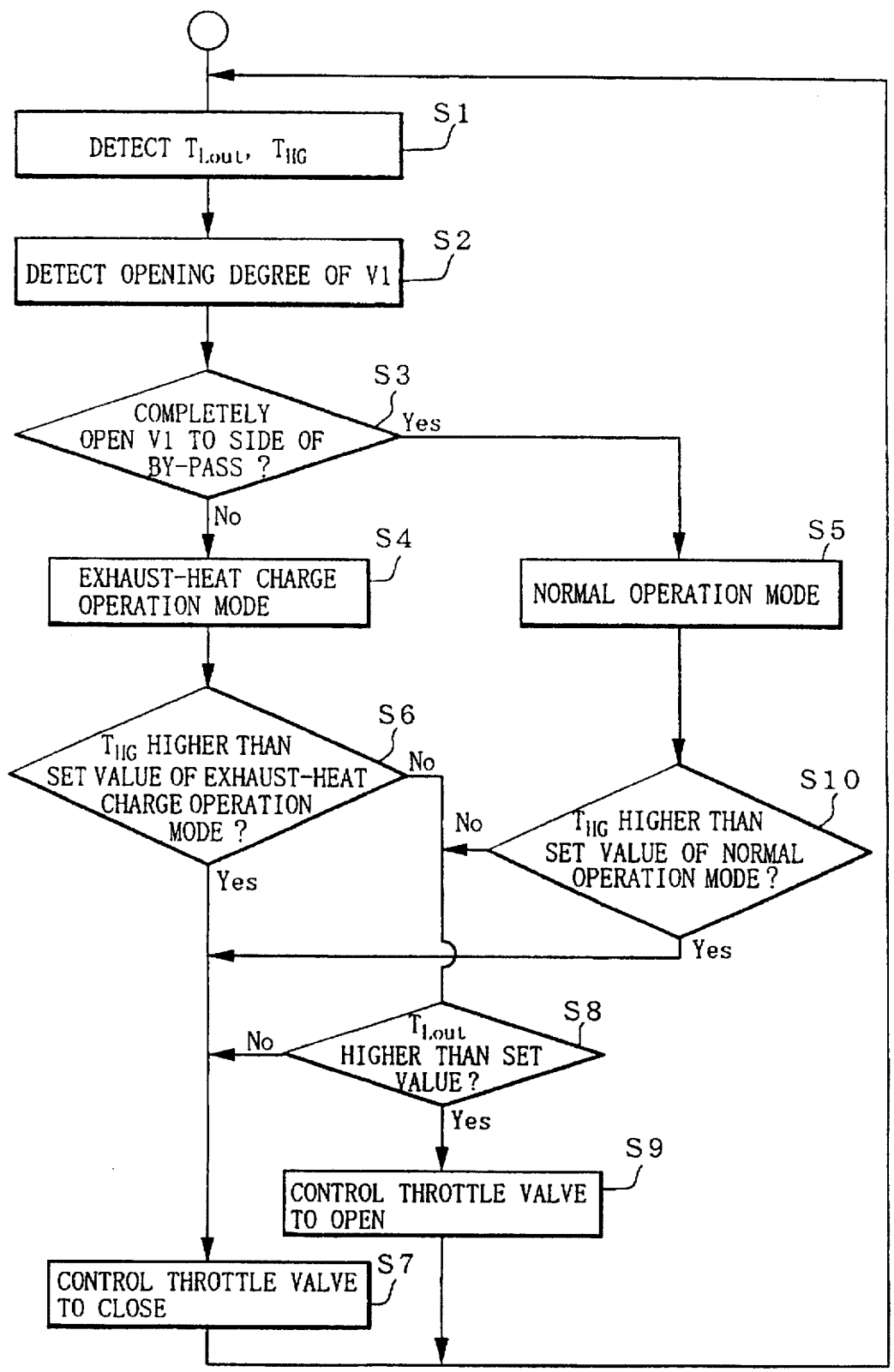
FIG. 28 is a flow chart showing control of FIG. 27.
Figure 29:
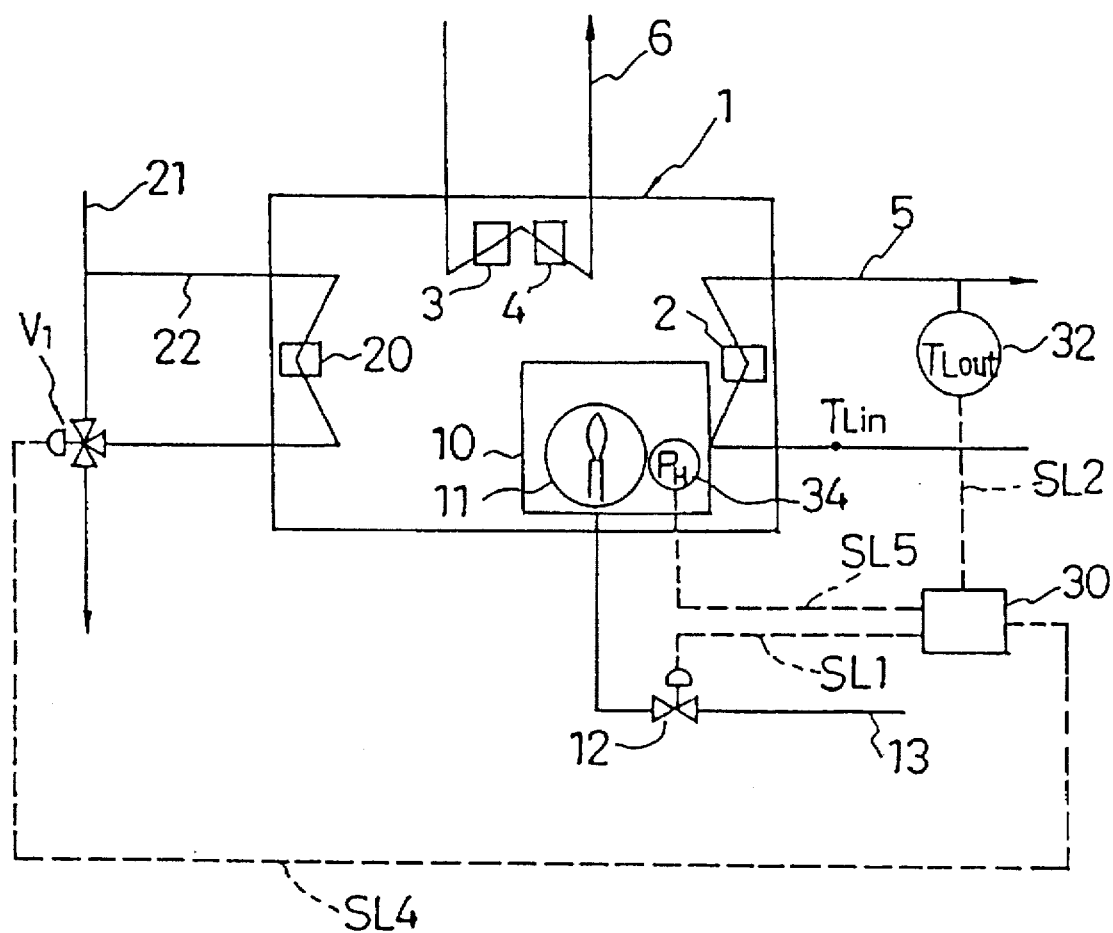
FIG. 29 is a block diagram of another embodiment differing from FIG. 27 and FIG. 28.

FIG. 29 shows an embodiment differing from FIG. 27 and FIG. 28. In the embodiment described in FIG. 27 and FIG. 28, the control is carried out by monitoring the temperature $T_{HG}$ of the high-temperature regenerator 10, however, in the embodiment shown in FIG. 29, the control is carried out by monitoring the pressure $P_H$ of the high-temperature regenerator 10. More specifically, the pressure $P_H$ of the high-temperature regenerator 10 is detected by a pressure sensor 34, and the detected result is outputted through the signal transmitting line SL5 to the control system 30.

Figure 30:
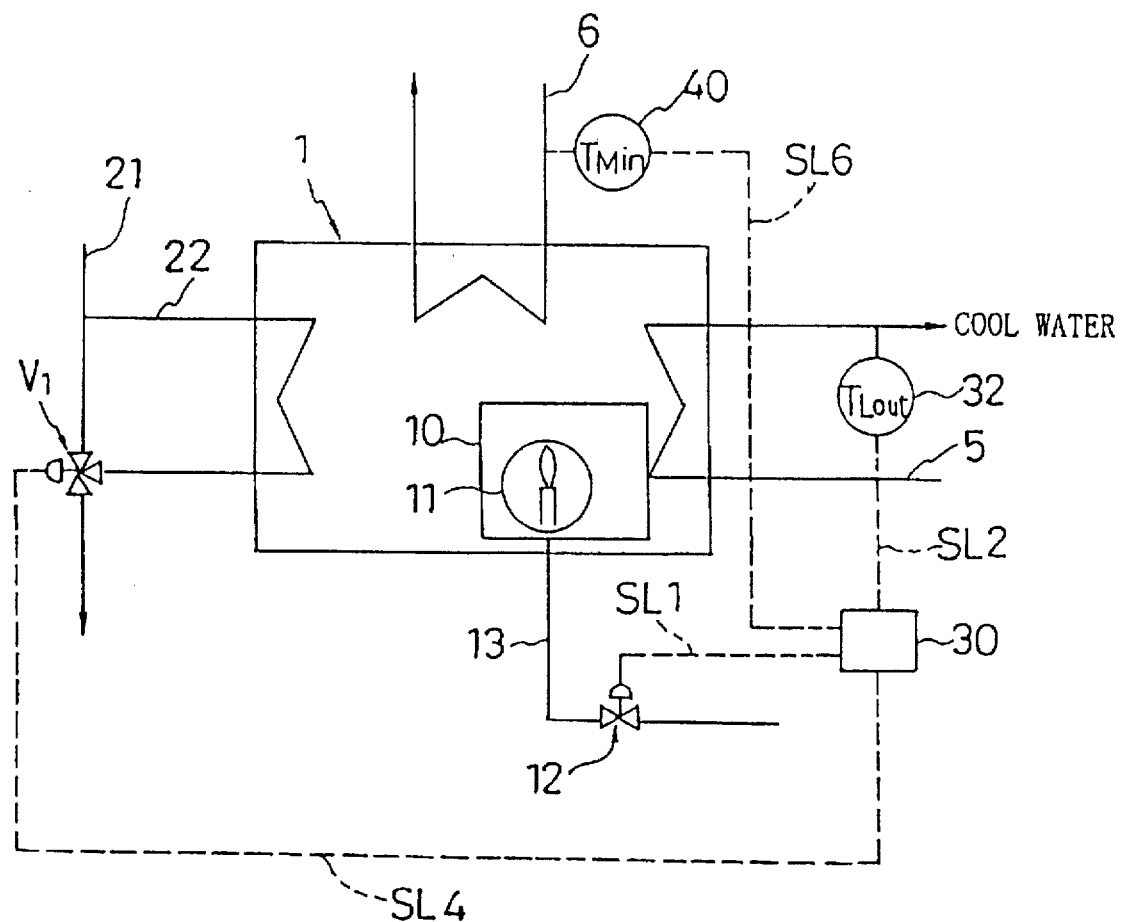
FIG. 30 is a block diagram of another embodiment differing from FIG. 27 to FIG. 29.

FIG. 30 shows an embodiment differing from FIG. 27 to FIG. 29. In the embodiment shown in FIG. 30, the exit-temperature $T_{Lout}$ of the cool-warm water circulation line 5 is detected by a temperature sensor 32, and the cooling water entrance-temperature $T_{Min}$ is detected by a temperature sensor 40, and then the detected results are transmitted through the signal transmitting line SL6 to the control system 30.

Figure 31:
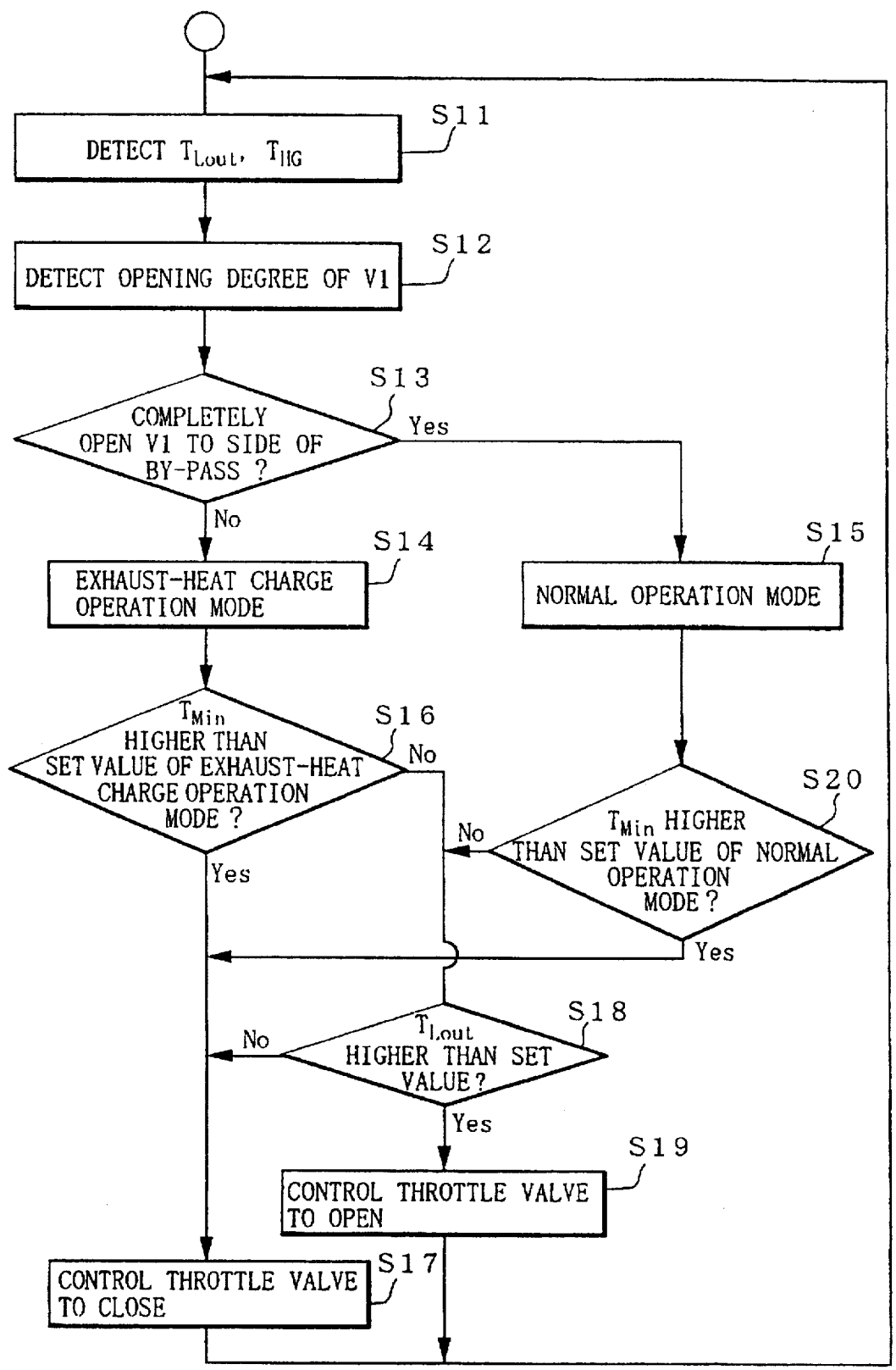
FIG. 31 is a flow chart showing control of FIG. 30.

The action of the embodiment will be explained with reference to FIG. 31. The exit-temperature $T_{Lout}$ of the cool-warm water circulation line 5 and the entrance-temperature T$_{Min}$ of the cooling water circulation 6 are detected (Step S1). The directional flow of the three-way vane V1 is detected (Step S2), and the absorption cool-warm water machine 1 is judged whether to be in the normal operation mode or the exhaust-heat charge operation mode (Step S13). Here, when the three-way vane V1 is not in the state completely bypassing the cool-warm water machine 1 and the warm exhaust-water is fed to the cool-warm water machine 1 (regardless of the amount of flow) (NO in Step S13), the control system 30 judges whether the cool-warm water machine 1 is to be in the exhaust-heat charge operation mode or not (Step S14). On the other hand, when the three-way vane V1 is in the state completely bypassing the cool-warm water machine 1 or when the degree the three-way valve 1 is opened to the cool-warm water machine 1 is zero (YES in Step S13), the control system 30 judges whether to be in the normal operation mode or not (Step S15).

When the exhaust-heat charge operation mode is selected (Step S14), the entrance-temperature T$_{Min}$ of the cooling water circulation line and the defined threshold value or set value (the set value in the exhaust-heat charge operation mode) are compared with one another (Step S16). And when the entrance-temperature T$_{Min}$ is higher than the set value (YES in Step S16), the degree the throttle valve 12 is opened is controlled to redirect to close (Step S17).

While, when the entrance-temperature T$_{Min}$ is lower than the set value (NO in Step S16), the exit-temperature T$_{Lout}$ of the cool-warm water circulation line and the defined threshold value or set value are compared with one another (Step S18). If the exit-temperature T$_{Lout}$ is higher than the set value (YES in Step S18), the degree the throttle vane 12 is opened is controlled to redirect to open (Step S19). But, if the exit-temperature T$_{Lout}$ is lower than the set value (NO in Step S18), the degree the throttle valve 12 is opened is controlled to redirect to close (Step S17);

On the other hand, when the normal operation mode is selected in Step S13 (Step S15), the entrance-temperature T$_{Min}$ of the cooling water circulation line is compared with the threshold value or set value in the normal operation mode (Step S20). When the entrance-temperature T$_{Min}$ is higher than the set value (YES in Step S20), the degree the throttle vane 12 is opened is controlled to close (Step S17). But, when the entrance-temperature T$_{Min}$ is lower than the set value (NO in Step S20), the control below Step S18 takes place.

Figure 32:
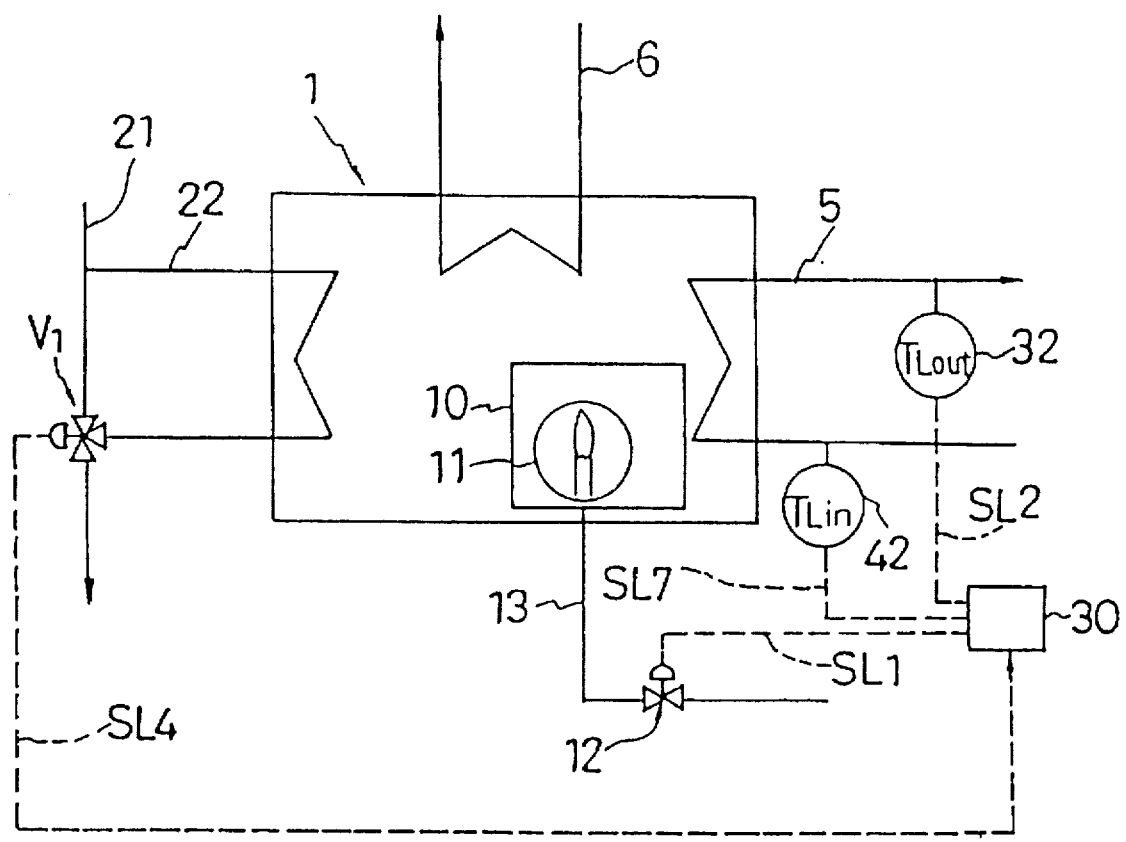
FIG. 32 is a block diagram of a further embodiment differing from FIG. 27 to FIG. 31.

FIG. 32 shows an embodiment deferring from FIG. 27 to FIG. 31. In the embodiment shown in FIG. 32, the control for the high-quality fuel feeding amount is carried out by monitoring the exit-temperature T$_{Lout}$ and the entrance-temperature T$_{Lin}$ of the cool-warm water circulation line. The entrance-temperature T$_{Lin}$ of the cool-warm water circulation line 5 is detected by a temperature sensor 42, and the detected result is transmitted to the control system 30 by a signal transmitting line SL7.

Figure 33:
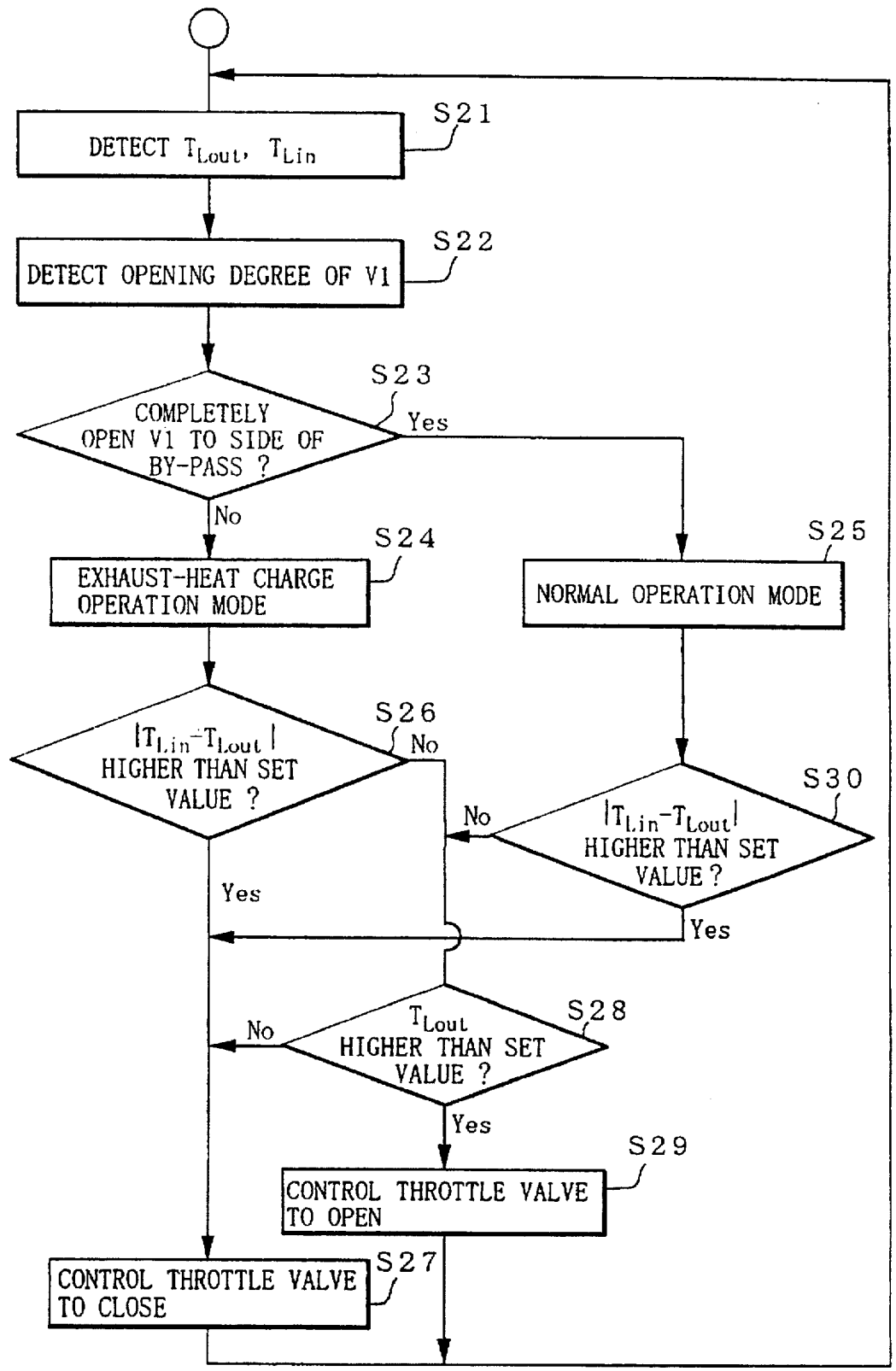
FIG. 33 is a flow chart showing control of FIG. 32.

The action of the embodiment shown in FIG. 32 will be explained with reference to FIG. 33. The exit-temperature T$_{Lout}$ and the entrance-temperature T$_{Lin}$ of the cool-warm water circulation line 5 are detected (Step S21). The directional flow of the three-way valve V1 is detected (Step S22), and the absorption cool-warm water machine 1 is judged to be in the normal operation mode or the exhaust-heat charge operation mode (Step S23). More Specifically, when the three-way valve V1 is completely opened to the side of the bypass (YES in Step S23), the normal operation mode is selected (Step S25), but when the three-way valve V1 is not completely opened to the bypass (NO in Step S23), the exhaust-heat charge operation mode is selected (Step S24).

When the exhaust-heat charge operation mode is selected (Step S24-), the difference in the temperature between the entrance-temperature T$_{Lin}$ and the exit-temperature T$_{Lout}$ of the cool water circulation line and the defined threshold value or set value are compared with one another (Step S26).

When the difference in the temperature |T$_{Lin}$–T$_{Lout}$| is higher than the set value (YES in Step S26), the degree the throttle valve 12 is opened is controlled to redirect to close (Step S27). When the difference in the temperature |T$_{Lin}$–T$_{Lout}$| is lower than the set value (NO in Step S26), the exit-temperature T$_{Lout}$ of the cool-warm water circulation line 5 and the defined threshold value or set value (differed by the operation mode) are compared with each other (Step S28).

And, if the exit-temperature T$_{Lout}$ of the cool-warm water circulation line 5 is higher than the set value (YES in Step S28), the degree the throttle valve 12 is opened is controlled to redirect to open (Step S29). But if the exit-temperature T$_{Lout}$ of the cool-warm water circulation line 5 is lower than the set value (NO in Step S28), the degree the throttle valve 12 is opened is controlled to redirect to close (Step S27).

Even when the three-way valve V1 is completely opened to the side of the bypass (YES in Step S23) and the normal operation mode is selected (Step S25), the difference in the temperature between the entrance-temperature T$_{Lin}$ and the exit-temperature T$_{Lout}$ of the cool water circulation line and the defined threshold value or set value are compared with one another (Step S30). And, the processes of the aforementioned Steps S27, S28 and S29 are carried out.

Figure 34:
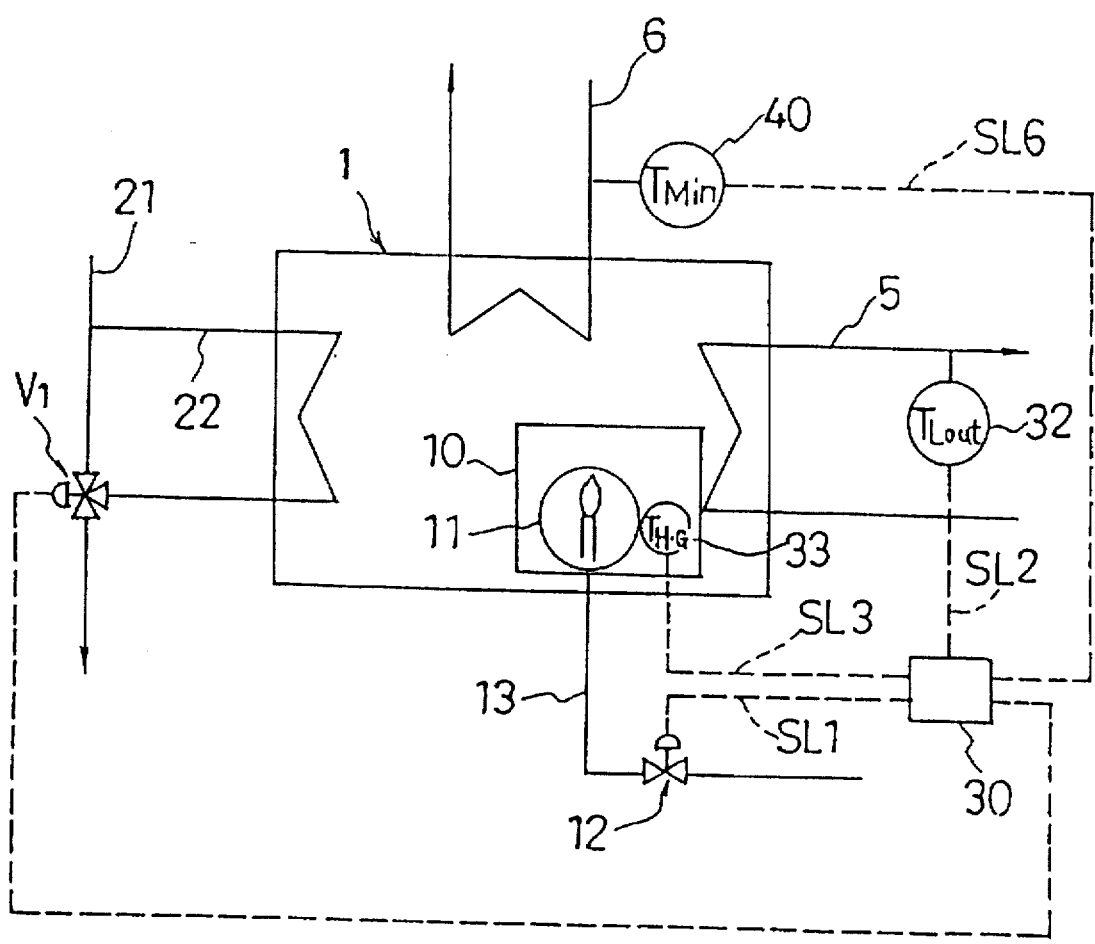
FIG. 34 is a block diagram of another embodiment differing from FIG. 27 to FIG. 33.
Figure 35:
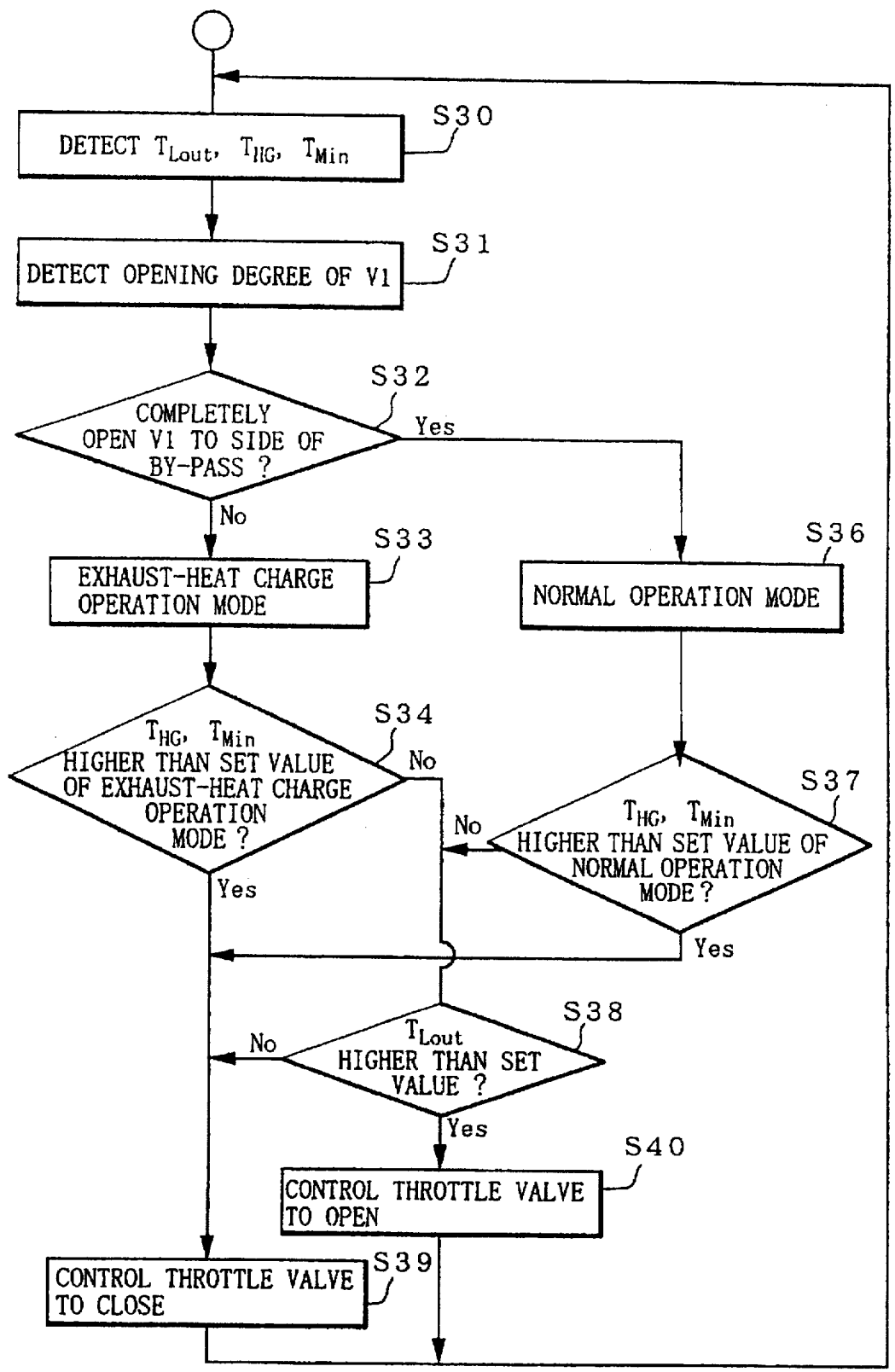
FIG. 35 is a flow chart showing control of FIG. 34.

FIG. 34 shows an embodiment differing form FIG. 27 to FIG. 33. In the embodiment shown in FIG. 34, the degree the throttle valve 12 is opened is controlled by monitoring the exit-temperature T$_{Lout}$ of the cool-warm water circulation line 5, the cooling water circulation entrance-temperature T$_{Min}$ and the temperature T$_{HG}$ of the high-temperature regenerator 10. Next, the action of the embodiment shown in FIG. 34 will be explained with reference to FIG. 35.

The exit-temperature T$_{Lout}$ of the cool-warm water circulation line 5, the cooling water circulation entrance-temperature T$_{Min}$ and the temperature T$_{HG}$ of the high-temperature regenerator 10 are detected (Step S30). The directional flow of the three-way valve V1 is detected (Step S31), the absorption cool-warm water machine 1 is judged whether to be operated in the normal operation mode or the exhaust-heat charge operation mode (Step S32). That is, when the three-way valve V1 is not adapted to completely bypass the cool-warm water machine 1 and the warm exhaust-water is fed to the cool-warm water machine 1 (regardless of the amount of flow) (NO in Step S32), the control system 30 judges to be in the exhaust-heat charge operation mode (Step S33). But, when the three-way valve V1 is adapted to completely bypass the cool-warm water machine 1 or the degree the three-way valve 1 is opened to the cool-warm water machine 1 is zero (YES in Step S32), the control system 30 judges to be in the normal operation mode (Step S36).

When the exhaust-heat charge operation mode is selected (Step S33), the temperature T$_{HG}$ of the high-temperature regenerator 10 and the entrance-temperature T$_{Min}$ of the cooling water circulation line are compared with the defined threshold value or set value (the set value in the exhaust-heat charge operation mode) (Step S34). If the temperature T$_{HG}$ of the high-temperature regenerator 10 and the entrance-temperature T$_{Min}$ of the cooling water circulation line are higher than the set value (YES in Step S34), the degree the throttle valve 12 is opened is controlled to redirect to close (Step S39).

While, if the temperature THG of the high-temperature regenerator 10 and the entrance-temperature TMin of the cooling water circulation line are lower than the set value (NO in Step S34), the exit-temperature TLout of the cool-warm water circulation line is compared with the defined threshold value or set value (Step S38). When the exit-temperature TLout is higher than the set value (YES in Step S38), the degree the throttle valve 12 is opened is controlled to open (Step S40). When the exit-temperature TLout is lower than the set value (NO in Step S38), the degree the throttle valve 12 is opened is controlled to close (Step S39).

When the normal operation mode is selected in Step S32 (Step S36), the temperature THG of the high-temperature regenerator 10 and the entrance-temperature TMin of the cooling water circulation line are compared with the threshold value or set value in the normal operation mode (Step S37). If the temperature THG of the high-temperature regenerator 10 and the entrance-temperature TMin of the cooling water circulation line are higher than the set value (YES in Step S37), the degree the throttle valve 12 is opened is controlled to redirect to close (Step S39). If the temperature THG of the high-temperature regenerator 10 and the entrance-temperature TMin of the cooling water circulation line are lower than the set value (NO in Step S37), the controls below Step S38 take place.

Figure 36:
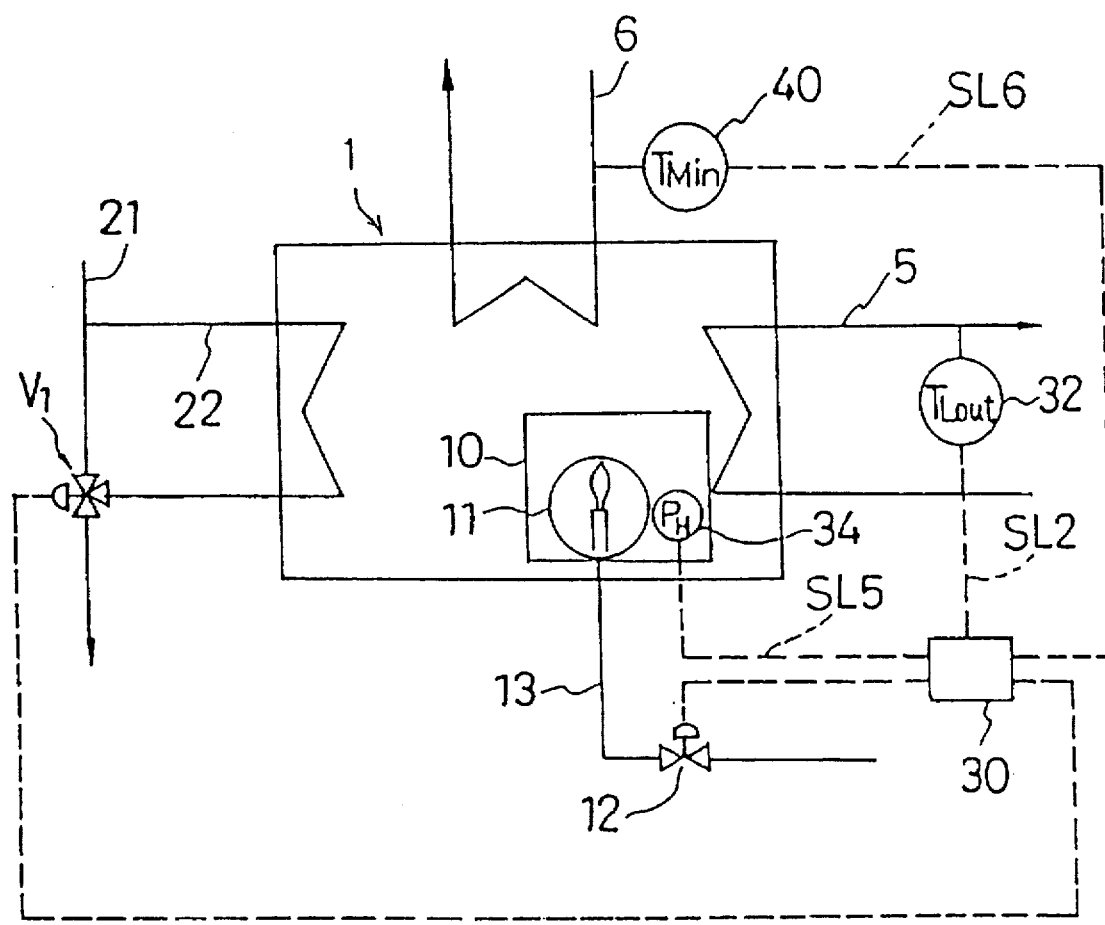
FIG. 36 is a block diagram of another embodiment differing from FIG. 27 to FIG. 35.

FIG. 36 shows an embodiment differing from FIG. 27 to FIG. 35. The temperature THG of the high-temperature regenerator 10 has been monitored in the embodiment shown in FIG. 34, however, in the embodiment shown in FIG. 36, the control is carried out by monitoring the pressure PH of the high-temperature regenerator 10. That is, the pressure PH of the high-temperature regenerator 10 is detected by the pressure sensor 34, and the detected result is outputted through the signal transmitting line SL5 to the control system 30.

Figure 37:
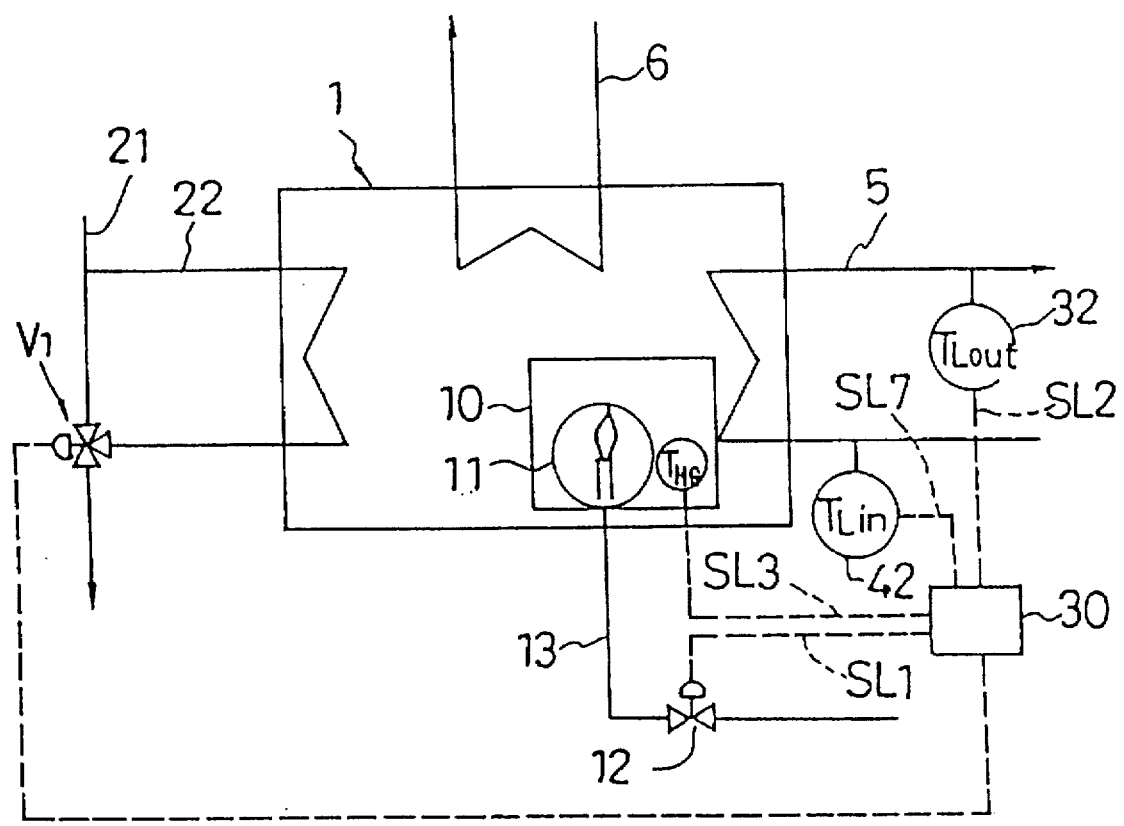
FIG. 37 is a block diagram of another embodiment differing from FIG. 27 to FIG. 36.
Figure 38:
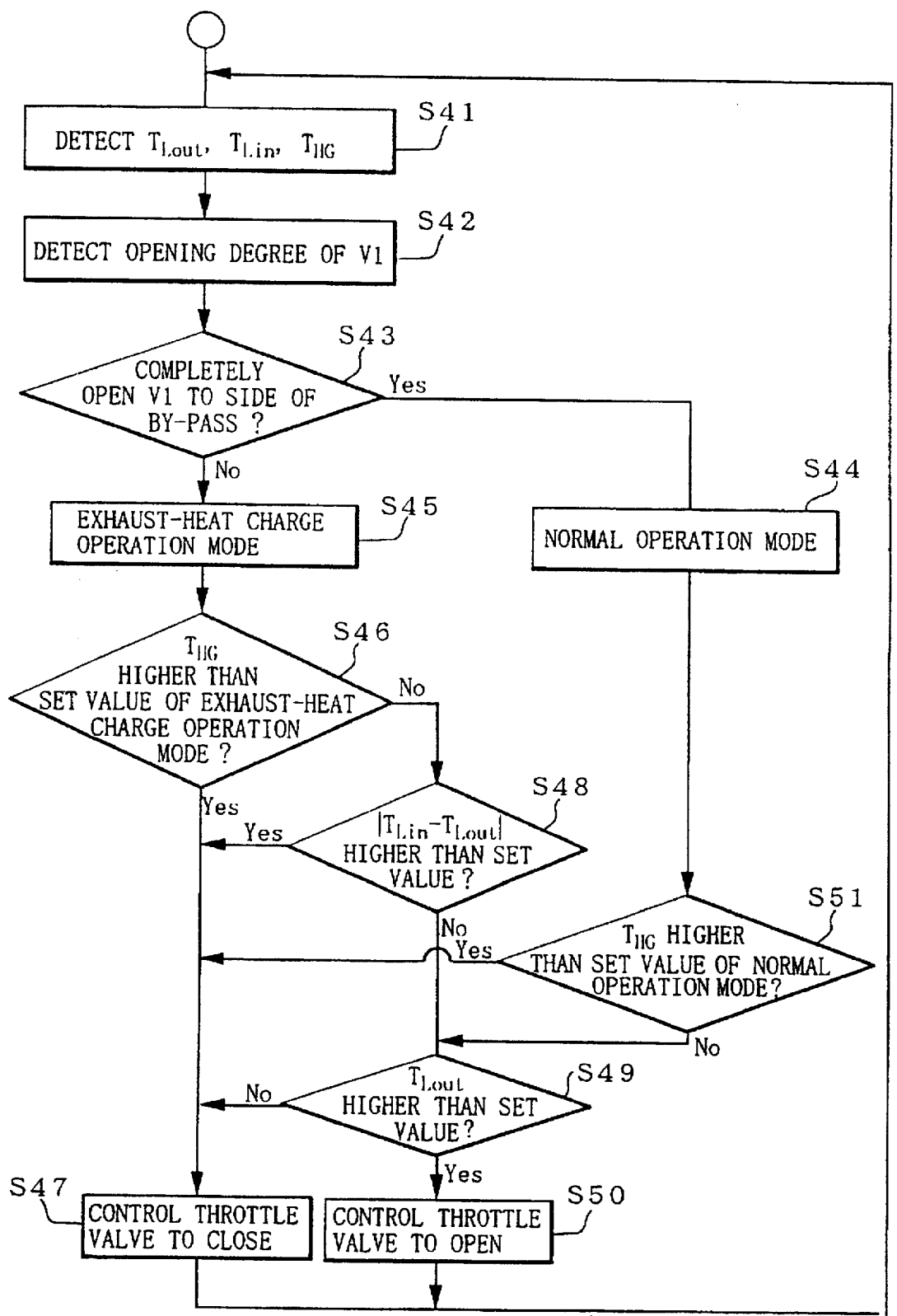
FIG. 38 is a flow chart showing control of FIG. 37.

FIG. 37 shows an embodiment differing from FIG. 27 to FIG. 36. In the embodiment 20 shown in FIG. 37, by monitoring the exit-temperature TLout and the entrance-temperature TLin of the cool-warm water circulation line 5, and the temperature THG of the high-temperature regenerator 10, the degree the throttle valve 12 is opened is controlled. The action of the embodiment shown in FIG. 37 will be explained with reference to FIG. 38.

The exit-temperature TLout and the entrance-temperature TLin of the cool-warm water circulation line 5, and the temperature THG of the high-temperature regenerator 10 are detected (Step S41). The directional flow of the three-way valve V1 is detected (Step S42), and then the absorption cool-warm water machine 1 is judged whether to be in the normal operation mode or the exhaust-heat charge operation mode (Step S43). More specifically, when the three-way vane V1 completely opens to the side bypassing the cool-warm water machine 1 (YES in Step S43), the control system 30 judges to be in the normal operation mode (Step S44). When the three-way valve V1 does not completely open to the side of the bypass, the control system 30 judges to be in the exhaust-heat charge operation mode (Step S45).

In the exhaust-heat charge operation mode (Step S45), the temperature THG of the high-temperature regenerator 10 is compared with the defined threshold value or set value (the set value in the exhaust-heat charge operation mode) (Step S46). When the temperate THG of the high-temperature regenerator 10 is higher than the set value (YES in Step S46), the opening degree of the throttle valve 12 is controlled to close (Step S47).

And, when the temperate THG of the high-temperature regenerator 10 is lower than the set value (NO in Step S46), the difference in the temperature |TLin−TLout| between the entrance-temperature TLin and the exit-temperature TLout of the cool-warm water circulation line 5 is compared with the defined threshold value or set value (the set value of the exhaust-heat charge operation mode) (Step S48).

In Step S48, when the difference of the temperature |TLin−TLout| is higher than the set value (YES in Step S48), the degree the throttle valve 12 is opened is controlled to close (Step S47). When the difference of the temperature |TLin−TLout|is lower than the set value (NO in Step S48), in Step S49, the exit-temperature TLout of the cool-warm water circulation line 5 is compared with the defined threshold value or set value (the set value is defined by situation at the time).

In Step S49, when the exit-temperature TLout is higher than the set value (YES in Step S49), the opening degree of the throttle vane 12 is controlled to redirect to open (Step S50). When the exit-temperature TLout is lower than the set value (NO in Step S49), the degree the throttle valve 12 is opened is controlled to redirect to close (Step S47).

In the normal operation mode (Step S44), similar to Step S46, the temperature THG of the high-temperature regenerator 10 is compared with the defined threshold value or set value (the set value in the normal operation mode) (Step S51). And, in Step S51, if the temperature THG is higher than the set value (YES in Step S51), the degree the throttle valve 12 is opened is controlled to redirect to close (Step S47). While, if the temperature THG is lower than the set value in the normal operation mode (NO in Step S51), the controls in Step S49, S47 and S50 take place.

Figure 39:
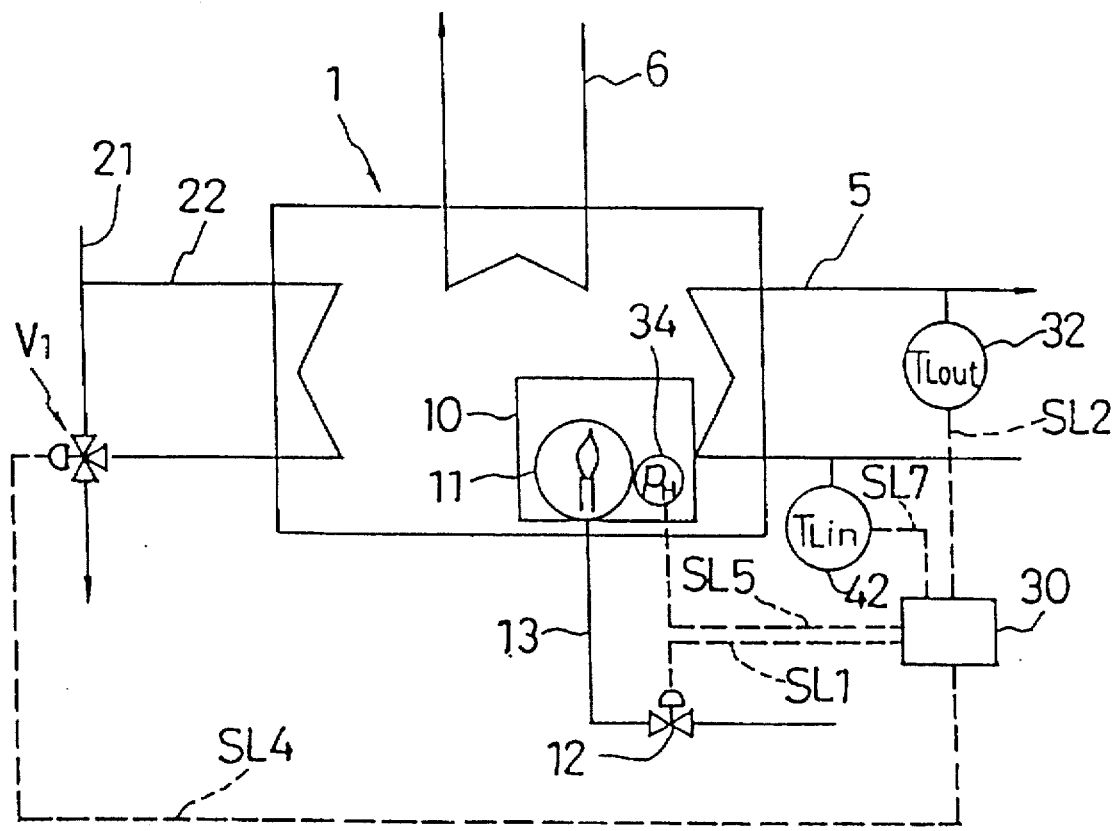
FIG. 39 is a block diagram of another embodiment differing from FIG. 27 to FIG. 38.

FIG. 39 shows an embodiment differing from FIG. 27 to FIG. 38. The temperature THG of the high-temperature regenerator 10 is monitored in the embodiment shown in FIG. 37, however, in the embodiment shown in FIG. 39, the control is carried out by monitoring the pressure PH of the high-temperature regenerator 10. That is, the pressure PH of the high-temperature regenerator 10 is detected by the pressure sensor 34, and then the detected result is outputted through the signal transmitting line SL5 to the control system 30.

Figure 40:
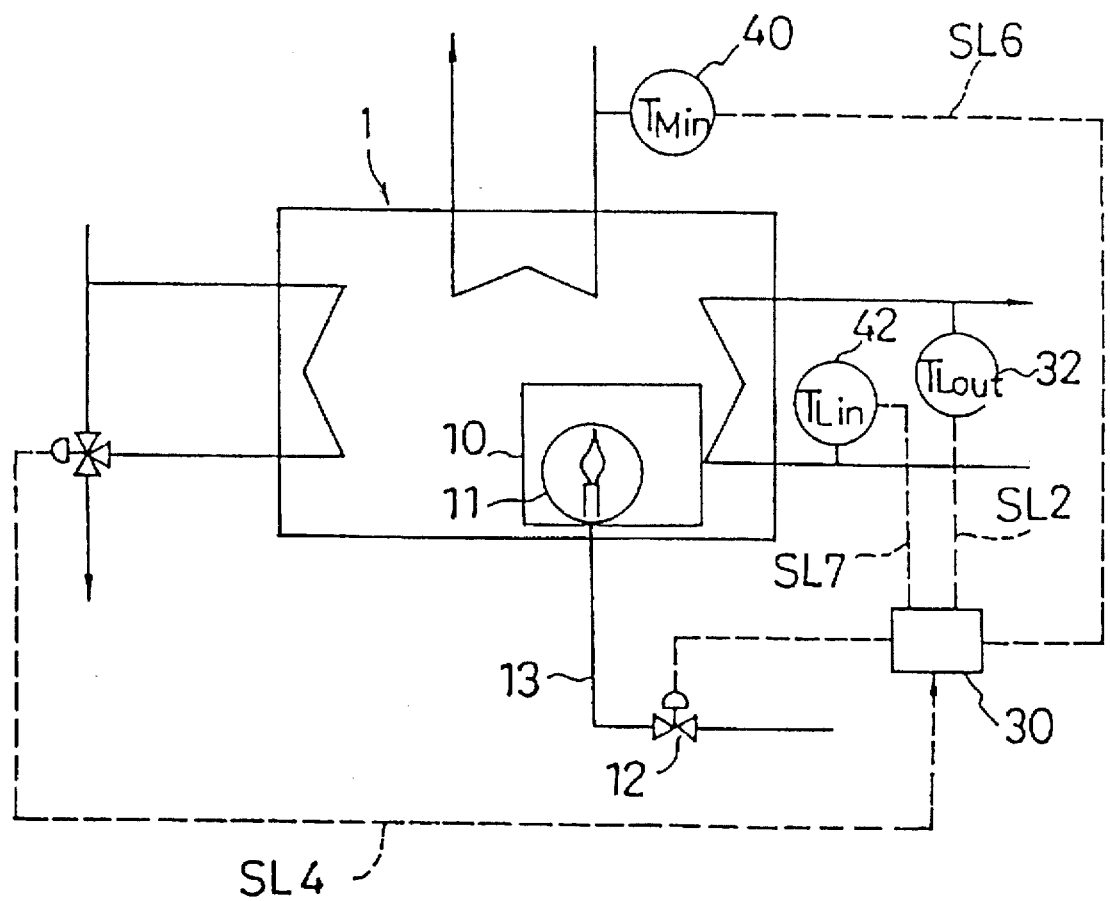
FIG. 40 is a block diagram of another embodiment differing from FIG. 27 to FIG. 39.
Figure 41:
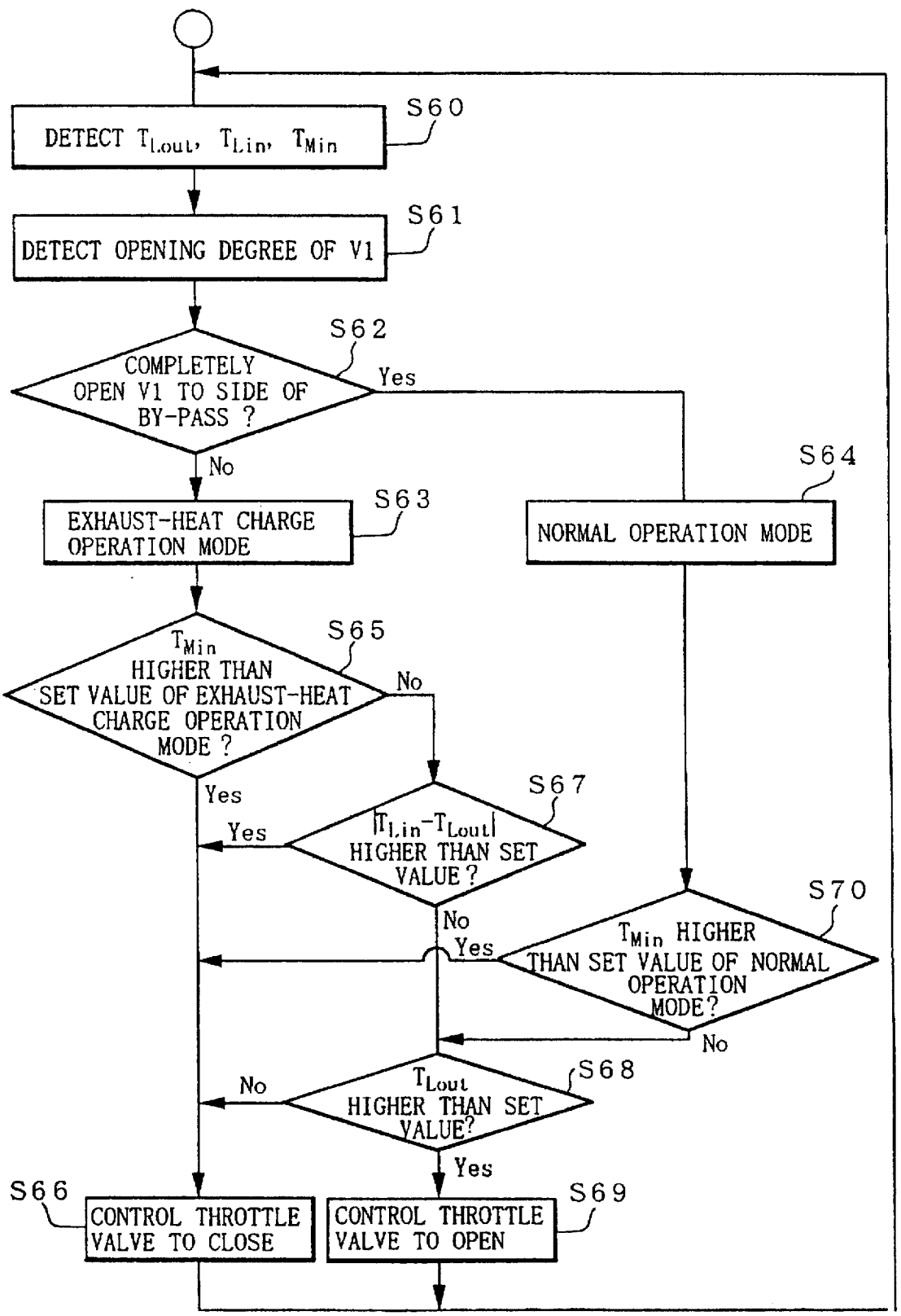
FIG. 41 is a flow chart showing control of FIG. 40.

FIG. 40 shows an embodiment differing from FIG. 27 to FIG. 39. In the embodiment shown in FIG. 40, by monitoring the exit-temperature TLout and the entrance-temperature TLin of the cool-warm water circulation line 5, and the entrance-temperature TMin of the cooling water circulation line, the degree the throttle valve 12 is opened is controlled. Next, the action of the embodiment will be explained with reference to FIG. 41.

The exit-temperature TLout and the entrance-temperature TLin of the cool-warm water circulation line 5, and the entrance-temperature TMin of the cooling water circulation line are detected (Step S60). The directional flow of the three-way valve V1 is detected 20 (Step S61), the absorption cool-warm water machine 1 is judged whether to be operated in the normal operation mode or the exhaust-heat charge operation mode (Step S62). Here, when the three-way valve V1 does not completely bypass the cool-warm water machine 1, namely, the three-way valve V1 does not completely open to the bypass (NO in Step S62), the control system 30 judges to be in the exhaust-heat charge operation mode (Step S63). When the three-way valve V1 completely bypasses the cool-warm water machine 1 (the state in which the three-way valve V1 completely open to the side of the bypass: YES in Step S62), the control system 30 judges to be in the normal operation mode (Step S64).

In the exhaust-heat operation mode (Step S63), the entrance-temperature TMin of the cooling water circulation line is compared with the defined threshold value or set value (the set value in the exhaust-heat charge operation mode) (Step S65). And, when the entrance-temperature TMin of the cooling water circulation line is higher than the set value (YES in Step S65), the throttle valve 12 is controlled to redirect to close (Step S66). On the other hand, the entrance-temperature TMin of the cooling water circulation line is lower than the set value (NO in Step S65), the difference in the temperature |TLin−TLout| between the entrance-temperature TLin and the exit-temperature TLout of the cool-warm water circulation line 5 is compared with the defined threshold value or set value (the set value in the exhaust-heat charge operation mode) (Step S67).

And, when the difference of the temperature |TLin−TLout| is higher than the set value (YES in Step S67), the throttle valve 12 is controlled to redirect to close (Step S66). When the difference of the temperature |TLin−TLout| is lower than the set value (NO in Step S67), the exit-temperature TLout of the cool-warm water circulation line 5 and the defined threshold value or set value (based on the situation of the operation mode) are compared with each other (Step S68).

In Step S68, if the exit-temperature TLout is higher than the set value (YES in Step S68), the degree the throttle valve 12 is opened is controlled to redirect to open (Step S69). When the exit-temperature TLout is lower than the set value (NO in Step S68), the degree the throttle valve 12 is opened is controlled to redirect to close (Step S66).

In the normal operation mode (Step S64), as described above, the entrance-temperature TMin of the cooling water circulation line is compared with the defined threshold value or set value (the set value in the normal operation mode) (Step S70). And, when the entrance-temperature TMin of the cooling water circulation line is higher than the set value (YES in Step S70), the degree the throttle 12 is opened is controlled to redirect to close (Step S66). When the entrance-temperature TMin of the cooling water circulation line is lower than the set value (NO in Step S70), the controls of Step S68, S66 and S69 take place.

Figure 42:
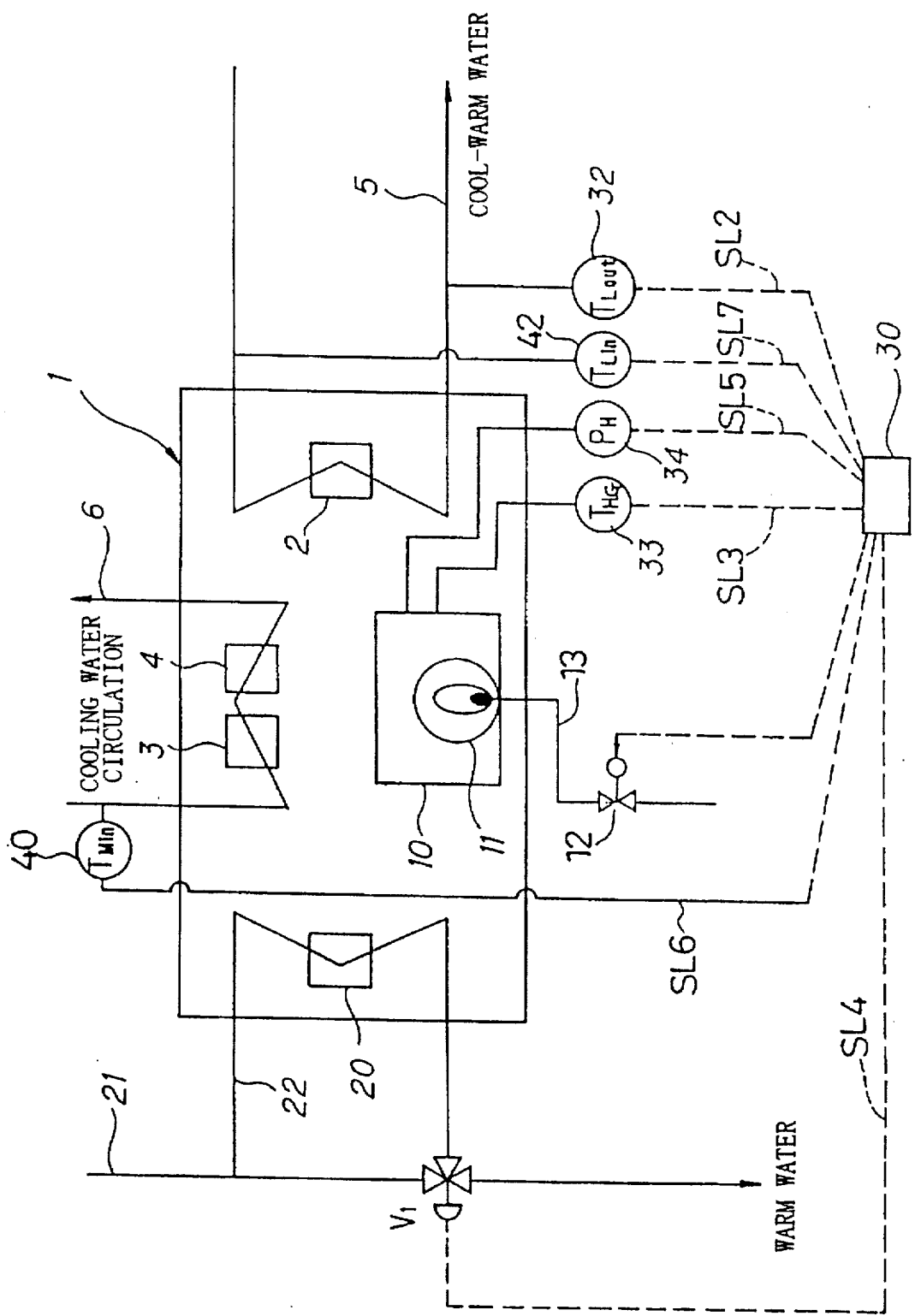
FIG. 42 is a block diagram of another embodiment differing from FIG. 27 to FIG. 41.
Figure 43:
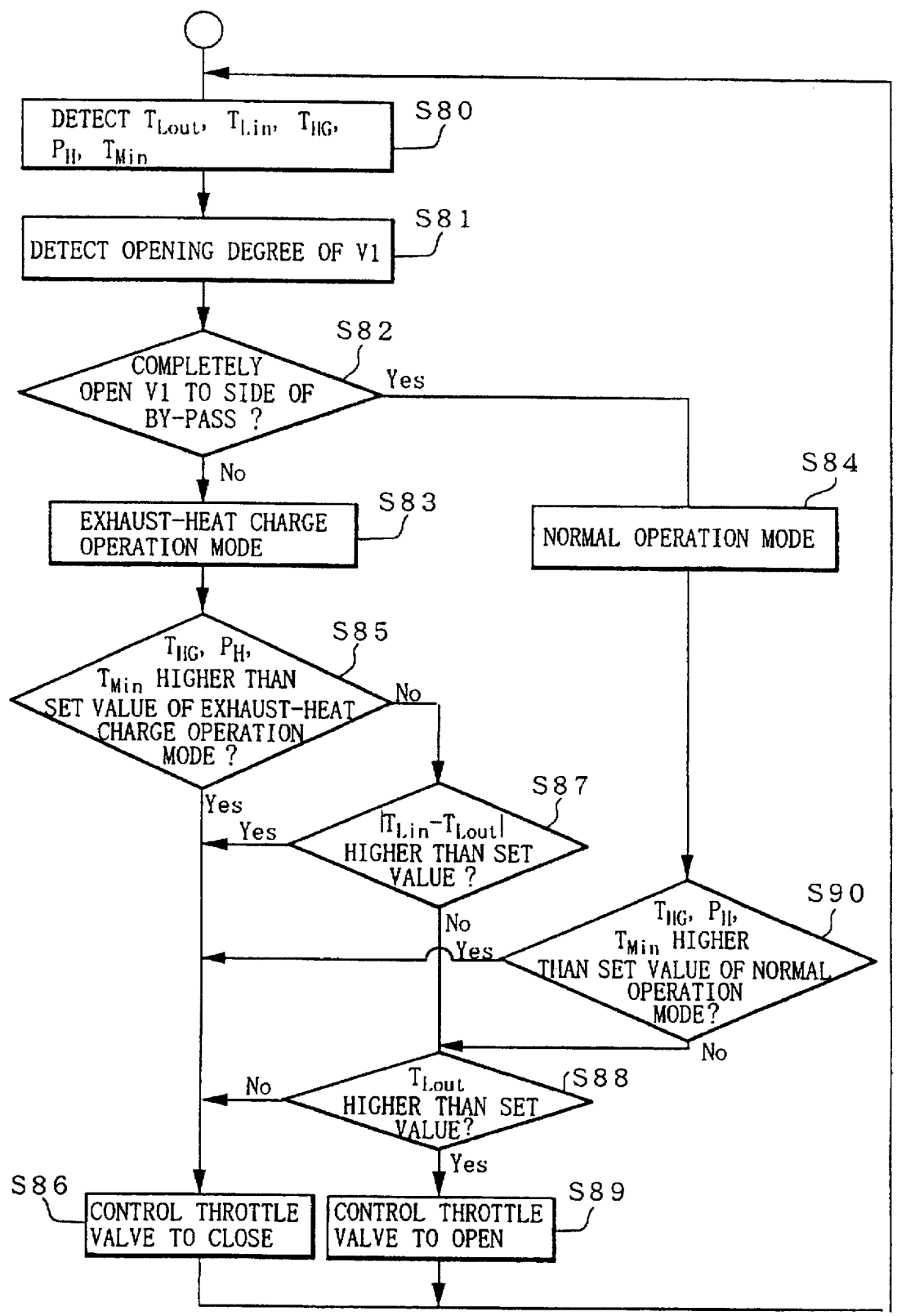
FIG. 43 is a flow chart showing control of FIG. 42.

FIG. 42 and FIG. 43 show an embodiment differing from FIG. 27 to FIG. 41. In addition to monitor the exit-temperature TLout and the entrance-temperature TLin of the cool-warm water circulation line 5, and the entrance-temperature TMin of the cooling water circulation line in the embodiment shown in FIG. 40 and FIG. 41, and in the embodiment shown in FIG. 42 and FIG. 43, the temperature THG and the pressure PH of the high-temperature regenerator 10 are further monitored in order to control.

In operating the embodiment shown in FIG. 42 and FIG. 43, the exit-temperature TLout and the entrance-temperature TLin of the cool-warm water circulation line 5, and the entrance-temperature TMin of the cooling water circulation line, and the temperature THG and the pressure PH of the high-temperature regenerator 10 are detected (Step S80). The directional flow of the three-way valve V1 is detected (Step S81), and the absorption cool-warm water machine 1 is judged to operate in the normal operation mode or the exhaust-heat operation mode (Step S82). When the three-way valve V1 does not completely bypass the cool-warm water machine 1, namely, the three-way vane V1 does not completely open to the side of the bypass (NO in Step S82), the control system 30 judges to be in the exhaust-heat operation mode (Step S83). If the three-way valve V1 completely opens to bypass the cool-warm water machine 1 (the three-way valve V1 completely opens to the side of the bypass: YES in Step S82), the control system 30 judges to be in the normal operation mode (Step S84).

In the exhaust-heat charge operation mode (Step S83), the entrance-temperature TMin of the cooling water circulation line, and the temperature THG and the pressure PH of the high-temperature regenerator 10 are compared with the defined threshold value or set value (the set value in the exhaust-heat charge operation mode) (Step S85). When the entrance-temperature TMin of the cooling water circulation line, and the temperature THG and the pressure PH of the high-temperature regenerator 10 are higher than the set value(YES in Step S85), the throttle valve 12 is controlled to redirect to close (Step S86). And, when the entrance-temperature TMin of the cooling water circulation line, and the temperature THG and the pressure PH of the high-temperature regenerator 10 are lower than the set value (NO in Step S85), the difference of the temperature |TLin−TLout| between the entrance-temperature TLin and the exit-temperature TLout of the cool-warm water circulation line 5 is compared with the defined threshold value or set value (the set value in the exhaust-heat charge operation mode) (Step S87).

And, when the difference of the temperature |TLin−TLout| is higher than the set value (YES in Step S87), the throttle valve 12 is controlled to redirect to close (Step S86). When the difference in the temperature |TLin−Tout| is lower than the set value (NO in Step S87), the exit-temperature TLout of the cool-warm water circulation line 5 and the defined threshold value or set value (based on the situation of the operation mode) are compared with each other (Step S88).

In Step S88, if the exit-temperature TLout is higher than the set value (YES in Step S88), the degree the throttle valve 12 is opened is controlled to redirect to open (Step S89). When the exit-temperature TLout is lower than the set value (NO in Step S88), the degree the throttle valve 12 is opened is controlled to redirect to close (Step S86).

In the normal operation mode (Step S84), as described above, the entrance-temperature TMin of the cooling water circulation line, and the temperature THG and the pressure PH of the high-temperature regenerator 10 are compared with the defined threshold value or set value (the set value in the normal operation mode) (Step S90). And, when the entrance-temperature TMin of the cooling water circulation line, and the temperature THG and the pressure PH of the high-temperature regenerator 10 in the normal operation mode are higher than the set value (YES in Step S90), the degree the throttle 12 is opened is controlled to redirect to close (Step S86). When the entrance-temperature TMin of the cooling water circulation line, and the temperature THG and the pressure PH of the high-temperature regenerator 10 are lower than the set value (NO in Step S90), the controls of Step S88, S86 and S89 take place.

And, the following will explain embodiments shown in FIG. 44 to FIG. 61.

Figure 44:
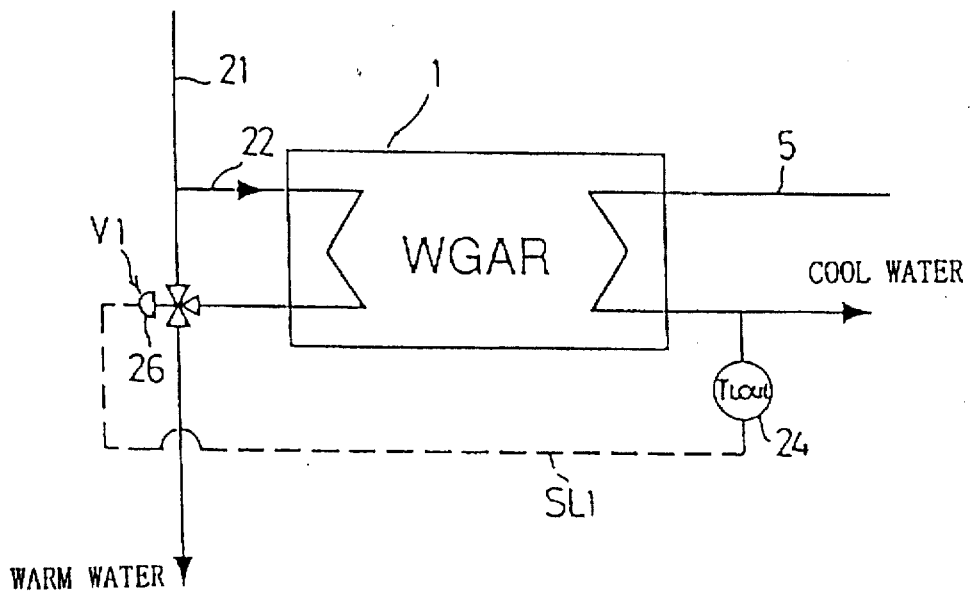
FIG. 44 is a block diagram of an even further embodiment according to the present invention.

In FIG. 44, a cool water exit-temperature detection means 24 detecting the cool water exit-temperature TLout is provided along a cool water system 5, in which the detected result is sent through the signal transmitting line SL1 to a control system 26 for the three-way valve V1. And then the control system 26 controls ON/OFF or the directional flow of the three-way valve V1.

The control of the three-way valve V1 which is caused by the control system 26 will be explained with reference to FIG. 45.

When the cool water exit-temperature TLout is a high-temperature (e.g., more than 9° C.), the efficiency of the cool-warm water machine 1 cannot be promoted although the exhaust-heat is charged. In other words, when the cool water exit-temperature TLout has a higher temperature than the predetermined temperature, it is a waste to charge the exhaust-heat.

In the base according to the aforementioned view, the cool water exit-temperature TLout along the cool water system 5 is detected by the detection means 24 (Step S1). In Step S2, the detected cool water exit-temperature TLout is judged whether being at the high-temperature or not.

When the cool water exit-temperature TLout is higher than a predetermined temperature (the temperature indicated with a numeral TLoutmax in FIG. 45: the same as above), it is a waste to charge the exhaust-heat, so that, in order that inferiority caused by the over-load is not tangible, the three-way valve V1 is controlled to close for the exhaust-heat (Step S3). Incidentally, Step S3 includes the case of completely stopping to charge the exhaust-heat.

On the other hand, when the cool water exit-temperature TLout is lower than the predetermined temperature TLoutmax, the effect charging the exhaust-heat becomes tangible, so that the three-way valve V1 is controlled to redirect to the side leading the exhaust-heat to the cool-warm water machine 1 (Step S4). Here, Step S4 includes the case charging the exhaust-heat to the side of the absorption cool-warm water machine at 100%.

The following repeats Steps S1 to S4. Incidentally, the predetermined temperature TLoutmax is defined as, for example, 7.5° C. for the cool water set exit-temperature 7° C.

Figure 46:
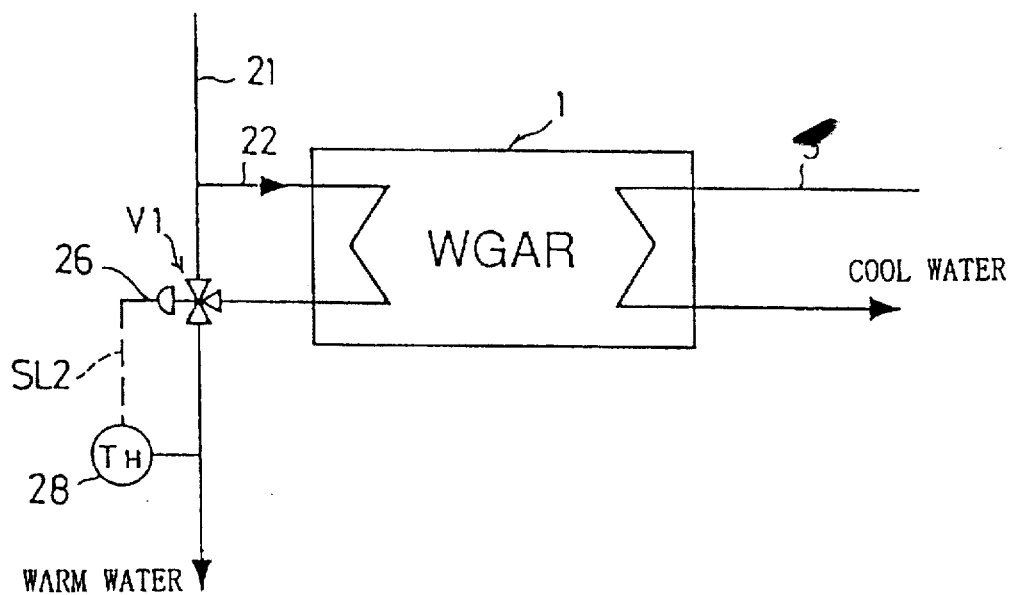
FIG. 46 is a block diagram of another embodiment differing from FIG. 44 and FIG. 45.
Figure 47:
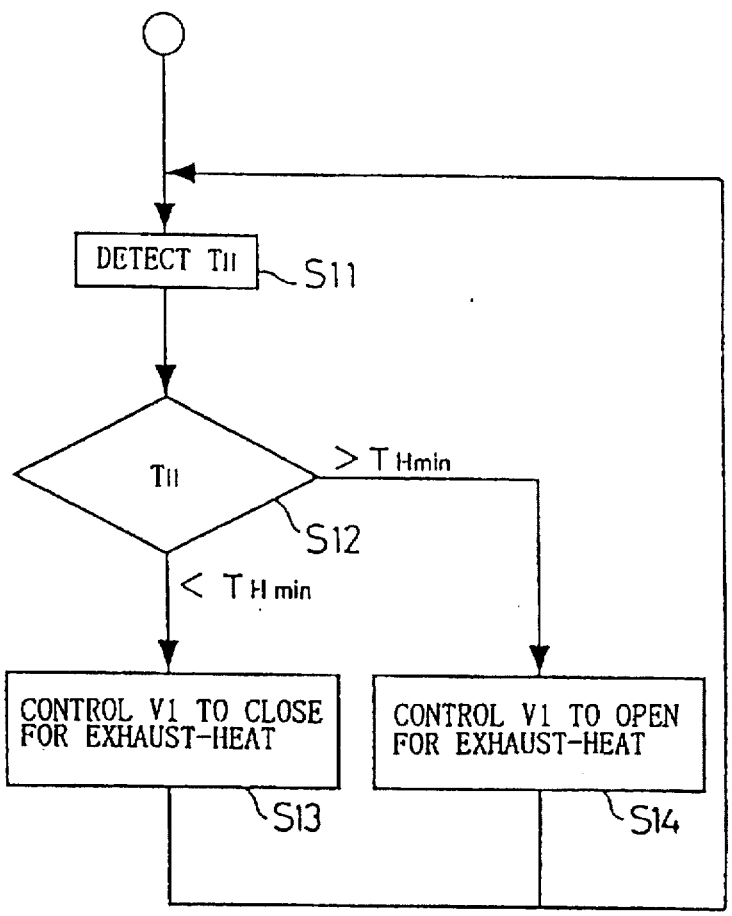
FIG. 47 is a flow chart showing control of FIG. 46.

The following will explain an embodiment shown in FIG. 46 and FIG. 47.

In FIG. 46, a warm water temperature detection means 28 is provided on the downstream of the three-way valve V1 connected together with the exhaust-heat line 21 in order to detect the temperature (a warm water temperature) TH of the exhaust-heat line 21. The detected result caused by the detection means 28 is sent through the signal transmitting line SL2 to the control system 26 for the three-way valve 1.

As to the control of the three-way valve 1 in the embodiment, the following will be explained with reference to FIG. 47.

When the warm water temperature has a low temperature, the effect charging the exhaust-heat is decreased, in this situation (the warm water temperature TH is lower than the solution temperature in the cool-warm water machine 1), the refrigerating ability of the cool-warm water machine 1 cannot be maintained. In order to avoid the aforementioned situation, the warm water temperature TH is detected by the detection means 28 (Step S11). And then, in Step S12, the detected warm water temperature TH is judged whether being at the low-temperature or not.

When the warm water temperature TH is lower than the predetermined temperature (the temperature indicated with a numeral THmin in FIG. 47: the same as above), charging the exhaust-heat, the solution temperature in the cool-warm water machine 1 is not increased, therefore, the inferiority as described above is produced, so that the three-way valve V1 is controlled to redirect to close for the exhaust-heat (Step S13).

When the warm water temperature TH is higher than the predetermined temperature THmin, the effect charging the exhaust-heat is obtained as requested, so that the three-way valve V1 is controlled to redirect to the side leading the exhaust-heat to the cool-warm water machine 1 (Step S14).

The following repeats Steps S11 to S14. Incidentally, the predetermined temperature THmin can be defined to meet with, for example, the solution temperature leading to an exhaust-heat heat-exchanger (not shown) in the cool-warm water machine 1.

Figure 45:
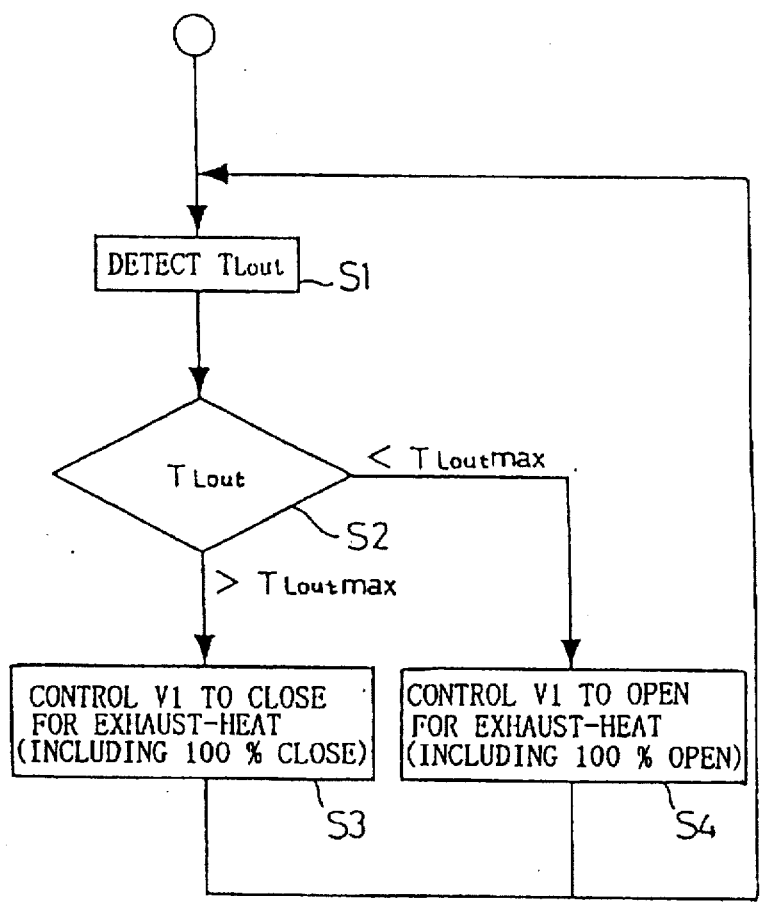
FIG. 45 is a flow chart showing control of FIG. 44.
Figure 48:
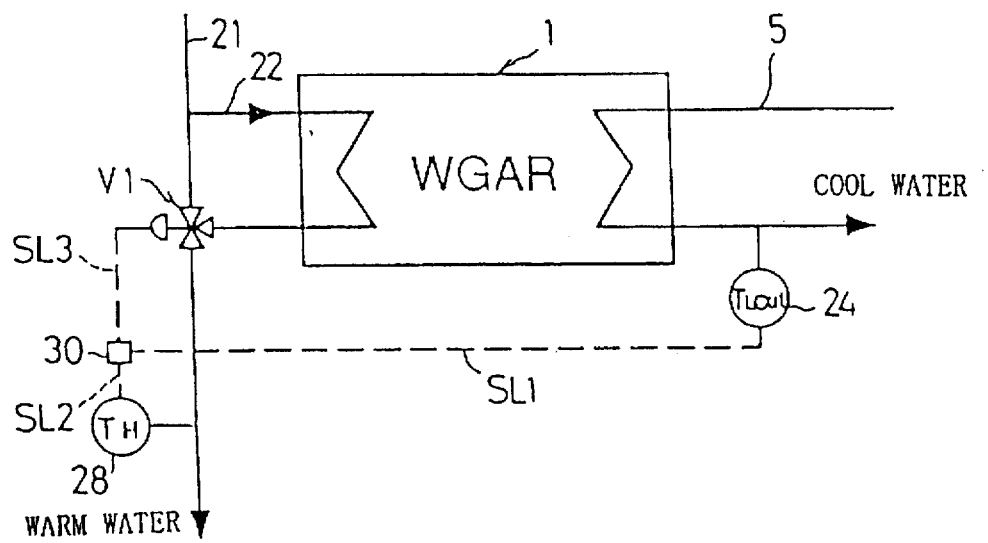
FIG. 48 is a block diagram of another embodiment differing from FIG. 44 to FIG. 47.
Figure 49:
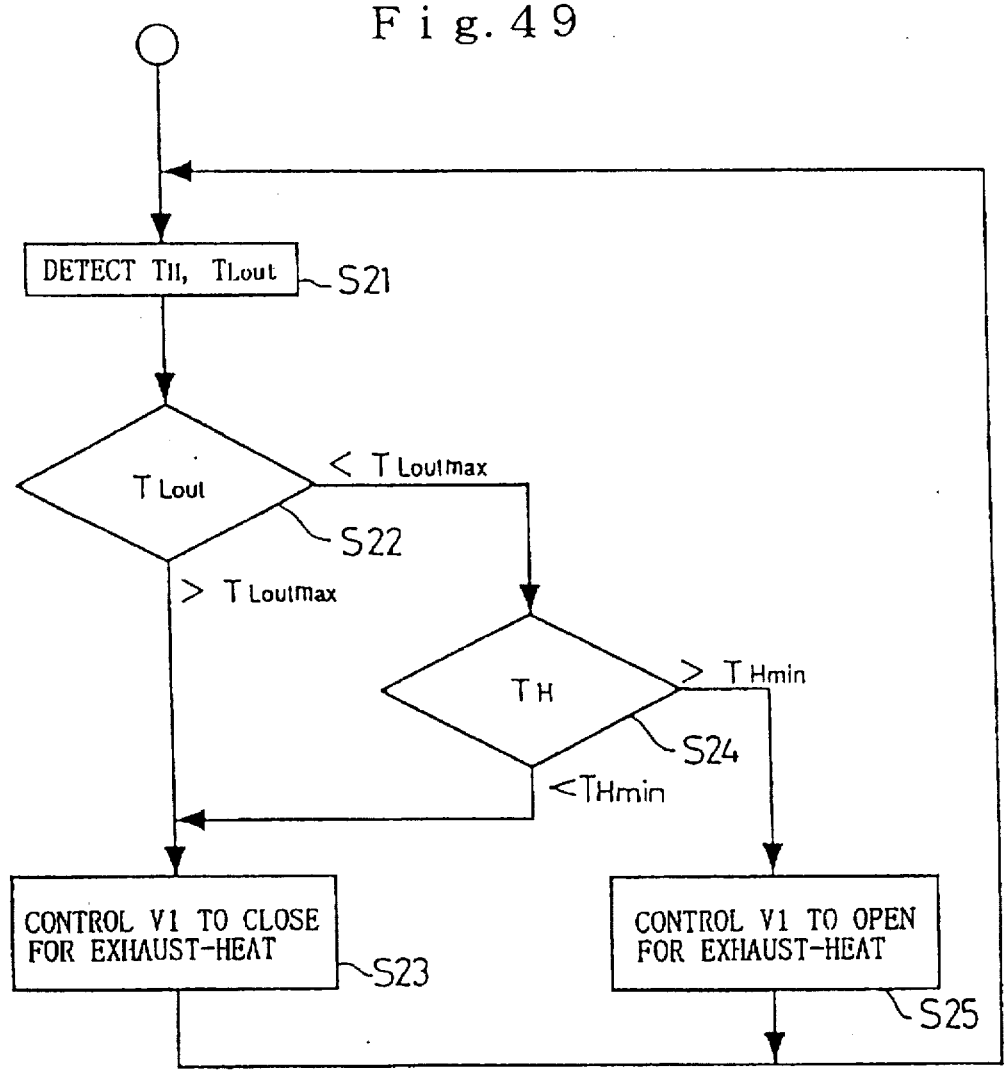
FIG. 49 is a flow chart showing control of FIG. 48.

FIG. 48 and FIG. 49 show an embodiment differing from FIG. 44 to FIG. 47, in which the control of the embodiment shown in FIG. 48 and FIG. 49 is composed of the embodiment shown in FIG. 44 and FIG. 45 and the embodiment shown in FIG. 46 and FIG. 47. That is, the cool water exit-temperature detection means 24, which detects the cool water exit-temperature TLout, is provided along the cool water system 5, and the warm water temperature detection means 28, which detects the warm water temperature TH, is provided along the exhaust-heat line 21. The detected result caused by the cool water exit-temperature detection means 24 is sent through the signal transmitting line SL1 to the control system 30, and the detected result caused by the warm water temperature detection means 28 is further sent through the signal transmitting line SL2 to the control system 30.

The control opening the three-way valve V1 caused by the control system 30 will be explained with reference to FIG. 49.

The cool water exit-temperature TLout along the cool water system 5 is detected by the detection means 24, and the warm water temperature TH is detected by the detection means 28 (Step S21). In Step S22, the detected cool water exit-temperature TLout is judged whether being at the high-temperature or not.

When the cool water exit-temperature TLout is higher than the predetermined temperature TLoutmax, it is a waste to charge the exhaust-heat, so that, in order that inferiority caused by the over-load is not tangible, the three-way valve V1 is controlled to close for the exhaust-heat (Step S23).

On the other hand, when the cool water exit-temperature TLout is lower than the predetermined temperature TLoutmax, the inferiority caused by the over-load is not produced although the exhaust-heat is charged. In this case, in Step S24, the detected warm water temperature TH is judged whether being at the low-temperature or not.

Further, when the warm water temperature TH is lower than the predetermined temperature THmin, charging the exhaust-heat, the solution temperature in the cool-warm water machine 1 is not increased, therefore, an inferiority results, such as the refrigerating ability can no longer be guaranteed, so that the three-way valve V1 is controlled to redirect to close for the exhaust-heat (Step S23). While, when the warm water temperature TH is higher than the predetermined temperature THmin, the effect charging the exhaust-heat is satisfyingly obtained, so that the three-way valve V1 is controlled to redirect to the side leading the exhaust-heat to the cool-warm water machine 1 (Step S25).

Steps S21 to S25 are repeated below.

Figure 50:
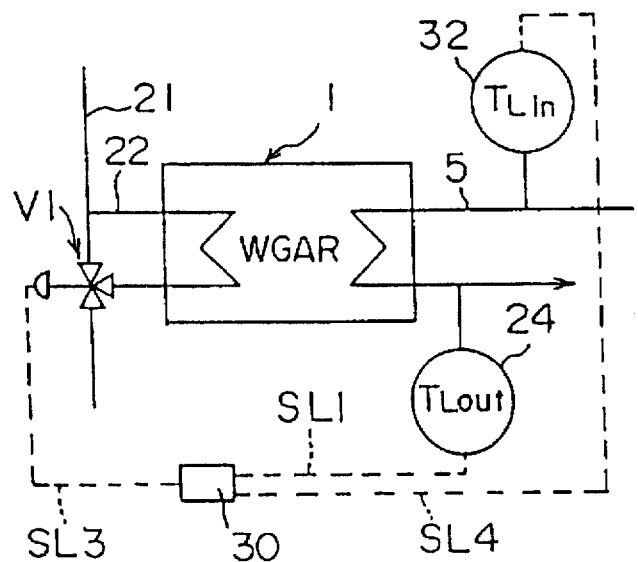
FIG. 50 is a block diagram of another embodiment differing from FIG. 44 to FIG. 49.
Figure 51:
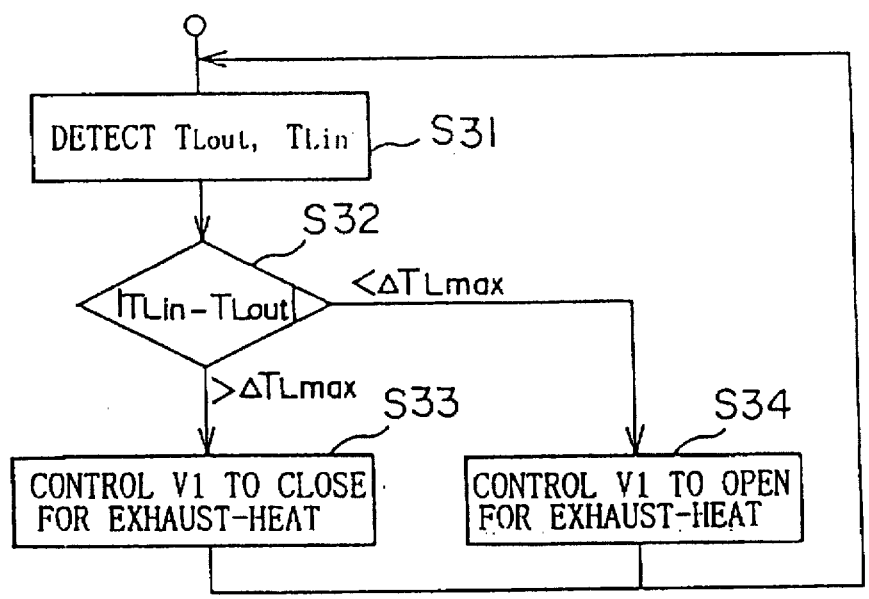
FIG. 51 is a flow chart showing control of FIG. 50.

FIG. 50 and FIG. 51 show an embodiment differing from FIG. 44 to FIG. 49. As known from FIG. 50, in the embodiment, the detected results of the cool water exit-temperature detection means 24 and a cool water entrance-temperature detection means 32 are sent to the control system 30.

As shown in FIG. 5:1., in the control for the embodiment, the cool water exit-temperature TLout and the cool water entrance-temperature TLin are detected (Step S31), an absolute value of the difference (of the temperature) between the cool water exit-temperature TLout and the cool water entrance-temperature TLin is judged to be more than the defined maximum value Δ TLmax (the maximum value of the absolute value of the difference between the cool water exit-temperature and the cool water entrance-temperature in the cool water circulation line: e.g., the difference of the temperature 12.5° C. between a rating of the exit-temperature 12.5° C. and a rating of the entrance-temperature 7° C.) or not (Step S32).

When the difference of the temperature |TLout−TLin|= exceeds the maximum value Δ TLmax (">Δ TLmax" in Step S32), there is a strong possibility of being in an over-load state, so that the three-way valve V1 is controlled to redirect the direction decreasing the amount of charging the exhaust-heat (Step S33). Whereas, when the difference of the temperature |TLout−TLin| does not exceed the maximum value Δ TLmax ("<Δ TLmax" in Step S32), there is a slight possibility of being in an over-load state, so that the three-way valve V1 is controlled to redirect the direction charging the exhaust-heat to the refrigeration machine 1 (Step S34).

Figure 52:
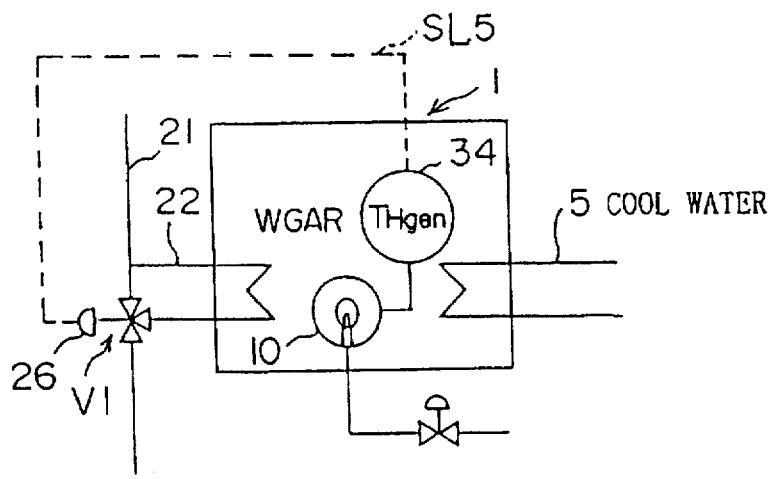
FIG. 52 is a block diagram of another embodiment differing from FIG. 44 to FIG. 51.
Figure 53:
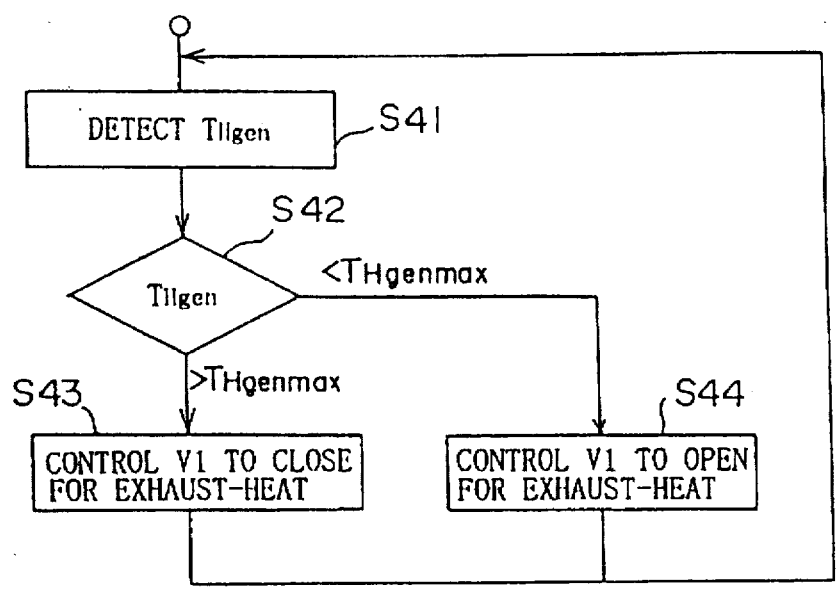
FIG. 53 is a flow chart showing control of FIG. 52.

FIG. 52 and FIG. 53 show an embodiment differing from FIG. 44 to FIG. 51. In FIG. 52, the high-temperature regenerator temperature detection means 34, which detects a temperature THgen of the high-temperature regenerator 10, outputs the detected result through the signal transmitting line SL5 to the control system 26. The opening of the three-way vane V1 is controlled, based on the detected result.

The concrete content as to the opening control is described in FIG. 53.

The temperature THgen of the high-temperature regenerator is detected by the high-temperature regenerator temperature detection means 34 (FIG. 52) (Step S41), the detected temperature THgen is compared with the maximum set value THgenmax of the high-temperature regenerator temperature in Step S42. When the detected temperature THgenmax is higher than the maximum set value THgenmax (the state of ">THgenmax" in Step S42), it can be judged that the high-temperature regenerator 10 is over-heated in the over-load state, so that the three-way valve V1 is controlled to redirect the direction for decreasing to charge the exhaust-heat (Step S43). Whereas, when the detected temperature THgen is lower than the maximum set value THgenmax (the state of ">THgenmax" in Step S42), it can be judged that the high-temperature regenerator 10 is not in the state of the over-load, so that the three-way valve V1 is controlled to redirect the direction for Charging the exhaust-heat to the refrigeration machine 1 (Step S44).

In FIG. 52 and FIG. 53, the control is carried out by using the temperature of the high-temperature regenerator, however, it can be carried out by using the pressure PH gen of the high-temperature regenerator (not shown).

Figure 54:
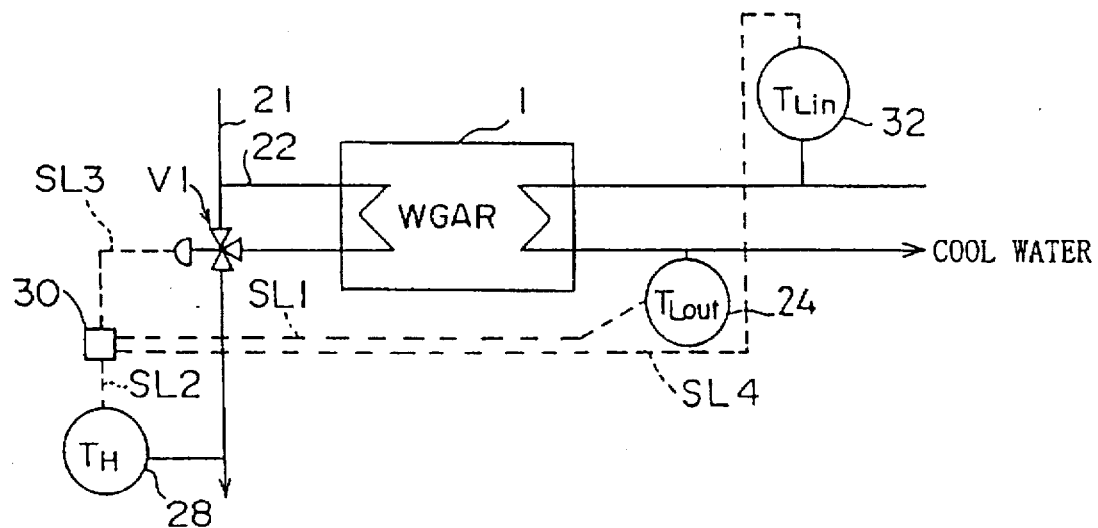
FIG. 54 is a block diagram of another embodiment differing from FIG. 44 to FIG. 53.
Figure 55:
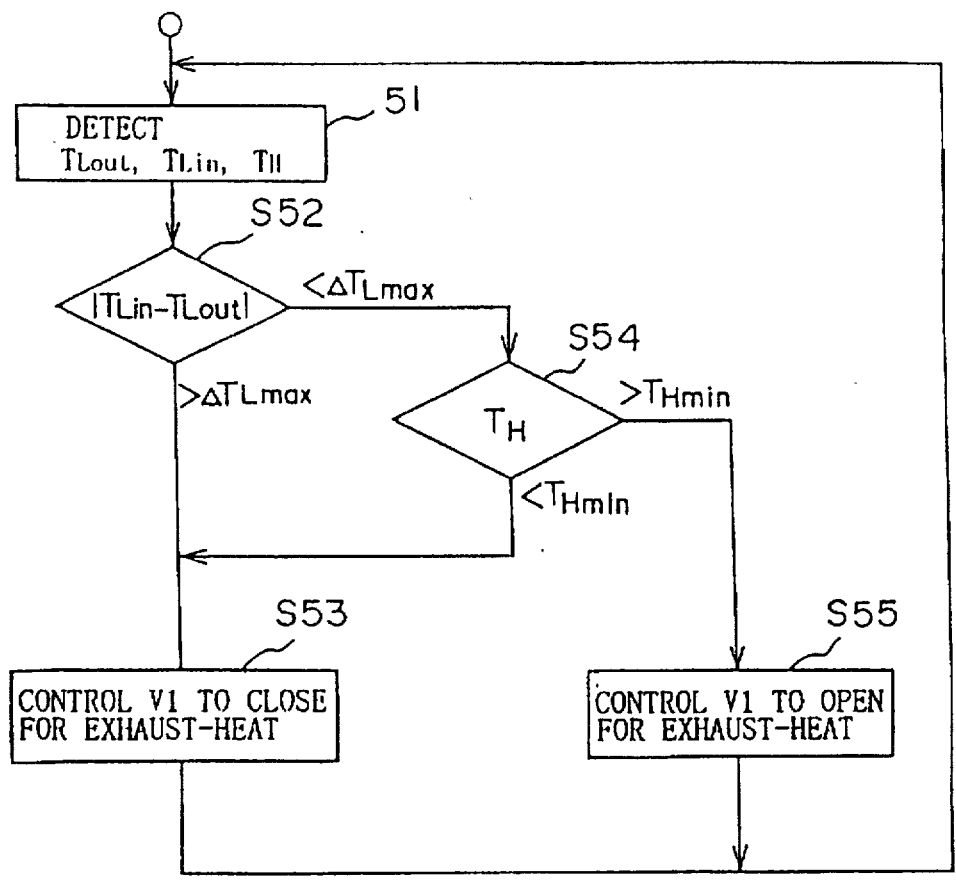
FIG. 55 is a flow chart showing control of FIG. 54.

FIG. 54 and FIG. 55 show an embodiment differing from FIG. 44 to FIG. 53, in which the charge of the exhaust-heat into the refrigeration machine is decided by using the cool water exit-temperature TLout, the cool water entrance-temperature TLin and the warm water temperature TH. More specifically, the cool water exit-temperature TLout, the cool water entrance-temperature TLin and the warm water temperature TH are detected by the detection means 24, 32 and 28 (FIG. 54) (Step S51: FIG. 55). Further, the absolute value of the difference (of the temperature) between the cool water exit-temperature TLout and the cool water entrance-temperature TLin is judged whether to exceed the defined maximum value Δ TLmax or not (Step S52).

When the difference of the temperature |TLout−TLin| exceeds the maximum value Δ TLmax (">Δ TLmax" in Step S52), there is a strong possibility of being in an over-load state, so that the three-way valve V1 is controlled to redirect to the direction decreasing the amount of charging the exhaust-heat (Step S53).

Whereas, when the difference of the temperature |TLout−TLin| does not exceed the maximum value Δ TLmax ("<Δ TLmax" in Step S52), the detected warm water temperature TH and the predetermined temperature THmin are compared with each other.

If the warm water temperature TH is lower than the predetermined temperature THmin (the case of being "<THmin" in Step S54), the solution temperature in the cool-warm water machine 1 is not increased when the exhaust-heat is charged, therefore, the inferiority as described above is produced, so that the three-way valve V1 is controlled to redirect to close for the exhaust-heat (Step S53). Whereas, if the warm water temperature TH is higher than the predetermined temperature THmin, the effect charging the exhaust-heat is satisfyingly obtained, so that the three-way valve V1 is controlled to redirect to lead the exhaust-heat to the cool-warm water machine 1 (Step S55).

Figure 56:
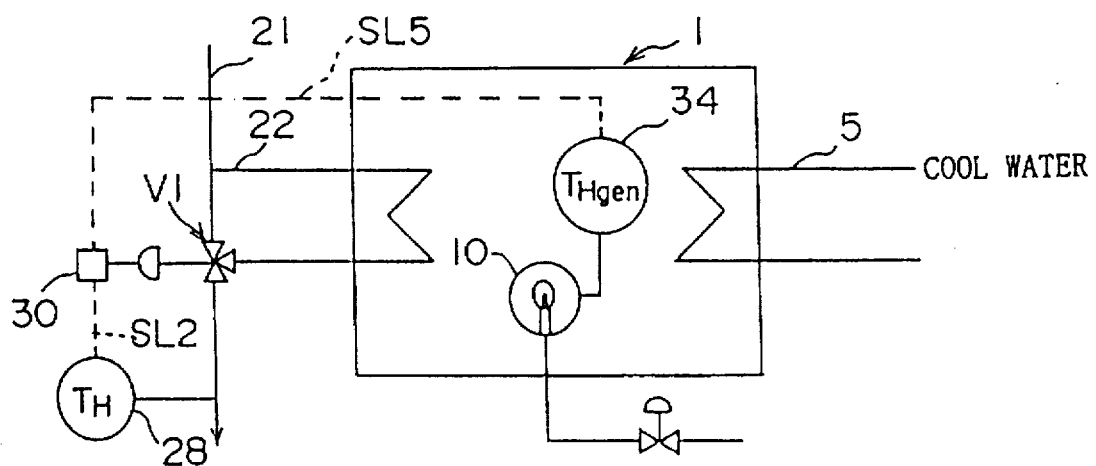
FIG. 56 is a block diagram of another embodiment differing from FIG. 44 to FIG. 55.
Figure 57:
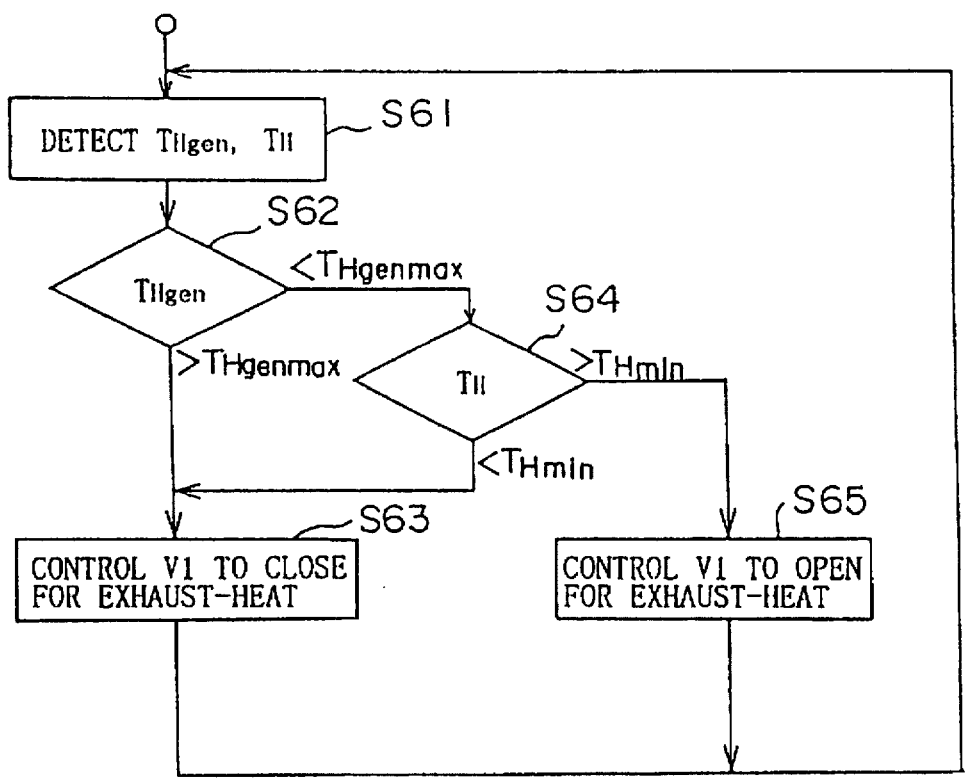
FIG. 57 is a flow chart showing control of FIG. 56.
Figure 5:
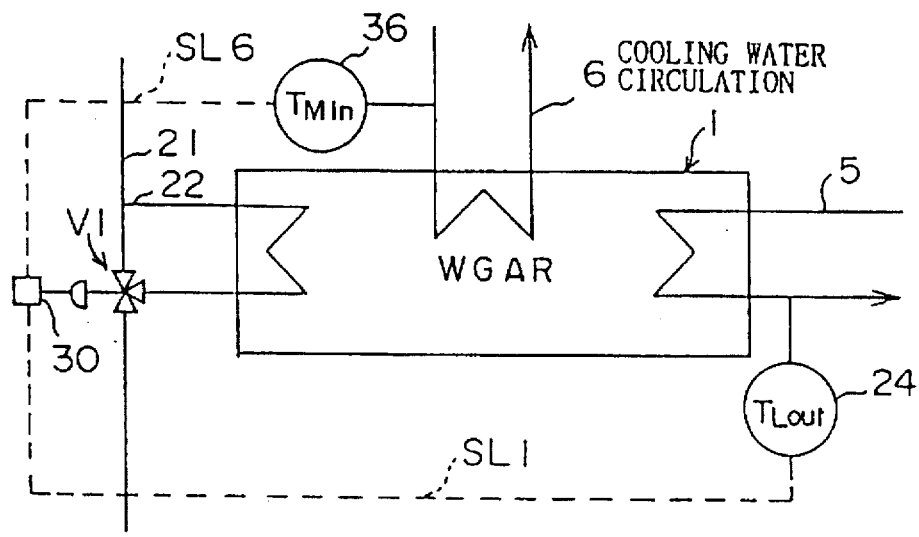
Figure 5:
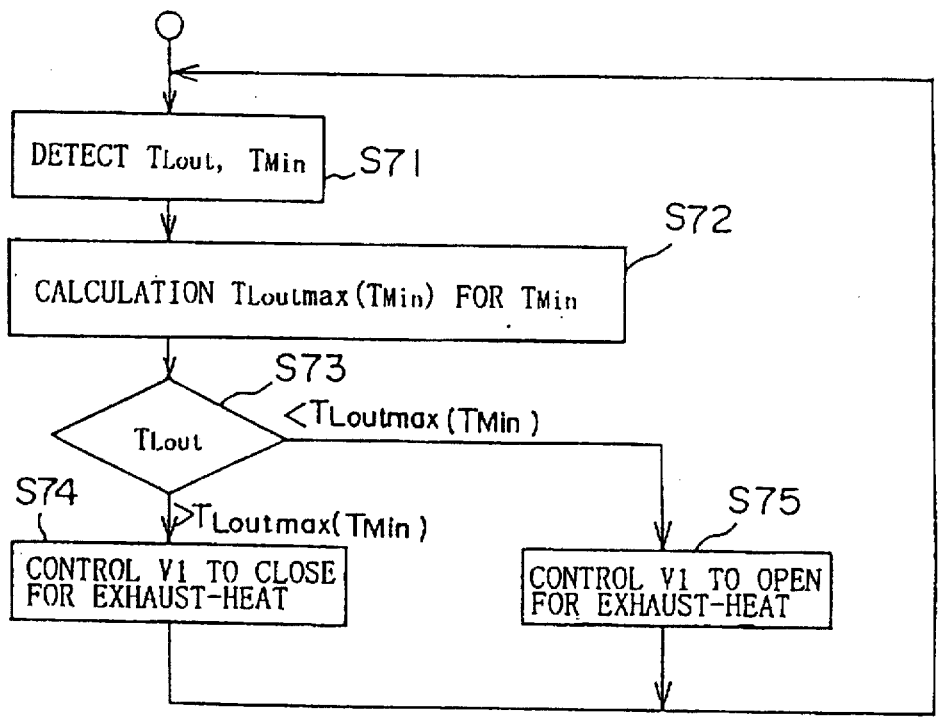

FIG. 56 and FIG. 57 show an embodiment differing from FIG. 44 to FIG. 55. In the embodiment, the amount for charging the exhaust-heat to the refrigeration machine is controlled based on the high-temperature regenerator temperature THgen and the warm water temperature TH. That is, the high-temperature regenerator temperature THgen and the warm water temperature TH are respectively detected by the high-temperature regenerator temperature detection means 34 and the warm water temperature detection means 28 (FIG. 56) (Step S61: FIG. 57).

The high-temperature regenerator temperature THgen which is detected in Step S61 is compared with the maximum set value THgenmax in Step S62. When the high-temperature regenerator temperature THgen is higher than the maximum set value THgeamax (the state of ">THgenma" in Step S62), it is judged to be under the over-load state, so that the three-way valve V1 is controlled to redirect to the direction decreasing the charge of the exhaust-heat (Step S63). When the high-temperature regenerator temperature THgen is lower than the maximum set value THgenmax (the state of "<THgenmax" in Step S62), the warm water temperature TH and the predetermined temperature THminare compared with each other in Step S64.

If the warm water temperature TH is lower than the predetermined temperature THmin (the case of being "<THmin" in Step S64), the solution temperature in the cool-warm water machine 1 is not increased when the exhaust-heat is charged, therefore, the inferiority as described above is produced, so that the three-way valve V1 is controlled to redirect to close for the exhaust-heat (Step S63). Whereas, if the warm water temperature TH is higher than the predetermined temperature THmin, the effect charging the exhaust-heat is satisfyingly obtained, so that the three-way vane V1 is controlled to redirect to lead the exhaust-heat to the cool-warm water machine 1 (Step S65).

FIG. 58 and FIG. 59 show an embodiment differing from FIG. 44 to FIG. 57. In FIG. 58, the cool water exit-temperature TLout is detected by the detection means 24, and the detected result is sent through the signal transmitting line SL1 to the control system 30. And, the cooling water entrance-temperature TMin is detected by the detection means 36, and the detected result is sent through the signal transmitting line SL6 to the control system 30. The control system 30 controls the opening of the three-way valve V1 based on the cool water exit-temperature $T_{Lout}$ and the cooling water entrance-temperature $T_{Min}$ to control the amount of flow charging the exhaust-heat to the refrigeration machine 1.

FIG. 59 shows the concrete content of the control. The cool water exit-temperature $T_{Lout}$ and the cooling water entrance-temperature $T_{Min}$ are detected (Step S71).

The maximum set value $T_{Loutmax}$ of the cool water exit-temperature is calculated as a function of the cooling water entrance-temperature $T_{Min}$ (Step S72). In FIG. 59, the calculated maximum set value of the cool water exit-temperature is illustrated as $T_{Loutmax}(T_{Min})$.

In Step S73, the detected cool water exit-temperature $T_{Lout}$ is compared with the maximum set value of the cool water exit-temperature $T_{Loutmax}(T_{Min})$. When the detected cool water exit-temperature $T_{Lout}$ is higher than the maximum set value of the cool water exit-temperature $T_{Loutmax}(T_{Min})$ (the case of ">$T_{Loutmax}(T_{Min})$" in Step S73), it is a waste for the exhaust-heat to be charged, so that the three-way valve V1 is controlled to redirect to close for the exhaust-heat in order that the inferiority caused by the over-load is not tangible (Step S74). Whereas, when the detected cool water exit-temperature $T_{Lout}$ is lower than the maximum set value of the cool water exit-temperature $T_{Loutmax}(T_{Min})$ (the case of "<$T_{Loutmax}(T_{Min})$" in Step S73), the effect charging the exhaust-heat is tangible, so that the three-way valve V1 is controlled to redirect to the side leading the exhaust-heat to the refrigeration machine 1 (Step S75).

Figure 60:
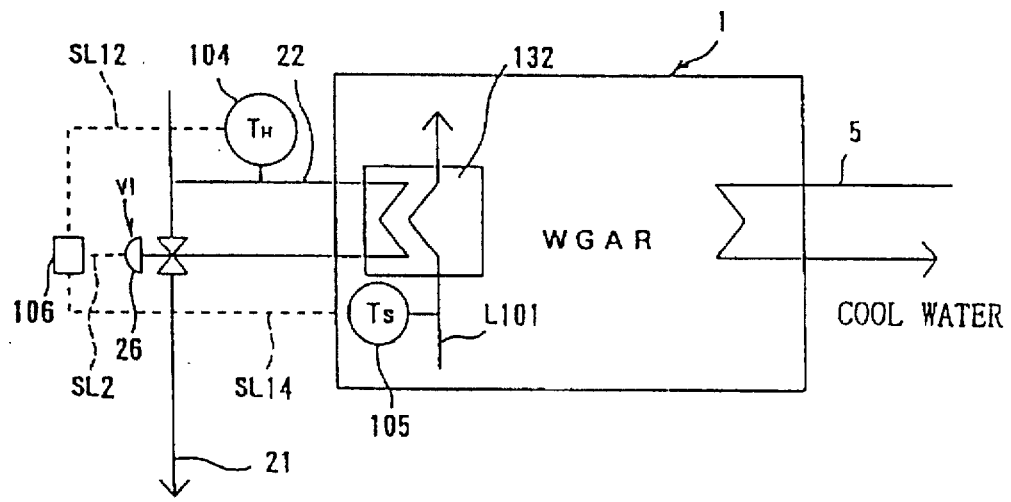
FIG. 60 is a block diagram of another embodiment differing from FIG. 44 to FIG. 59.
Figure 61:
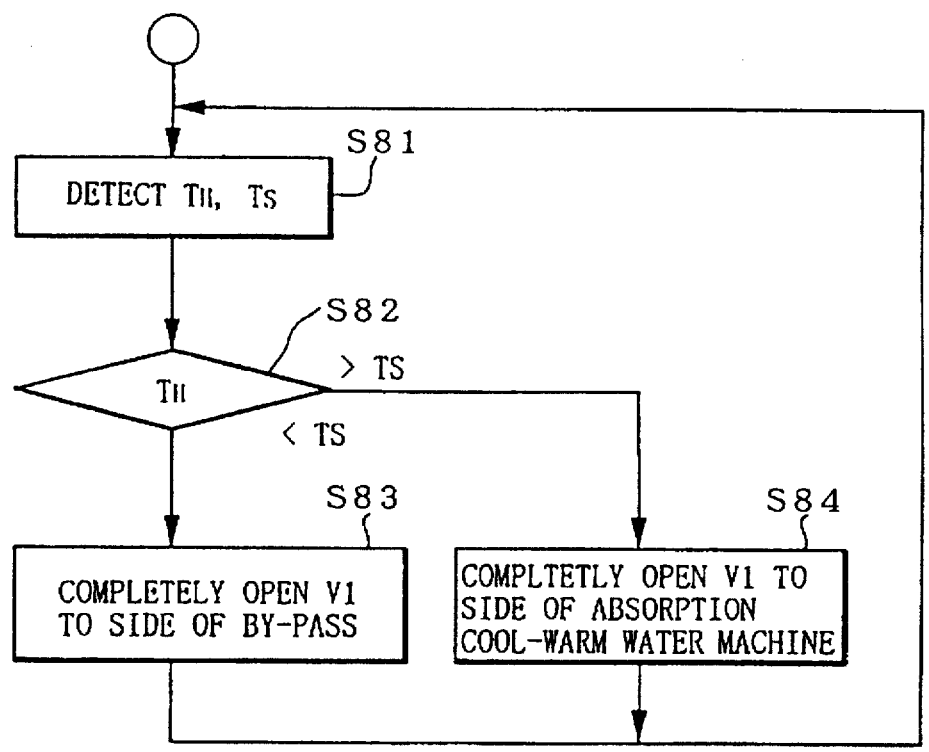
FIG. 61 is a flow chart showing control of FIG. 60.
Figure 62:
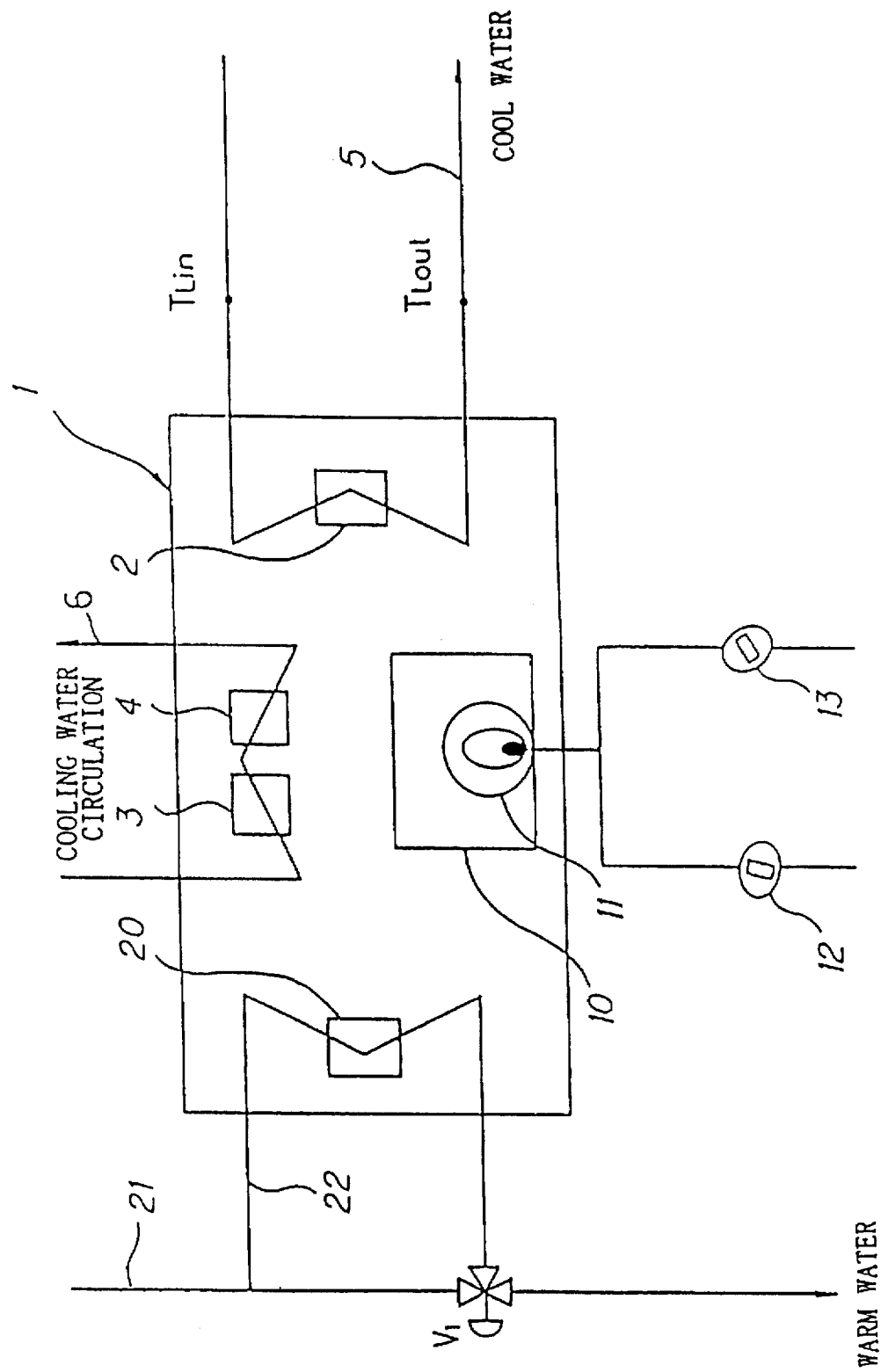
FIG. 62 is a block diagram of a conventional absorption cool-warm water machine.

In an embodiment shown in FIG. 60 and FIG. 61, a warm water temperature detection means 104 is provided along the line 22 branched from the exhaust-heat line 21 in order to detect the temperature TH of the warm water flowing in the line 22. The detected result by the detection means 104 is sent through a signal transmitting line SL12 to a control system 106.

An exhausted-heat salvage heat-exchanger 132, which is provided to charge heat held in the warm water to the absorption cool-warm water machine 1, is connected together with a solution line L101 in the cool-warm water machine 1. A solution temperature detection means 105, in order to detect the temperature Ts of the solution in the solution line L101, is connected together with the line L101, in which the detected result by the detection means 105 is sent through a signal transmitting line SL14 to the control system 106. The control signal outputted from the control system 106 is outputted to the control system 26 for the three-way valve V1.

The control of the three-way valve V1 in the embodiment will be explained with reference to FIG. 61.

The warm water temperature TH and the solution temperature Ts are respectively detected by the detection means 104 and 105 (Step S81). When the warm water temperature TH is at a low-temperature, the efficiency for charging the exhaust-heat is decreased, and it is likely that the refrigerating ability of the cool-warm water machine 1 cannot be maintained (when the warm water temperature TH is lower than the solution temperature in the cool-warm water machine 1). In order to avoid the aforementioned case, in Step S82, the detected warm water temperature TH and solution temperature Ts are compared with each other. When the warm water temperature TH is lower than the solution temperature TS, the aforementioned inferiority is produced, so that the three-way vane V1 is completely opened to the side of the bypass in order that the exhaust-heat is interrupted to be charged to the absorption cool-warm water machine 1 (Step S83). Whereas, when the warm water temperature TH is higher than the solution temperature TS, the effect charging the exhaust-heat is sufficiently obtained, so that the three-way valve V1 is controlled to redirect to the side leading the exhaust-heat to the cool-warm water machine 1 (including the case of a 100% lead) (Step S84).

Steps S81 to S84 are repeated below.

EFFECT

According to the present invention as described thus far, after the solution pump or the combustion burner is interrupted, the absorption solution still remains in the inside of the heat-exchanger, the remaining solution avoids becoming condensed or crystallized, whereby various condition of inferiority caused by crystallization are completely prevented.

In the present invention, when the temperature of fluid having the exhaust-heat is detected by the temperature detection means, an effective use for the exhaust-heat is guaranteed.

Furthermore, the cool-warm water machine can control against not only the interruption of the solution pump, the combustion burner or the like during the operation of the cool-warm water machine, but also the state in which the cool-warm water machine itself interrupts the operation.

Further, according to the present invention, the exhaust-heat charge operation mode or the normal operation mode is selected, and then by controlling the combustion of the high-quality fuel combustion burner, the increase in the temperature of the high-temperature regenerator and the corrosion caused by the increased temperature are prevented, and it is therefore possible to limits the sharp decrease in the ability of the cool-warm water machine.

In addition to the above, by judging the operating state of the absorption cool-warm water machine, a more precise control takes place.

And then, according to the present invention, the unavailable refrigerant is not produced, the increase in the temperature of the high-temperature regenerator and the corrosion caused by the increased temperature are prevented and it is therefore possible to limit the sharp decrease in the ability of the cool-warm water machine.

The other action effects of the present invention will be listed below.

(1) In the over-load state, the charged exhaust-heat is prevented from being wastefully emitted.

(2) The decrease of the effect charging the exhaust-heat can be treated.

(3) The refrigerating ability of the absorption cool-warm water machine cannot be guaranteed, because heat flows backward from the solution of the absorption cool-warm water machine to the warm exhaust-water.

(4) The heating value caused by the high-quality fuel charged into the cool-warm water machine is efficiently used.

(5) When it is structured that the opening of the three-way valve is controlled in response to the detected results by the cool water exit-temperature detection means and the warm water temperature detection means, it can be achieved to suitably treat against the over-load state and the decrease of the effect charging the exhaust-heat and to guarantee the refrigerating ability.

(6) The amount for charging the exhaust-heat is controlled by means of, for example, the opening control of the three-way valve, whereby, highly accurate control can take place.

We claim:

1. A system including an absorption cool-warm water machine having: a vaporizer, an absorber, a condenser, a high temperature regenerator, a cooling water circulation line operative to feed cooling water to said absorber and said condenser and a cool-warm water circulation line connected with a cooling load, said system further comprising:
   means including adjustable throttle valves for supplying high quality fuel and combustion air to a burner operative in said high temperature regenerator,
   an exhaust heat charge heat exchanger operably disposed in said machine and arranged to receive exhaust heat charge from an exhaust heat charge line,
   means for selectively passing exhaust heat charge from said exhaust heat charge line to said exhaust heat charge heat exchanger, and
   a control system operative selectively in response to a predetermined signal to function in an exhaust heat charge operation mode, in which exhaust heat charge is supplied to said exhaust heat charge heat exchanger, and a normal operation mode, in which exhaust heat charge is not supplied to said exhaust heat charge heat exchanger, for supplying high quality fuel and combustion air in controlled amounts to said burner in said high temperature regenerator, said control system being operative in each of said modes to automatically adjust the increase in opening degree of said throttle valves in response to said predetermined signal.

2. The system according to claim 1 including a three-way valve in said exhaust heat charge line for selectively passing exhaust heat charge to said exhaust heat charge heat exchanger, detecting means for detecting an opening state of said three-way valve, supremum limiters controlling the operation of said high quality fuel adjustable throttle valve and combustion air adjustable throttle valve, and means for transmitting a signal from said three-way valve opening state detecting means to said control system.

3. The system according to claim 2, further comprising:
   a cool-warm water circulation line exit-temperature detection means for detecting an exit-temperature in the cool-warm water circulation line;
   a high-temperature regenerator temperature detection means for detecting a temperature of the high-temperature regenerator;
   a high-temperature regenerator pressure detection means for detecting pressure of the high-temperature generator; and
   a cooling water circulation line entrance-temperature detection means for detecting an entrance-temperature of a cooling water circulation line, so that each of said detection means transmits respectively a detected signal to said control system.

* * * * *